US011621768B2

(12) United States Patent
Ma et al.

(10) Patent No.: US 11,621,768 B2
(45) Date of Patent: Apr. 4, 2023

(54) TERRESTRIAL AND NON-TERRESTRIAL COMMUNICATION SYSTEMS, APPARATUSES, AND METHODS

(71) Applicants: Jianglei Ma, Ottawa (CA); Ming Jia, Ottawa (CA); Peiying Zhu, Ottawa (CA); Wen Tong, Ottawa (CA)

(72) Inventors: Jianglei Ma, Ottawa (CA); Ming Jia, Ottawa (CA); Peiying Zhu, Ottawa (CA); Wen Tong, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/864,922

(22) Filed: May 1, 2020

(65) Prior Publication Data

US 2021/0194571 A1    Jun. 24, 2021

Related U.S. Application Data

(60) Provisional application No. 62/953,305, filed on Dec. 24, 2019.

(51) Int. Cl.
*H04B 7/185* (2006.01)
*H04W 36/00* (2009.01)

(52) U.S. Cl.
CPC ..... *H04B 7/18513* (2013.01); *H04B 7/18517* (2013.01); *H04B 7/18526* (2013.01); *H04B 7/18539* (2013.01); *H04B 7/18558* (2013.01)

(58) Field of Classification Search
None
See application file for complete search history.

(56) References Cited

U.S. PATENT DOCUMENTS

| | | | | |
|---|---|---|---|---|
| 9,198,070 | B2 * | 11/2015 | Krishnamurthy | H04L 1/0036 |
| 2013/0083681 | A1 * | 4/2013 | Ebrahimi Tazeh Mahalleh | ......... H04B 7/0626 370/252 |
| 2013/0286964 | A1 * | 10/2013 | Chu | H04L 27/261 370/329 |
| 2014/0302856 | A1 * | 10/2014 | Nory | H04W 36/0061 455/437 |
| 2015/0016295 | A1 * | 1/2015 | Ebrahimi Tazeh Mahalleh | ......... H04B 7/0626 370/252 |
| 2017/0332283 | A1 * | 11/2017 | Kubota | H04W 72/0413 |

(Continued)

FOREIGN PATENT DOCUMENTS

| | | | |
|---|---|---|---|
| CN | 1072299 A | 5/1993 | |
| CN | 1252189 A | 5/2000 | |

(Continued)

OTHER PUBLICATIONS

Thales etl al., "NR-NTN: TP for Chap 7.3 NR modifications to support NTN", RP-180658, 3GPP TSG RAN Meeting #80, La Jolla, USA, Jun. 11-14, 2018, 37 pages.

(Continued)

*Primary Examiner* — Alpus Hsu

(57) ABSTRACT

The present disclosure relates, in part, to non-terrestrial communication systems, and in some embodiments to the integration of terrestrial and non-terrestrial communication systems. Non-terrestrial communication systems can provide a more flexible communication system with extended wireless coverage range and enhanced service quality compared to conventional communication systems.

20 Claims, 19 Drawing Sheets

(56) References Cited

U.S. PATENT DOCUMENTS

| | | | |
|---|---|---|---|
| 2018/0013481 A1* | 1/2018 | Guo | H04B 7/086 |
| 2018/0198585 A1* | 7/2018 | Lin | H04L 5/0053 |
| 2018/0213350 A1* | 7/2018 | Pon | H04W 4/02 |
| 2018/0219700 A1* | 8/2018 | Åström | H04L 25/0202 |
| 2018/0279249 A1 | 9/2018 | Lv | |
| 2018/0279374 A1* | 9/2018 | Sun | H04L 5/005 |
| 2018/0337756 A1* | 11/2018 | Nam | H04L 5/0051 |
| 2018/0367358 A1* | 12/2018 | Baugh | H04L 5/0057 |
| 2018/0376347 A1* | 12/2018 | Ross | H04W 16/20 |
| 2019/0028170 A1* | 1/2019 | Zhang | H04B 7/0619 |
| 2019/0150080 A1 | 5/2019 | Davies et al. | |
| 2019/0199427 A1 | 6/2019 | Zakaria et al. | |
| 2019/0222303 A1* | 7/2019 | Lucky | H04W 28/065 |
| 2019/0246321 A1* | 8/2019 | Li | H04B 17/309 |
| 2019/0260448 A1* | 8/2019 | Rahman | H04W 72/0446 |
| 2019/0260464 A1 | 8/2019 | Roy et al. | |
| 2019/0363843 A1* | 11/2019 | Gordaychik | H04L 1/1854 |
| 2019/0394747 A1* | 12/2019 | Akkarakaran | H04W 64/00 |
| 2020/0007194 A1* | 1/2020 | John Wilson | H04L 5/001 |
| 2020/0067590 A1* | 2/2020 | Wang | H04B 7/0632 |
| 2020/0067614 A1* | 2/2020 | Wang | H04J 11/0056 |
| 2020/0067631 A1* | 2/2020 | Kakishima | H04L 5/0092 |
| 2020/0252941 A1* | 8/2020 | Schmidt | H04W 72/0413 |
| 2021/0021333 A1* | 1/2021 | Kusashima | H04W 72/048 |
| 2021/0045051 A1* | 2/2021 | Kusashima | H04W 48/20 |
| 2021/0160149 A1 | 5/2021 | Ma et al. | |

FOREIGN PATENT DOCUMENTS

| | | |
|---|---|---|
| CN | 101317101 A | 12/2008 |
| CN | 101455012 A | 6/2009 |
| CN | 103026640 A | 4/2013 |
| CN | 105744231 A | 7/2016 |
| CN | 107852685 A | 3/2018 |
| CN | 108886498 A | 11/2018 |
| WO | 2011146613 A1 | 11/2011 |
| WO | 2018127181 A1 | 7/2018 |
| WO | 2019170866 A1 | 9/2019 |
| WO | 2019170867 A1 | 9/2019 |
| WO | 2019190164 A1 | 10/2019 |
| WO | 2019201808 A1 | 10/2019 |

OTHER PUBLICATIONS

Wang Xiao-ming et al, "Design of electric power emergency communication system based on multi-network Integration", China Academic Journal Electronic Publishing House, Jun. 20, 2019, 5 pages.

* cited by examiner

TERRESTRIAL AND NON-TERRESTRIAL COMMUNICATION SYSTEMS, APPARATUSES, AND METHODS

CROSS REFERENCE TO RELATED APPLICATIONS

This application claims the benefit of priority to U.S. Provisional Patent Application Ser. No. 62/953,305 filed Dec. 24, 2019 and entitled "Terrestrial and Non-Terrestrial Communication Systems, Apparatuses, and Methods", the contents of which are incorporated herein by reference.

TECHNICAL FIELD

The present disclosure relates generally to wireless communication systems, and in particular embodiments, to communication systems that may include non-terrestrial equipment, terrestrial equipment, or both.

BACKGROUND

Current cellular networks are largely based on terrestrial communication systems with ground-based communication equipment. This limits the flexibility of the cellular network, as ground-based communication equipment can be difficult to install in remote areas and can be difficult to relocate to areas with high-demand.

SUMMARY

According to one aspect of the present disclosure, there is provided a method including a user equipment (UE) transmitting or receiving a first wireless transmission to or from a first transmit and receive point (TRP) in a wireless network, the first TRP being a first type of TRP. The method further includes the UE transmitting or receiving a second wireless transmission to or from a second TRP in the wireless network, the second TRP being a second type of TRP and being a non-terrestrial TRP.

In some embodiments, transmitting or receiving the first wireless transmission to or from the first TRP includes transmitting or receiving the first wireless transmission to or from a terrestrial TRP.

In some embodiments, transmitting or receiving the first wireless transmission to or from the first TRP includes transmitting or receiving the first wireless transmission to or from a further non-terrestrial TRP.

In some embodiments, the first type of TRP and the second type of TRP are implemented in different layers of the wireless network. Each of the different layers of the wireless network optionally comprise a respective range of altitudes.

In some embodiments, transmitting or receiving the first wireless transmission to or from the first TRP includes receiving the first wireless transmission from the first TRP; transmitting or receiving the second wireless transmission to or from the second TRP includes receiving the second wireless transmission from the second TRP; and the first wireless transmission and the second wireless transmission comprise a same or different data packet.

In some embodiments, transmitting or receiving the second wireless transmission includes receiving the second wireless transmission. In these embodiments, the method further includes the UE determining the second type of TRP based on the second wireless transmission.

According to another aspect of the present disclosure, there is provided a method including a first TRP transmitting or receiving a first wireless transmission to or from a UE in a wireless network, the first TRP being a first type of TRP and being a non-terrestrial TRP. The method further includes the first TRP transmitting or receiving a second wireless transmission to or from a second TRP in the wireless network, the second TRP being a second type of TRP.

In some embodiments, transmitting or receiving the first wireless transmission includes receiving the first wireless transmission from the UE; transmitting or receiving the second wireless transmission includes transmitting the second wireless transmission to the second TRP; and the first wireless transmission and the second wireless transmission comprise a same or different data packet.

In some embodiments, transmitting or receiving the second wireless transmission to or from the second TRP includes transmitting or receiving a wireless backhaul transmission to or from the second TRP.

In some embodiments, the first wireless transmission and the second wireless transmission comprise a same or different data packet, and the first wireless transmission and the second wireless transmission are for same or different services or applications.

According to a further aspect of the present disclosure, there is provided a method including determining a configuration for a plurality of TRPs in a communication system, the plurality of TRPs including a terrestrial TRP and a non-terrestrial TRP. The method further includes transmitting signaling to at least one TRP in the plurality of TRPs, the signaling including instructions to implement the configuration of the plurality of TRPs.

In some embodiments, determining the configuration for the plurality of TRPs includes determining a plurality of connections for a UE, each of the plurality of connections being to a different type of TRP.

In some embodiments, determining the configuration for the plurality of TRPs includes determining a relay connection, the non-terrestrial TRP being a relay node in the relay connection.

In some embodiments, determining the configuration for the plurality of TRPs includes determining a flying distributed antenna arrangement, the flying distributed antenna arrangement including a plurality of flying TRPs that each have a connection to a UE or to the terrestrial TRP.

In some embodiments, determining the configuration for the plurality of TRPs includes determining a wireless backhaul connection for the plurality of TRPs. The wireless backhaul may share time, frequency and spatial resources with an access link that connects to a UE.

In some embodiments, determining the configuration for the plurality of TRPs includes determining a connection handover for the at least one TRP.

In some embodiments, the non-terrestrial TRP is a flying TRP, and the instructions comprise an instruction for the flying TRP to move to a new location.

In some embodiments, the instructions comprise an instruction for the at least one TRP to turn-on or turn-off a connection.

According to yet another aspect of the present disclosure, there is provided a UE including a transceiver to perform any method disclosed herein.

According to yet a further aspect of the present disclosure, there is provided a TRP including a transceiver to perform any method disclosed herein.

According to another aspect of the present disclosure, there is provided an apparatus including a processor to determine a configuration for a plurality of TRPs in a communication system, the plurality of TRPs including a terrestrial TRP and a non-terrestrial TRP; and a transmitter to transmit signaling to at least one TRP in the plurality of TRPs, the signaling including instructions to implement the configuration of the plurality of TRPs.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

Figure 1A:
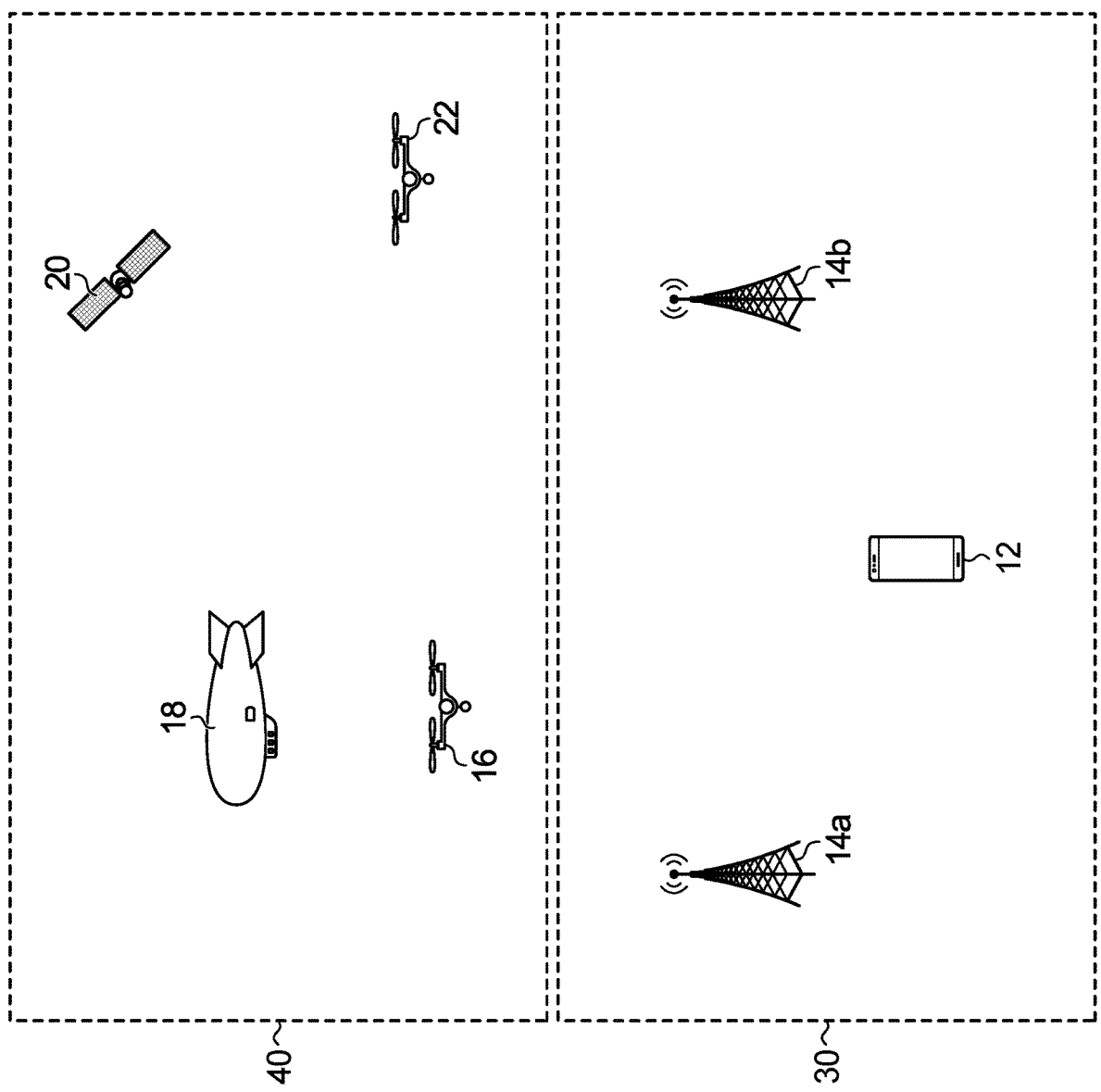
FIGS. 1A to 1F are diagrams illustrating a communication system, according to some embodiments of the present disclosure.

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

The present disclosure relates, in part, to non-terrestrial communication systems and how they may integrate with terrestrial communication systems. While conventional wireless cellular technology (for example, Long Term Evolution (LTE) and 5G New Radio (NR)) has focused on terrestrial communication systems, there is an opportunity to implement non-terrestrial communication systems to enhance wireless communications. Non-terrestrial communication systems include communication equipment that is not ground-based, and can be used to provide wireless access to areas that are difficult to service, prohibitively expensive for the number of users that may be served at any given time using terrestrial communication systems, or possibly to provide additional capacity for terrestrial communication systems for a temporary period of time.

Some embodiments described herein relate to the efficient implementation of non-terrestrial communication systems. These embodiments can provide a more flexible communication system with extended wireless coverage range and enhanced service quality compared to conventional communication systems.

FIGS. 1A to 1F are diagrams illustrating a communication system 10, according to some embodiments. The communication system 10 includes both a terrestrial communication system 30 and a non-terrestrial communication system 40. The terrestrial communication system 30 and the non-terrestrial communication system 40 could be considered sub-systems of the communication system 10. The terrestrial communication system 30 includes multiple terrestrial transmit and receive points (TRPs) 14a-14b. The non-terrestrial communication system 40 includes multiple non-terrestrial TRPs 16, 18 and 20.

A TRP may also be referred to as a network node or a base station. In general, and as discussed in further detail elsewhere herein, TRPs can provide wireless service to a user equipment (UE).

A terrestrial TRP is a TRP that is bound to the ground. For example, a terrestrial TRP could be mounted on a building or tower. A terrestrial communication system may also be referred to as a land-based or ground-based communication system, although a terrestrial communication system can also, or instead, be implemented on or in water.

A non-terrestrial TRP is any TRP that is not bound to the ground. A flying TRP is an example of a non-terrestrial TRP. A flying TRP may be implemented using communication equipment supported or carried by a flying device. Non-limiting examples of flying devices include airborne platforms (such as a blimp or an airship, for example), balloons, quadcopters and other aerial vehicles. In some implementations, a flying TRP may be supported or carried by an unmanned aerial system (UAS) or an unmanned aerial vehicle (UAV), such as a drone. A flying TRP may be a moveable or mobile TRP that can be flexibly deployed in different locations to meet network demand. A satellite TRP is another example of a non-terrestrial TRP. A satellite TRP may be implemented using communication equipment supported or carried by a satellite. A satellite TRP may also be referred to as an orbiting TRP.

The non-terrestrial TRPs 16, 18 are examples of flying TRPs. More particularly, the non-terrestrial TRP 16 is illustrated as quadcopter TRP (i.e., communication equipment carried by a quadcopter), and the non-terrestrial TRP 18 is illustrated as an airborne platform TRP (i.e., communication equipment carried by an airborne platform). The non-terrestrial TRP 20 is illustrated as a satellite TRP (i.e., communication equipment carried by a satellite).

The altitude, or height above the earth's surface, at which a non-terrestrial TRP operates is not limited herein. A flying TRP could be implemented at high, medium or low altitudes. For example, the operational altitude of airborne platform TRP or a balloon TRP could be between 8 and 50 km. The operational altitude of quadcopter TRP, in an example, could be between several meters and several kilometers, such as 5 km. In some embodiments, the altitude of a flying TRP is varied in response to network demands. The orbit of a satellite TRP is implementation specific, and could be a low earth orbit, a very low earth orbit, a medium earth orbit, a high earth orbit or a geosynchronous earth orbit, for example. A geostationary earth orbit is a circular orbit at 35,786 km above the earth's equator and following the direction of the earth's rotation. An object in such an orbit has an orbital period equal to the earth's rotational period and thus appears motionless, at a fixed position in the sky, to ground observers. A low earth orbit is an orbit around the around earth with an altitude between 500 km (orbital period of about 88 minutes), and 2,000 km (orbital period of about 127 minutes). A medium earth orbit is a region of space around the earth above a low earth orbit and below a geostationary earth Orbit. A high earth orbit is any orbit that is above a geostationary orbit. In general, the orbit of a satellite TRP is not limited herein.

Since non-terrestrial TRPs can be located at various altitudes, in addition to being located at various longitudes and latitudes, a non-terrestrial communication system can form a three-dimensional (3D) communication system. For example, a quadcopter TRP could be implemented 100 m above the surface of the earth, an airborne platform TRP could be implemented between 8 and 50 km above the surface of the earth, and a satellite TRP could be implemented 10,000 km above the surface of the earth. A 3D wireless communication system can have extended coverage compared to a terrestrial communication system and enhance service quality for users. However, the configuration and design of a 3D wireless communication system may also be more complex.

Non-terrestrial TRPs may be implemented to service locations that are difficult to service using a terrestrial communication system. For example, a UE could be in an ocean, desert, mountain range or another location that is difficult to provide wireless coverage to using a terrestrial TRP. Non-terrestrial TRPs are not bound to the ground, and are therefore able to more easily provide wireless access to UEs.

Non-terrestrial TRPs may be implemented to provide additional temporary capacity in an area where many users have gather for a period of time, such as a sporting event, concert, festival or other event that draws a large crowd. The additional users may exceed the normal capacity for that area.

The non-terrestrial TRPs may instead be deployed for fast disaster recovery. For example, a natural disaster in a particular area could place strain on a wireless communication system. Some terrestrial TRPs could be damaged by the disaster. In addition, network demands could be elevated during or after a natural disaster as users try to contact help or loved ones. Non-terrestrial TRPs could be rapidly transported to the area of a natural disaster to enhance wireless communications in the area.

The communication system 10 further includes a terrestrial user equipment (UE) 12 and a non-terrestrial UE 22, which may or may not be considered part of the terrestrial communication system 40 and the non-terrestrial communication system 30, respectively. A terrestrial UE is bound to the ground. For example, a terrestrial UE could be a UE that is operated by a user on the ground. There are many different types of terrestrial UEs, including (but not limited to) cell phones, sensors, cars, trucks, buses, and trains. In contrast, a non-terrestrial UE is not bound to the ground. For example, a non-terrestrial UE could be implemented using a flying device or a satellite. A non-terrestrial UE that is implemented using a flying device is referred to as a flying UE, whereas a non-terrestrial UE that is implemented using a satellite is referred to as a satellite UE. Although the non-terrestrial UE 22 is depicted as a flying UE implemented using a quadcopter in FIG. 1A, this is only an example. A flying UE could instead be implemented using an airborne platform or a balloon. In some implementations, the non-terrestrial UE 22 is a drone that is used for surveillance in a disaster area, for example.

The communication system 10 can provide a wide range of communication services to UEs through the joint operation of multiple different types of TRPs. These different types of TRPs can include any terrestrial and/or non-terrestrial TRPs disclosed herein. In a non-terrestrial communication system, there may be different type of non-terrestrial TRPs, including satellite TRPs, airborne platform TRPs, balloon TRPs and quadcopter TRPs. In general, different types of TRPs have different functions and/or capabilities in a communication system. For example, different types of TRPs may support different data rates of communications. The data rate of communications provided by quadcopter TRPs is higher than the data rate of communications provided by airborne platform TRPs, balloon TRPs, and satellite TRPs. The data rate of communications provided by the airborne platform TRPs and balloon TRPs is higher than the data rate of communications provided satellite TRPs. Thus, satellite TRPs can provide low data rate communications to UE, e.g., up to 1 Mbps. On the other hand, airborne platform TRPs and balloon TRPs can provide low to medium data rate communications to UE, e.g., up to 10 Mbps. Quadcopter TRPs could provide high data rate communications to a UE in certain circumstances, e.g., 100 Mbps and above. It is noted that the terms of low, medium, and high in this disclosure are exemplary explanations to show the relative difference between different types of TRPs. The specific values of the data rates given to the low, medium, and high data rates are just examples in this disclosure, not limited to the examples provided. In some examples, some types of TRPs may act as antennas or remote radio units (RRUs), and some types of TRPs may act as base stations that have more sophisticated functions and are able to coordinate other RRU-type TRPs.

In some embodiments, different types of TRPs in a communication system may be used to provide different types of service to a UE. For example, satellite TRPs, airborne platform TRPs and balloon TRPs may be used for wide area sensing and sensor monitoring, while quadcopter TRPs can be used for traffic monitoring. In another example, a satellite TRP is used to provide wide area voice service, while a quadcopter TRP is used to provide high speed data service as a hot spot. Different types of TRPs can be turned-on (i.e., established, activated or enabled), turned-off (i.e., released, deactivated or disabled) and/or configured based on the needs of the service.

In some embodiments, satellite TRPs are a separate and distinct type of TRP. In some embodiments, flying TRPs and terrestrial TRPs are the same type of TRP. However, this might not always be the case. Flying TRPs can instead be treated as a distinct type of TRP that is different from terrestrial TRPs. Flying TRPs might also include multiple different types of TRPs in some embodiments. For example, airborne platform TRPs, balloon TRPs, quadcopter TRPs and/or drone TRPs may or may not be classified as different types of TRPs. Flying TRPs that are implemented using the same type of flying device but have different communication capabilities or functions may or may not be classified as different types of TRPs.

In some embodiments, a particular TRP is capable of functioning as more than one TRP type. For example, the TRP could switch between different types of TRPs. The TRP could be actively or dynamically configured as one of the TRP types by the network, which may be changed as network demands change. The TRP may also or instead switch to act as a UE.

Referring again to the communication system 10, multiple different types of TRPs could be defined. For example, the terrestrial TRPs 14a-14b could be a first type of TRP, the flying TRP 16 could be a second type of TRP, the flying TRP 18 could be a third type of TRP, and the satellite TRP 20 could be a fourth type of TRP. In some implementations, one or more of the TRPs in the communication system 10 are capable of dynamically switching between different TRP types.

In some embodiments, different types of TRPs are organized into different sub-systems in a communication system. For example, four sub-systems in the communication system 10 may exist. The first sub-system is a satellite sub-system including at least the satellite TRP 20, the second sub-system is an airborne sub-system including at least the airborne platform TRP 18, the third sub-system is a low-height flying sub-system including at least the quadcopter TRP 16 and possibly other low-height flying TRPs, and the fourth sub-system is a terrestrial sub-system including at least the terrestrial TRPs 14a-14b. In another examples, airborne platform TRP 18 and satellite TRP 20 can be categorized as one sub-system. In yet another example, quadcopter TRP 16 and terrestrial TRPs 14a-14b can be categorized as one sub-system. In a further example, quadcopter TRP 16, airborne platform TRP 18 and satellite TRP 20 can be categorized as one sub-system.

Throughout this disclosure, the term "connection" or "link" refers to a communication connection established between a UE and a TRP, either directly or indirectly relayed by other TRPs. Consider FIG. 1D as an example. There exist three connections between the UE 12 and the satellite TRP 20. The first connection is the direct connection between the UE 12 and the satellite TRP 20, the second connection is the connection of UE 12-TRP 16-TRP 20, and the third connection is the connection of UE 12-TRP 16-TRP 22-TRP 20. When a connection between a UE and a TRP is established indirectly and relayed by other TRPs, the direct link between the UE and one of the other TRPs can be referred to as an access link, while other links between the TRPs can be referred to as backhauls or backhaul links. For example, in the third connection, the link UE 12-TRP 16 is the access link, and the links TRP 16-TRP 22 and TRP 22-TRP 20 are backhaul links. The term "sub-system" refers to a communication sub-system comprising at least a given type of TRPs, which have high base station capabilities and can provide communication services to UEs, possibly together with other types of TRPs act as relaying TRPs. For example, a satellite sub-system in FIG. 1D can include at least the satellite TRP 20, the quadcopter TRP 16 and the quadcopter TRP 22.

Different types of TRPs can have different base station capabilities. For example, any two or more of the terrestrial TRPs 14a-14b and the non-terrestrial TRPs 16, 18, 20 could have different base station capabilities. In some examples, base station capabilities refer to at least one of abilities of baseband signal processing, scheduling or controlling data transmissions to/from UEs within its service area. Different base station capabilities relate to the relative functionality that is provided by a TRP. A group of TPRs may be classified into different levels, such as low base station capability TRP, medium base station capability TRP, and high base station capability TRP. For example, low base station capability means no or low ability of baseband signal processing, scheduling and controlling data transmissions. The low base station capability TRP may transmit data to UEs. An example of a TPR with low base station capability is a relay or IAB. Medium base station capability means medium ability of scheduling and controlling data transmissions. An example of a TRP with medium capability is a TRP having capabilities of baseband signal processing and transmission, or a TRP worked as a distributed antenna having a baseband signal processing capability and transmission capability. High base station capability means with full or most of the ability of scheduling and controlling data transmission. Such an example is the terrestrial base stations. On the other hand, no base station capability means not only no ability of scheduling and controlling data transmissions, but also cannot transmit data to UE with a role like a base station. A TRP with no base station capability can act as a UE, or a distributed antenna worked as a remote radio unit, or a radio frequency transmitter having no signal processing capability, scheduling and controlling capabilities. It is noted that, the base station capabilities in this disclosure are just examples, and not limited to these examples. The base station capabilities may have other classifications based on the demand.

In some embodiments, different non-terrestrial TRPs in a communication system are categorized as non-terrestrial TRPs with: no base station capability, low base station capability, medium base station capability and high base station capability. A TRP with no base station capability acts as a UE, whereas a non-terrestrial TRP with high base station capability has similar functionality to a terrestrial base station. Examples of TRPs with low base station capabilities, medium base station capabilities and high base station capabilities are provided elsewhere herein. Non-terrestrial TRPs with different base station capabilities might have different network requirements or network costs in a communication system.

In some embodiments, a TRP is capable of switching between high, medium and low base station capabilities. For example, a non-terrestrial TRP with relatively high base station capabilities can switch to act as a non-terrestrial TRP with relatively low base station capabilities, e.g. a non-terrestrial TRP with high base station capabilities can act as a non-terrestrial TRP with low base station capabilities for power savings. In another example, a non-terrestrial TRP with low, medium or high base station capabilities can also switch to act as a non-terrestrial TRP with no base station capabilities such as a UE.

Different types of TRPs can also have different network configurations or designs. For example, different types of TRPs may communicate with the UEs using different mechanisms. In contrast, multiple TRPs that are all the same type of TRP may use the same mechanisms to communicate with UEs. Different mechanisms of communication could include the use of different air interface configurations or air interface designs, for example. Different air interface designs could include different waveforms, different numerologies, different frame structures, different channelization (for example, channel structure or time-frequency resource mapping rules), and/or different retransmission mechanisms.

Control channel search spaces can also vary for different types of TRPs. In one example, when the non-terrestrial TRPs 16, 18, 20 are all different types of TRPs, each of the non-terrestrial TRPs 16, 18, 20 may have different control channel search spaces. Control channel search spaces may also vary for different communication systems or subsystems. For example, the terrestrial TRPs 14a-14b in the terrestrial communication 30 can be configured with a different control channel search space than the non-terrestrial TRPs 16, 18, 20 in the non-terrestrial communication system 40. At least one terrestrial TRP may have the ability to support or be configured with a larger control channel search space than at least one non-terrestrial TRP.

The terrestrial UE 12 is configured to communicate with the terrestrial communication system 30, the non-terrestrial communication system 40, or both. Similarly, the non-terrestrial UE 22 is configured to communicate with the terrestrial communication system 30, the non-terrestrial communication system 40, or both. FIGS. 1B to 1E illustrate double-headed arrows that each represent a wireless connection between a TRP and a UE, or between two TRPs. A connection, which may also be referred to as a wireless link or simply a link, enables communication (i.e., transmission and reception) between two devices in a communication system. For example, a connection can enable communication between a UE and one or multiple TRPs, between different TRPs, or between different UEs. A UE can form one or more connections with terrestrial TRPs and/or non-terrestrial TRPs in a communication system. In some cases, a connection is a dedicated connection for unicast transmission. In other cases, a connection is a broadcast or multicast connection between a group of UEs and one or multiple TRPs. A connection could support uplink, downlink, sidelink, inter-TRP link and/or backhaul channels. A connection could also support control channels and/or data channels. In some embodiments, different connections could be established for control channels, data channels, uplink channels and/or downlink channels between UE and one or multiple TRPs. This is an example of decoupling control channels, data channels, uplink channels, sidelink channels and/or downlink channels.

Figure 1B:
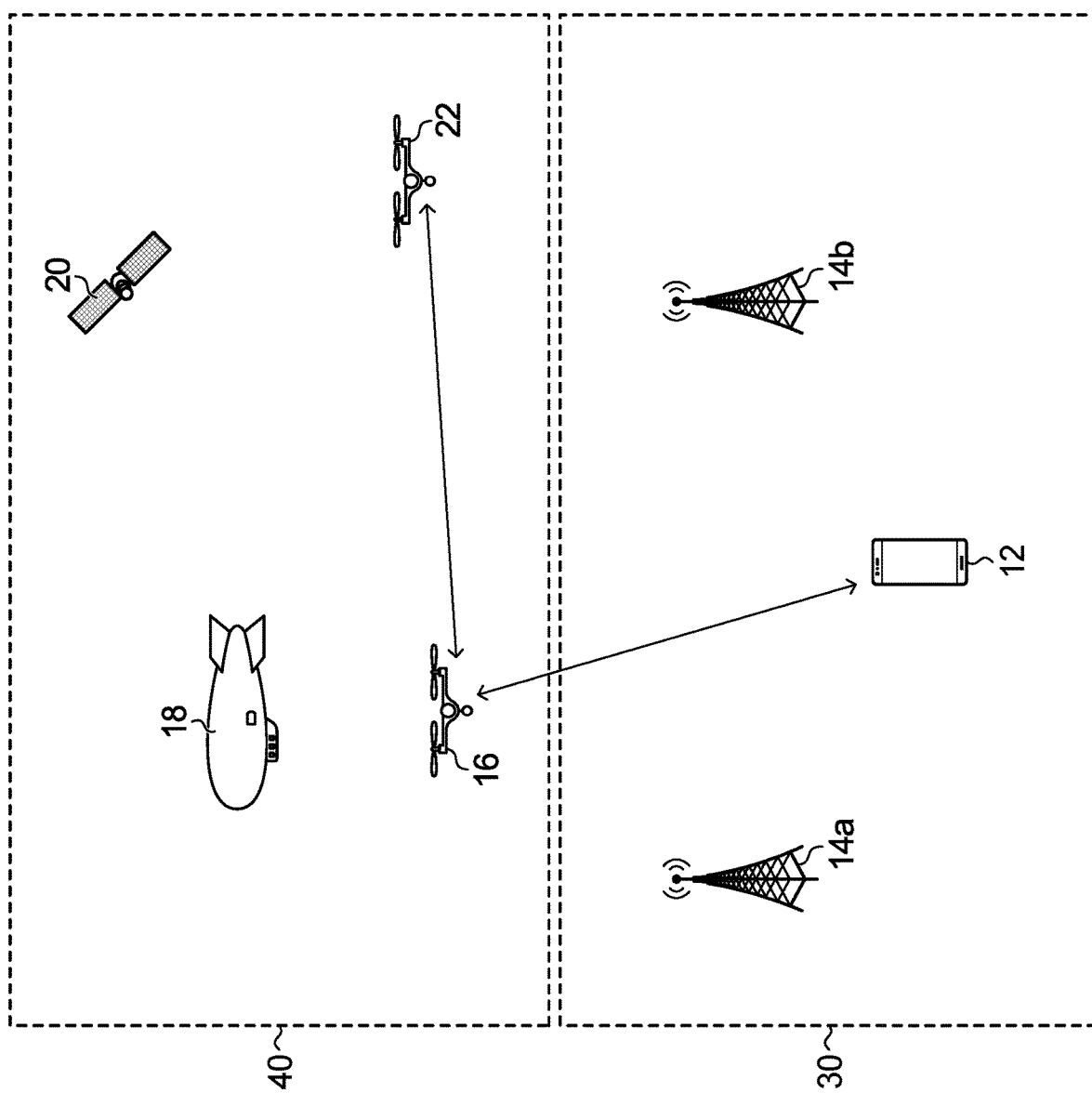

Referring to FIG. 1B, shown is the terrestrial UE 12 and the non-terrestrial UE 22 each having a connection to the non-terrestrial TRP 16. Each connection provides a single link that could provide wireless access to the terrestrial UE 12 and the non-terrestrial UE 22. In some implementations, multiple flying TRPs could be connected to a terrestrial or non-terrestrial UE to provide multiple parallel connections to the UE.

As noted above, a flying TRP may be a moveable or mobile TRP that can be flexibly deployed in different locations to meet network demand. For example, if the terrestrial UE 12 is suffering from poor wireless service in a particular location, the non-terrestrial TRP 16 may be repositioned to the location close to the terrestrial UE 12 and connect to the terrestrial UE 12 to improve the wireless service. Accordingly, non-terrestrial TRPs can provide regional service boosts based on network demand.

Non-terrestrial TRPs can be positioned closer to UEs and may be able to more easily form a line-of-sight connection to the UEs. As such, transmit power at the UE might be reduced, which leads to power savings. Overhead reduction may also be achieved by providing wide-area coverage for a UE, which could result in reducing the number of cell-to-cell handovers and initial access procedures that the UE may perform, for example.

Figure 1C:
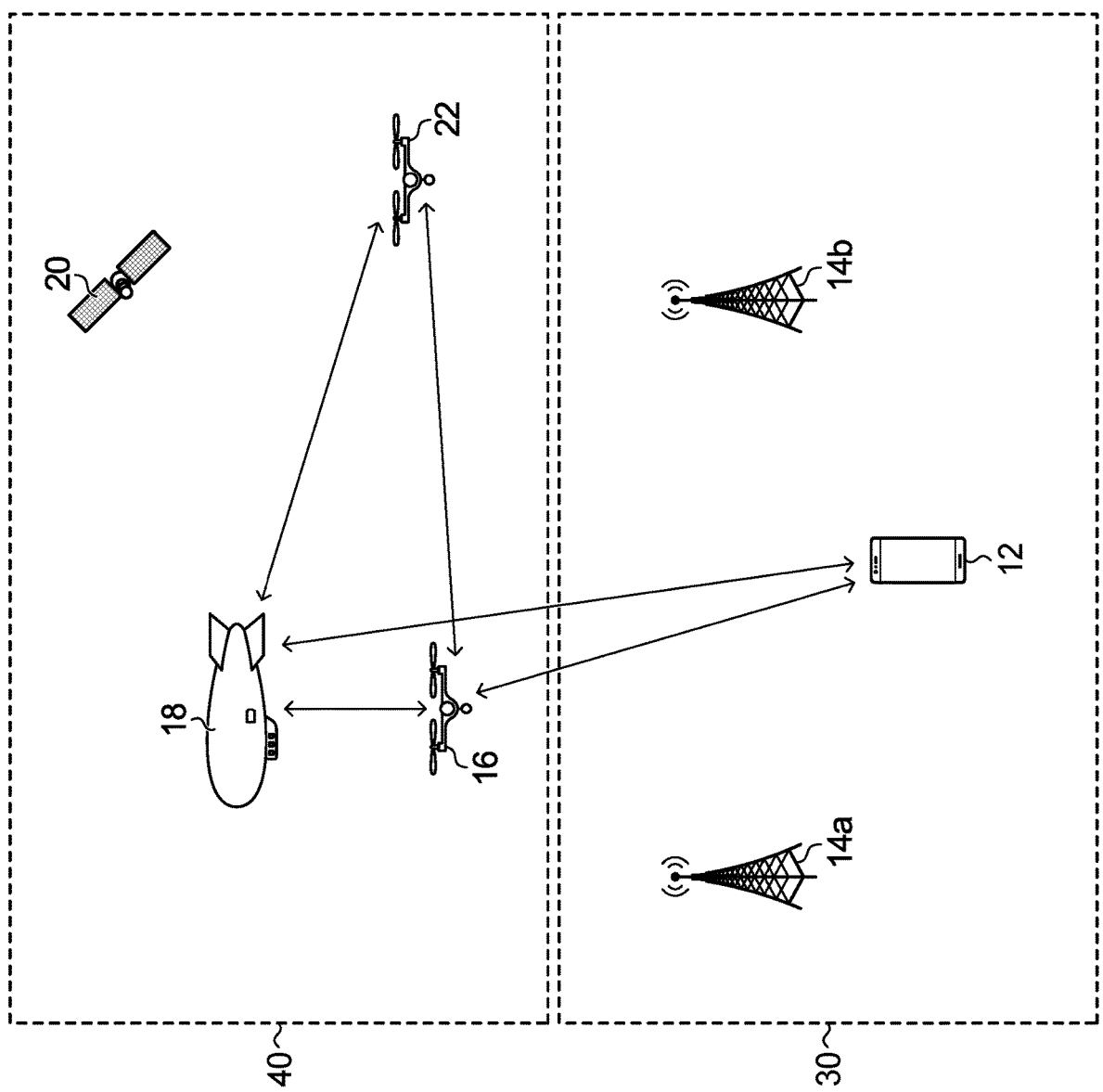

FIG. 1C illustrates an example of UEs having connections to different types of flying TRPs. FIG. 1C is similar to FIG. 1B, but also includes connections between the non-terrestrial TRP 18 and the terrestrial UE 12 and the non-terrestrial UE 22. Further, a connection is formed between the non-terrestrial TRP 16 and the non-terrestrial TRP 18.

In some implementations, the non-terrestrial TRP 18 acts as an anchor node or central node to coordinate the operation of other TRPs such as the non-terrestrial TRP 16. A central node is an example of a controller in a communication system. For example, in a group of multiple flying TRPs, one of the flying TRPs could be designated as the central node. This central node then coordinates operation of the group of flying TRPs. The choice of a central node could be pre-configured or be actively configured by network, for example. The choice of central node could also be negotiated by multiple TRPs in a self-configured network. In some implementations, a central node is an airborne platform or a balloon, however this might not always be the case. In some embodiments, each non-terrestrial TRP in a group is fully under the control of a central node, and the non-terrestrial TRPs in the group do not communicate with each other. A central node is typically implemented by a high base station capability TRP. A non-terrestrial TRP with high base station capability can also act as a distributed node that is under the control of a central node.

The non-terrestrial TRP 16 can provide a relay connection from the non-terrestrial TRP 18 to either or both of the terrestrial UE 12 and the non-terrestrial UE 22. For example, communications between the terrestrial UE 12 and the non-terrestrial TRP 18 can be forwarded via the non-terrestrial TRP 16 acting as a relay node. Similar comments apply to communications between the non-terrestrial UE 22 and the non-terrestrial TRP 18.

A relay connection uses one or more intermediate TRPs, or relay nodes, to support communication between a TRP and a UE. For example, a UE may be trying to access a high base station capability TRP, but the channel between the UE and the high base station capability TRP is too poor to form a direct connection. In such a case, one or more flying TRPs may be deployed as relay nodes between the UE and the high base station capability TRP to enable communication between the UE and the high base station capability TRP. A transmission from the UE could be received by one relay node and forwarded along the relay connection until the transmission reaches the high base station capability TRP. Similar comments apply to a transmission from high base station capability TRP to the UE. In a relay connection, each relay node that is traversed by a communication in a relay connection is referred to as a "hop". Relay nodes may be implemented using low base station capability TRPs.

Figure 1D:
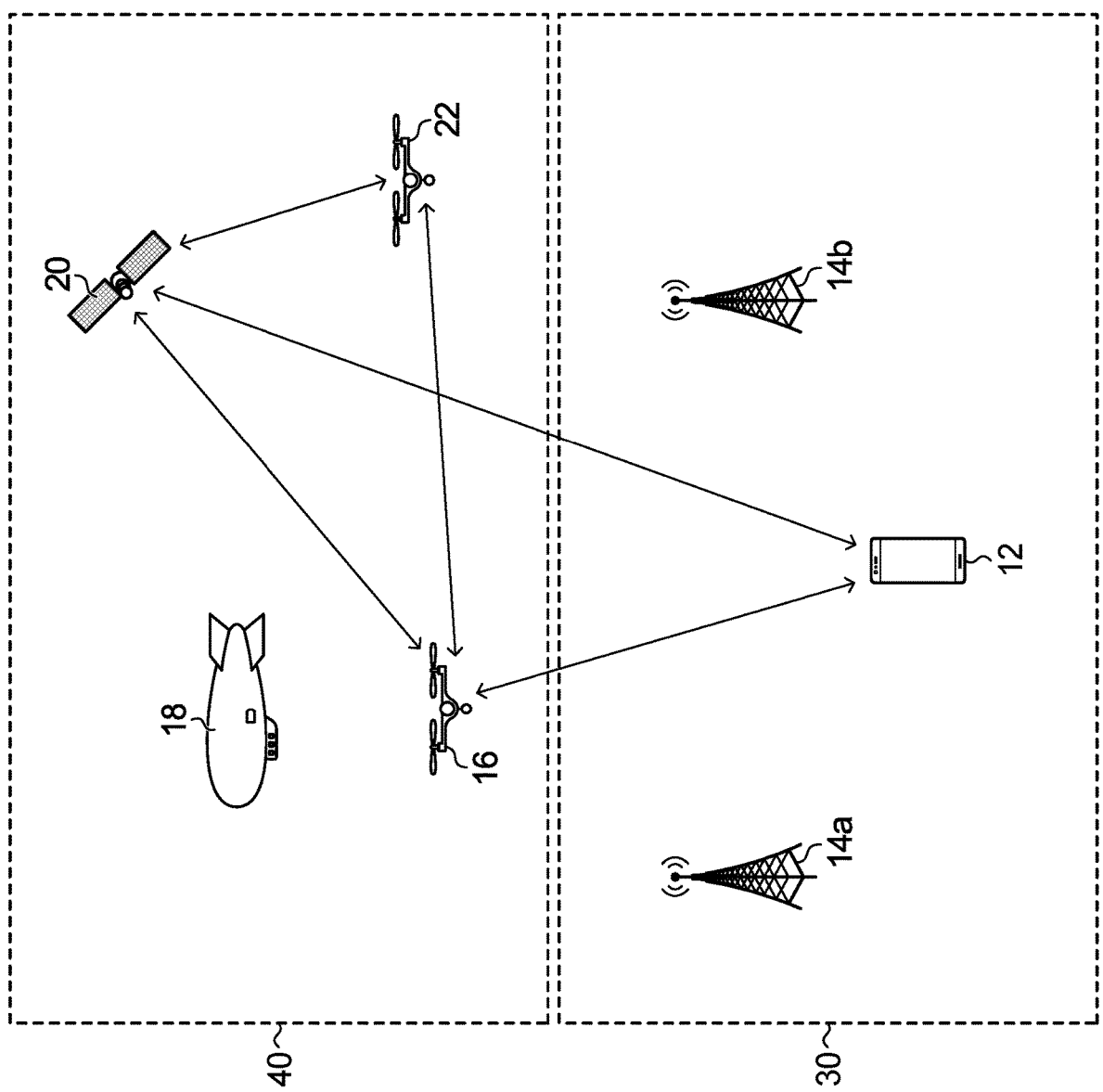

FIG. 1D illustrates an example of UEs having connections to a flying TRP and to a satellite TRP. Specifically, FIG. 1D illustrates the connections shown in FIG. 1B, and additional connections between the non-terrestrial TRP 20 and the terrestrial UE 12, the non-terrestrial UE 22 and the non-terrestrial TRP 16. As the non-terrestrial TRP 20 is implemented using a satellite, the non-terrestrial TRP 20 may be able to form wireless connections to the terrestrial UE 12, the non-terrestrial UE 22 and the non-terrestrial TRP 16 even when these devices are in remote locations. In some implementations, the non-terrestrial TRP 16 could be implemented as a relay node between the non-terrestrial TRP 20 and the terrestrial UE 12, and between the non-terrestrial TRP 20 and the non-terrestrial UE 22, to help further enhance the wireless coverage for the terrestrial UE 12 and the non-terrestrial UE 22. For example, the non-terrestrial TRP 16 could boost the signal power coming from the non-terrestrial TRP 20. In FIG. 1D, the non-terrestrial TRP 20 could be a high base station capability TRP that optionally acts as a central node.

Figure 1E:
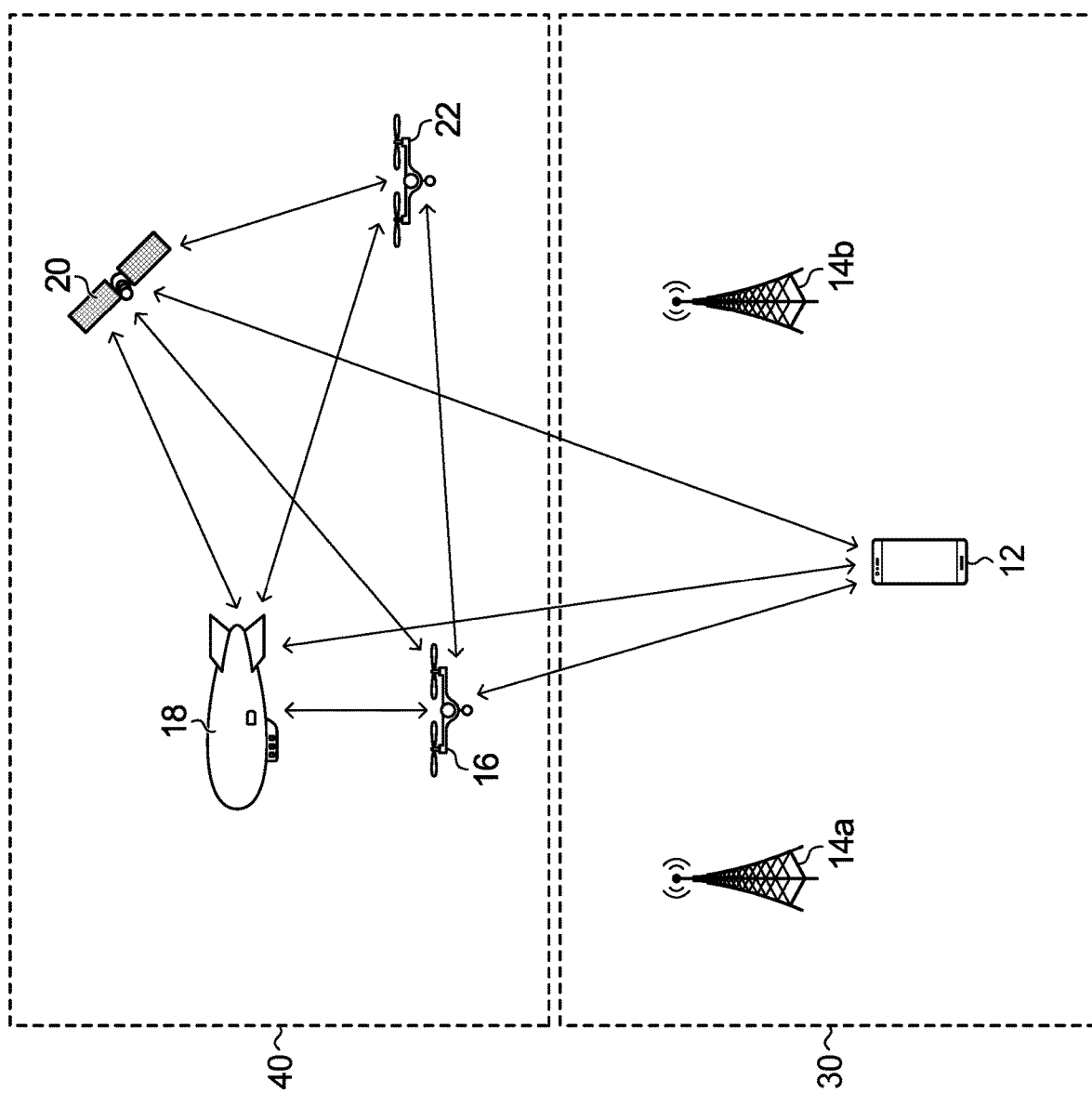

FIG. 1E illustrates a combination of the connections shown in FIGS. 1C and 1D. In this example, the terrestrial UE 12 and the non-terrestrial UE 22 are serviced by multiple different types of flying TRPs and a satellite TRP. The non-terrestrial TRPs 16, 18 could act as relay nodes in a relay connection to the terrestrial UE 12 and/or the non-terrestrial UE 22. In FIG. 1E, either or both of the non-terrestrial TRPs 18, 20 could be high base station capability TRPs that act as central nodes.

The non-terrestrial TRP 18 may simultaneously have two roles in the communication system 10. For example, the terrestrial UE 12 may have two separate connections, one to the non-terrestrial TRP 18 (via the non-terrestrial TRP 16), and the other to the non-terrestrial TRP 20 (via the non-terrestrial TRP 16 and the non-terrestrial TRP 18). In the connection to the non-terrestrial TRP 18, the non-terrestrial TRP 18 is acting as a central node. In the connection to the non-terrestrial TRP 20, the non-terrestrial TRP 18 is acting as a relay node. Additionally, the non-terrestrial TRP 18 can have wireless backhaul links with the non-terrestrial TRP 20, to enable coordination between the non-terrestrial TRPs 18, 20 to form the two connections for providing service to the terrestrial UE 12.

Figure 1F:
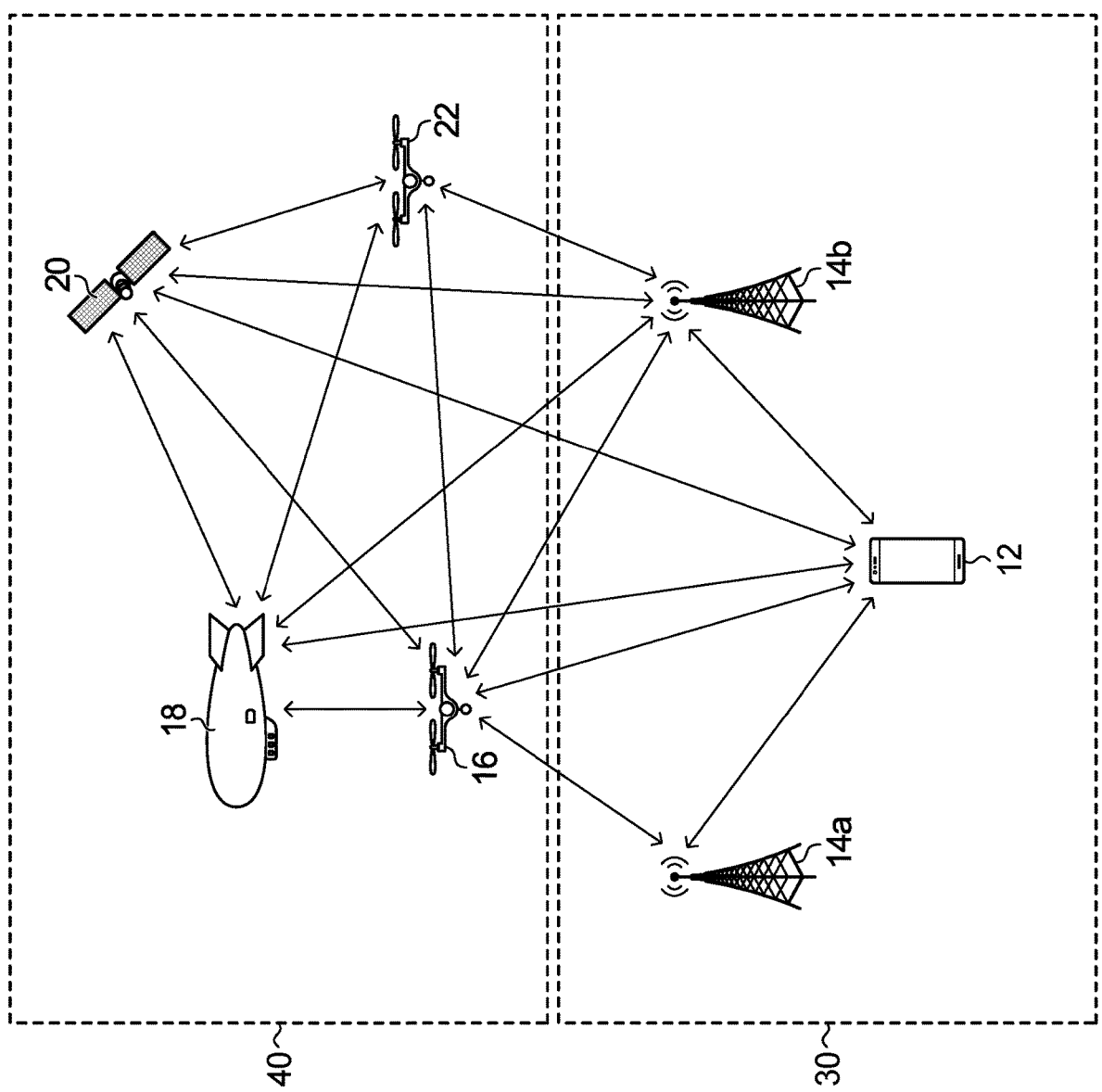

Referring now to FIG. 1F, shown is an example integration of the terrestrial communication system 30 and the non-terrestrial communication system 40. The integration of terrestrial and non-terrestrial communication systems may also be referred to as the joint operation of terrestrial and non-terrestrial communication systems. Conventionally, terrestrial communication systems and non-terrestrial communication systems have been deployed independently or separately.

In FIG. 1F, the terrestrial TRP 14a has connections to the non-terrestrial TRP 16, to the terrestrial UE 12, and to the other terrestrial TRP 14b. The terrestrial TRP 14b has further connections to each of the non-terrestrial TRPs 16, 18, 20, the terrestrial UE 12 and the non-terrestrial UE 22. Accordingly, the terrestrial UE 12 and the non-terrestrial UE 22 are both serviced by the terrestrial communication system 30 and the non-terrestrial communication system 40, and are able to benefit from the functionalities provided by each of these communication systems.

In some embodiments, a terrestrial communication system 30 provides a primary wireless service and a non-terrestrial communication system 40 provides global seamless coverage. For example, the terrestrial communication system 30 could provide coverage to population dense areas such as cities, while the non-terrestrial communication system 40 provides service to remote areas such as rural communities.

A non-terrestrial communication system 40, which is optionally integrated with a terrestrial communication system 30, can form a ubiquitous communication system. A ubiquitous communication system is one that provides wireless service or coverage to a relatively large area, up to and including the entire surface of the earth. A ubiquitous communication system may also be one that has few or even no regions where wireless service is unavailable. As such, a ubiquitous communication system may provide seamless wireless coverage. A non-terrestrial communication system can provide a ubiquitous communication system at least in part through the use of satellite TRPs and/or flying TRPs to provide service to remote areas that might not be serviced by terrestrial communication systems.

FIGS. 1C to 1F illustrate connections between UEs and various different types of TRPs. In general, a UE can monitor and/or enable one or multiple simultaneous connections to different types of TRPs in a communication system. This is an example of the joint operation of different types of TRPs and different types of connections. Multiple connections to a UE can be used to provide improved coverage and data rate boosts. For example, a UE may have multiple simultaneous connections to one or more flying TRPs and to one or more satellite TRPs. The UE could also have one or more connections to a terrestrial TRP such as a base station. Connections with terrestrial and non-terrestrial TRPs can be dynamically or semi-statically turned-on (i.e., established, activated or enabled), turned-off (i.e., released, deactivated or disabled) and/or configured in response to one of more of: connection availability, connection necessity, the location of the UE, the service requirements of the UE, and the radio environment surrounding the UE. Turning-on a connection with a TRP in a particular sub-system is also considered to be turning-on a connection to that sub-system. When the connection for a particular TRP type or sub-system is turned-on, in an example, a UE may start the blind detection of a control channel according to the search space defined for that type or sub-system. In another example, when the connection for a particular TRP type or sub-system is turned-on, a UE may start some functions such as synchronization and radio resource management measurements while not enabling the remaining functions such as the blind detection of a control channel for downlink or uplink data transmission. In some embodiments, the signaling carrying downlink control information (DCI) search space information also includes a TRP/sub-system indicator. When a UE forms multiple connections with different TRPs, the data packets that are transmitted between the UE and the multiple different TRPs could be the same or different.

The joint operation of multiple simultaneous connections to a UE can allow for functionality to be shared between the multiple connections. This shared functionality can result in overhead and power reduction in some cases. For example, a UE that has multiple active connections can use the most efficient connection (for example, the connection with the least attenuation and/or dispersion) to perform transmit and receive operations.

Monitoring multiple possible connections can provide flexibly for a UE. For example, connections between a UE and one or more TRPs can be actively turned-on to provide service boosts when required or appropriate. Connections between the UE and the TRPs can also be actively turned-off to provide power savings and overhead reduction when required or appropriate. Alternatively, certain functions in a connection between a UE and a TRP can be actively turned-on or turned-off to provide service boosts, power savings and overhead reduction when required or appropriate. The function(s) in a connection between a UE and a TRP may also be associated with a certain type of service.

FIGS. 2, 3A to 3C and 4 illustrate examples of systems and devices that could implement any or all aspects of the present disclosure.

Figure 2:
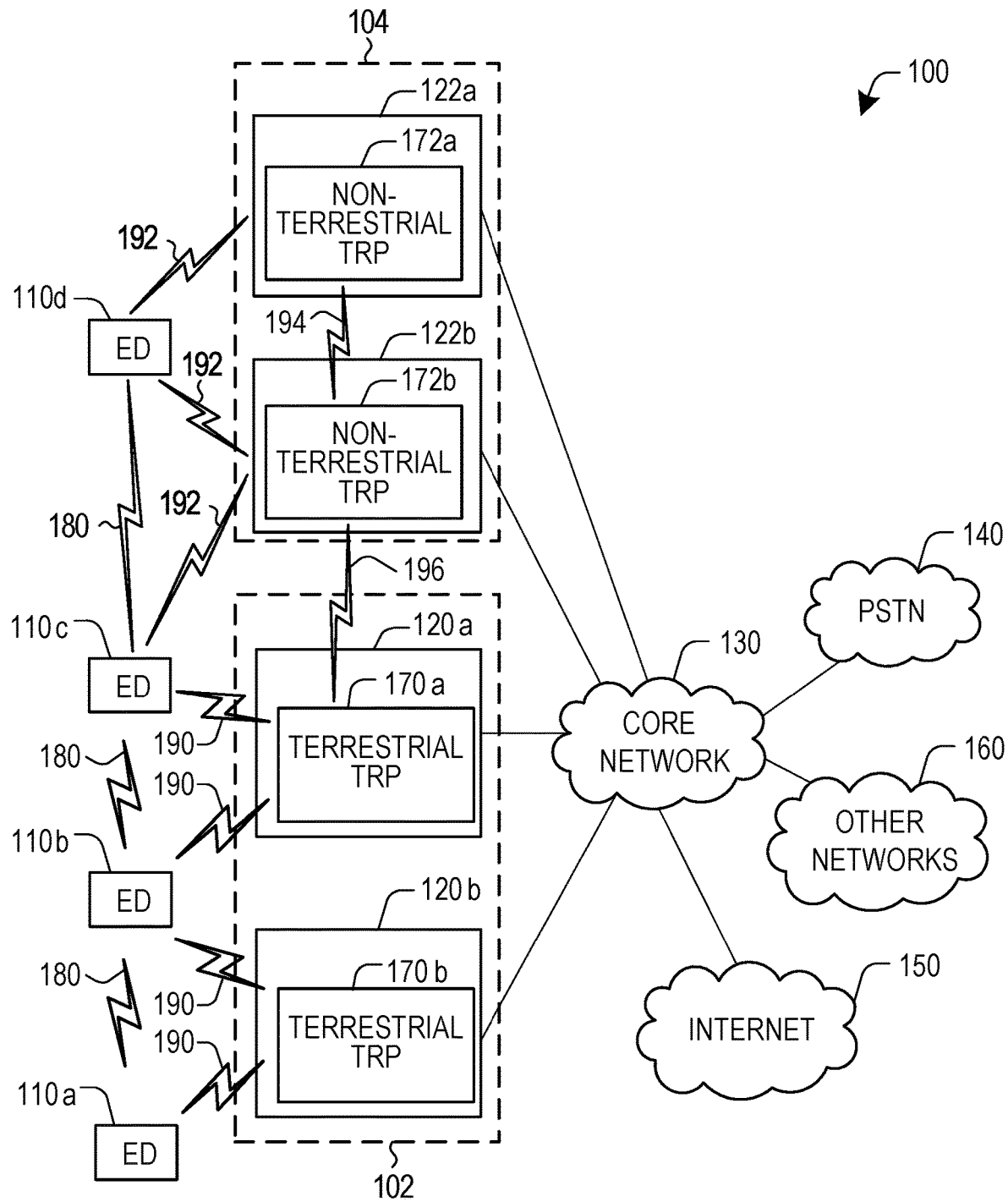
FIG. 2 is a schematic diagram of a communication system in which embodiments of the disclosure may occur.

FIG. 2 illustrates an example communication system 100. In general, the communication system 100 enables multiple wireless or wired elements to communicate data and other content. The purpose of the communication system 100 may be to provide content (voice, data, video, text) via broadcast, unicast, multimedia broadcast multicast service (MBMS), or user device to user device, etc. The communication system 100 may operate efficiently by sharing resources such as bandwidth. The communication system 100 may be suitable for wireless communications using 5G technology and/or later generation wireless technology (e.g., 6G or later). In some examples, the wireless system 100 may also accommodate some legacy wireless technology (e.g., 3G or 4G wireless technology).

In the illustrated example, the communication system 100 includes electronic devices (ED) 110a-110d, radio access networks (RANs) 120a-120b, 122a-122b, a core network 130, a public switched telephone network (PSTN) 140, the Internet 150, and other networks 160. Although certain numbers of these components or elements are shown in FIG. 2, any reasonable number of these components or elements may be included in the system 100.

The EDs 110a-110d are configured to operate, communicate, or both, in the system 100. For example, the EDs 110a-110d are configured to transmit, receive, or both via wireless communication channels or connections. Each ED 110a-110d represents any suitable end user device for wireless operation and may include such devices (or may be referred to) as a user equipment (UE)/device, wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, smart vehicle, or consumer electronics device. In some implementations, any or all of the EDs 110a-110d are terrestrial or non-terrestrial UEs.

In FIG. 2, the RANs 120a-120b include terrestrial TRPs 170a-170b, respectively. Each terrestrial TRP 170a-170b is configured to wirelessly interface with one or more of the EDs 110a-110c to enable access to any other terrestrial TRP 170a-170b, the core network 130, the PSTN 140, the internet 150, and/or the other networks 160. The terrestrial TRPs 170a-170b may include (or be) one or more of several well-known devices, such as a base station, a base transceiver station (BTS), a Node-B (NodeB), an evolved NodeB (eNodeB), a Home eNodeB, a gNodeB, a site controller, an access point (AP), or a wireless router, at least some of which have high base station capabilities. Any ED 110a-110c may be alternatively or additionally configured to interface, access, or communicate with any other terrestrial TRP 170a-170b, the internet 150, the core network 130, the PSTN 140, the other networks 160, or any combination of the preceding. The communication system 100 may include RANs, such as RAN 120b, wherein the corresponding terrestrial TRP 170b accesses the internet 150 via the core network 130.

In the communication system 100, the RANs 120a-120b and the terrestrial TRPs 170a-170b form at least a portion of a terrestrial communication system 102 that provides a terrestrial wireless network. The implementation of the terrestrial TRPs 170a-170b in the terrestrial communication system 102 is not limited herein. In some embodiments, the terrestrial communication system 102 could be similar to the terrestrial communication 30 of FIGS. 1A-1F, where the terrestrial TRPs 170a-170b correspond to the terrestrial TRPs 14a-14b. A terrestrial communication system can include physical cables or fibers to support communication within, to or from the terrestrial communication system. For example, either or both of the RANs 120a-120b may be in communication the core network 130 through a cable or fiber. Wireless backhauling, using microwave communications for example, could also be used in a terrestrial communication system. In some implementations, microwave communications can replace cables or fiber for communication within, to or from a terrestrial communication system.

The RANs 122a-122b include non-terrestrial TRPs 172a-172b, respectively. Each non-terrestrial TRP 172a-172b is configured to wirelessly interface with one or more of the EDs 110c-110d. Through a non-terrestrial TRP 172a-172b, one or more of the EDs 110c-110d have access to, or be in communication with, any other of the EDs 110a-110d, any RAN 120a-120b, any terrestrial TRP 170a-170b, the core network 130, the PSTN 140, the internet 150, and/or the other networks 160. In some implementations, the non-terrestrial TRPs 172a-172b have high base station capabilities and optionally function as a base station. For example, the non-terrestrial TRPs 172a-172b may function similarly to one or more of: a BTS, a NodeB, an evolved eNodeB, a Home eNodeB, a gNodeB, a site controller, an access point (AP), or a wireless router. The non-terrestrial TRPs 172a-172b form at least a portion of a non-terrestrial communication system 104 that provides a non-terrestrial wireless network. The implementation of the non-terrestrial TRPs 172a-172b in the non-terrestrial communication system 104 is not limited herein. In some embodiments, the non-terrestrial communication system 104 could be similar to the non-terrestrial communication 40 of FIGS. 1A-1F, where the non-terrestrial TRPs 172a-172b correspond to any two of the non-terrestrial TRPs 16, 18, 20.

In some embodiments, the terrestrial communication system 102 and the non-terrestrial communication system 104 are integrated so that the EDs 110a-110d are able to benefit from the functionalities provided by each of these communication systems.

The EDs 110a-110c, terrestrial TRPs 170a-170b and non-terrestrial TRPs 172a-172b are examples of communication equipment that can be configured to implement some or all of the functionality described herein. In the embodiment shown in FIG. 2, the terrestrial TRP 170a forms part of the RAN 120a, which may include other terrestrial or non-terrestrial TRPs, controllers such as base station controller(s) (BSC) and radio network controller(s) (RNC), relay nodes, elements, and/or devices. Any terrestrial TRP 170a, 170b may be a single element, as shown, or multiple elements, distributed in the corresponding RAN, or otherwise. Also, the terrestrial TRP 170b forms part of the RAN 120b. The RAN 120b may include other terrestrial or non-terrestrial TRPs, elements, and/or devices.

The non-terrestrial TRP 172a forms part of the RAN 122a. The RAN 122a may include other terrestrial or non-terrestrial TRPs, controllers such as BSCs and RNCs, relay nodes, elements, and/or devices. Any of the non-terrestrial TRPs 172a-172b may be a single element, as shown, or multiple elements. In some implementations, either or both of the non-terrestrial TRPs 172a-172b transmit and/or receive wireless signals within a particular geographic region or area, which may also be referred to as a "beam sport". More than one non-terrestrial TRP can be used to transmit and/or receive wireless signals within a particular beam spot. In some embodiments, multiple transceivers could be used by a non-terrestrial TRP.

Each TRP, including any one of the terrestrial TRP 170a-170b and the non-terrestrial TRPs 172a-172b, transmits and/or receives wireless signals within a particular geographic region or area, sometimes referred to as a "cell" or "coverage area". A cell may be further divided into cell sectors, and a terrestrial TRP 170a-170b or a non-terrestrial TRP 172a-172b may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. Alternatively, more than one TRP may form one cell, where the multiple TRPs in the cell may share a same cell identifier (ID). A cell comprising the multiple TRPs may be referred to as a hyper cell. The hyper cell may only comprise at least one terrestrial TRP or only comprise at least one non-terrestrial TPR. The hyper cell may also comprise at least one terrestrial TRP and at least one non-terrestrial TRP. A cell or a hyper cell may comprise TRPs of same type, TRPs of different type, TRPs belonging to the same sub-system, or TRPs belonging to different sub-systems. For example, a cell or a hyper cell for an area covered by a beam spot or multiple beam spots which are generated by satellite TRP(s) can further include one or more other type of terrestrial TRPs or non-terrestrial TRPs. From the perspective of a UE, the hyper cell could be an area covered by a virtual access entity. The system can generate hyper cells that include multiple TRPs having the same cell ID. The system may adapt the hyper cells according to network topology, load distribution, and UE distribution. The system may dynamically update the hyper cell topology to adapt to changes in network topology, load distribution, and/or UE distribution.

The number of RAN 120a-120b, 122a-122b shown is exemplary only. Any number of RAN may be contemplated when devising the communication system 100.

The terrestrial TRPs 170a-170b communicate with one or more of the EDs 110a-110c over a wireless link 190 using wireless communication links, e.g. radio frequency (RF), microwave, infrared (IR), etc. The wireless link 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the wireless link 190.

A terrestrial TRP 170a-170b may implement Universal Mobile Telecommunication System (UMTS) Terrestrial Radio Access (UTRA) to establish the wireless link 190 using wideband CDMA (WCDMA). In doing so, the terrestrial TRP 170a-170b may implement protocols such as High Speed Packet Access (HSPA), Evolved HPSA (HSPA+) optionally including High Speed Downlink Packet Access (HSDPA), High Speed Packet Uplink Access (HSUPA) or both. Alternatively, a terrestrial TRP 170a-170b may establish the wireless link 190 with Evolved UTMS Terrestrial Radio Access (E-UTRA) using LTE, LTE-A, LTE-B, 5G New Radio (NR) and/or 6G. It is contemplated that the communication system 100 may use multiple channel access functionality, including such schemes as described above. Other radio technologies for implementing wireless links include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The non-terrestrial TRPs 172a-172b communicate with one or more of the EDs 110c-110d over a wireless link 192 using wireless communication links, e.g. RF, microwave, IR, etc. The wireless link 192 may utilize any suitable radio access technology. For example, the communication system 100 may implement one or more orthogonal or non-orthogonal channel access methods, such as CDMA, TDMA, FDMA, OFDMA, or SC-FDMA in the wireless link 192.

A non-terrestrial TRP 172a-172b may implement UTRA to establish the wireless link 192 using WCDMA. In doing so, the non-terrestrial TRPs 172a-172b may implement protocols such as HSPA, HSPA+ optionally including HSDPA, HSUPA or both. Alternatively, a non-terrestrial TRP 172a-172b may establish the wireless link 192 with E-UTRA using LTE, LTE-A, LTE-B, 5G NR and/or 6G. As noted above, other radio technologies for implementing wireless links include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized. The wireless link 192 may be substantially similar to the wireless link 190, or they may be substantially different.

The non-terrestrial TRPs 172a-172b communicate with each other over a wireless link 194, and the non-terrestrial TRP 172b communicates with the terrestrial TRP 170a over an wireless link 196. The wireless links 194, 196 can provide a relay or backhaul connection between the non-terrestrial TRPs 172a-172b and the terrestrial TRP 170a. In some embodiments, another terrestrial TRP and/or RAN may be designated to communicate with either or both of the non-terrestrial TRPs 172a-172b via the wireless link 196 to provide a relay or backhaul connection for the non-terrestrial TRPs 172a-172b.

The wireless links 194, 196 may utilize any suitable radio access technology. For example, the communication system 100 may implement one or more orthogonal or non-orthogonal channel access methods, such as CDMA, TDMA, FDMA, OFDMA, or SC-FDMA in the wireless links 194, 196. A non-terrestrial TRP 172a-172b may implement UTRA to establish a wireless link 194, 196 using WCDMA. In doing so, the non-terrestrial TRPs 172a-172b may implement protocols such as HSPA, HSPA+ optionally including HSDPA, HSUPA or both. Alternatively, a non-terrestrial TRP 172a-172b may establish a wireless link 194, 196 with E-UTRA using LTE, LTE-A, LTE-B, 5G NR and/or 6G. As noted above, other radio technologies for implementing wireless links include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized. The wireless links 194, 196 may be substantially similar to the wireless link 190 or the wireless links 192, or they may be substantially different.

The RANs 120a-120b are in communication with the core network 130 to provide the EDs 110a-110d with various services such as voice, data, and other services. The RANs 122a-122b are also in communication with the core network 130. Optionally, the RANs 122a-122b are directly connected to the core network, or are indirectly connected to the core network 130 via the RANs 120a-120b. The RANs 120a-120b, 122a-122b and/or the core network 130 may be in direct or indirect communication with one or more other RANs (not shown), which may or may not be directly served by core network 130, and may or may not employ the same radio access technology as any or all of the RANs 120a-120b, 122a-122b. The core network 130 may also serve as a gateway access between (i) the RANs 120a-120b, 122a-122b or EDs 110a-110d or both, and (ii) other networks (such as the PSTN 140, the internet 150, and the other networks 160).

It should be noted that the non-terrestrial TRPs 172a-172b could connect directly to the core network 130, however this might not always be the case. Either or both of the non-terrestrial TRPs 172a-172b could instead connect to the core network 130 through one or more terrestrial TRPs. These terrestrial TRPs could be included in the RANs 122a-122b in some cases.

The EDs 110a-110d communicate with one another over a sidelink (SL) wireless link 180 using wireless communication links e.g. RF, microwave, IR, etc. The SL wireless link 180 may utilize any suitable radio access technology, and may be substantially similar to the wireless link 190, or they may be substantially different. For example, the communication system 100 may implement one or more channel access methods, such as CDMA, TDMA, FDMA, OFDMA, or SC-FDMA in the SL wireless link 180.

In some embodiments, any or all of the wireless links 180, 190, 192, 194, 196 are, at least in part, implemented over unlicensed spectrum.

Some or all of the EDs 110a-110d may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP) and user datagram protocol (UDP). EDs 110a-110d may be multimode devices capable of operation according to multiple radio access technologies, and incorporate multiple transceivers necessary to support multiple radio access technologies.

Figure 3A:
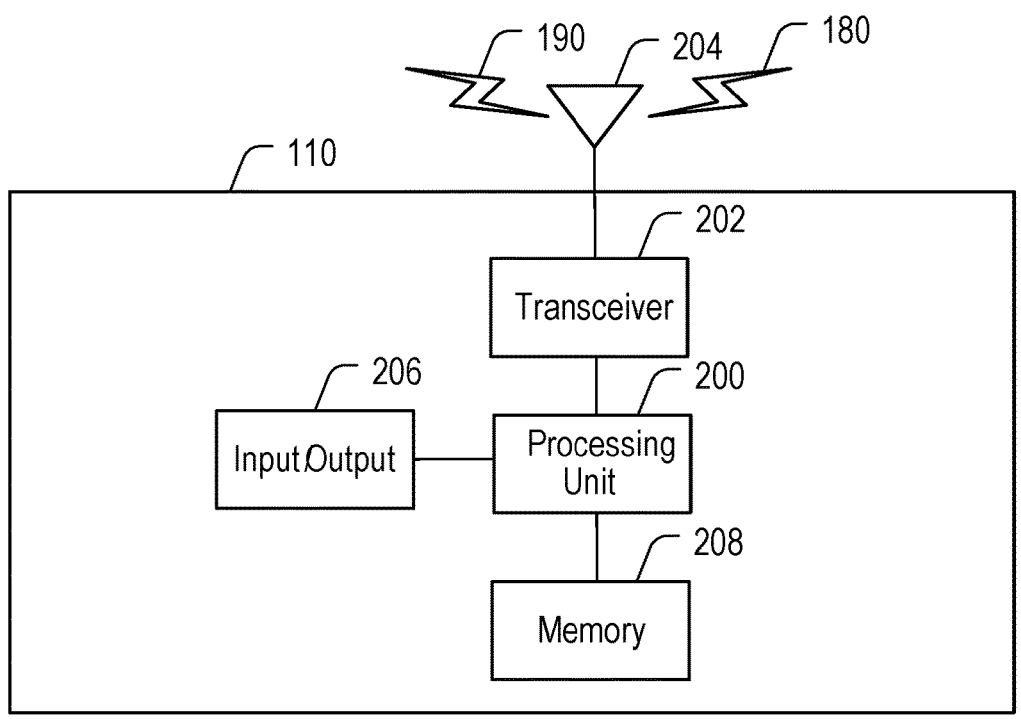
FIGS. 3A, 3B, and 3C are block diagrams of an example user equipment (UE), terrestrial transmission and receive point (TRP) and non-terrestrial TRP, respectively, according to embodiments of the present disclosure.
Figure 3B:
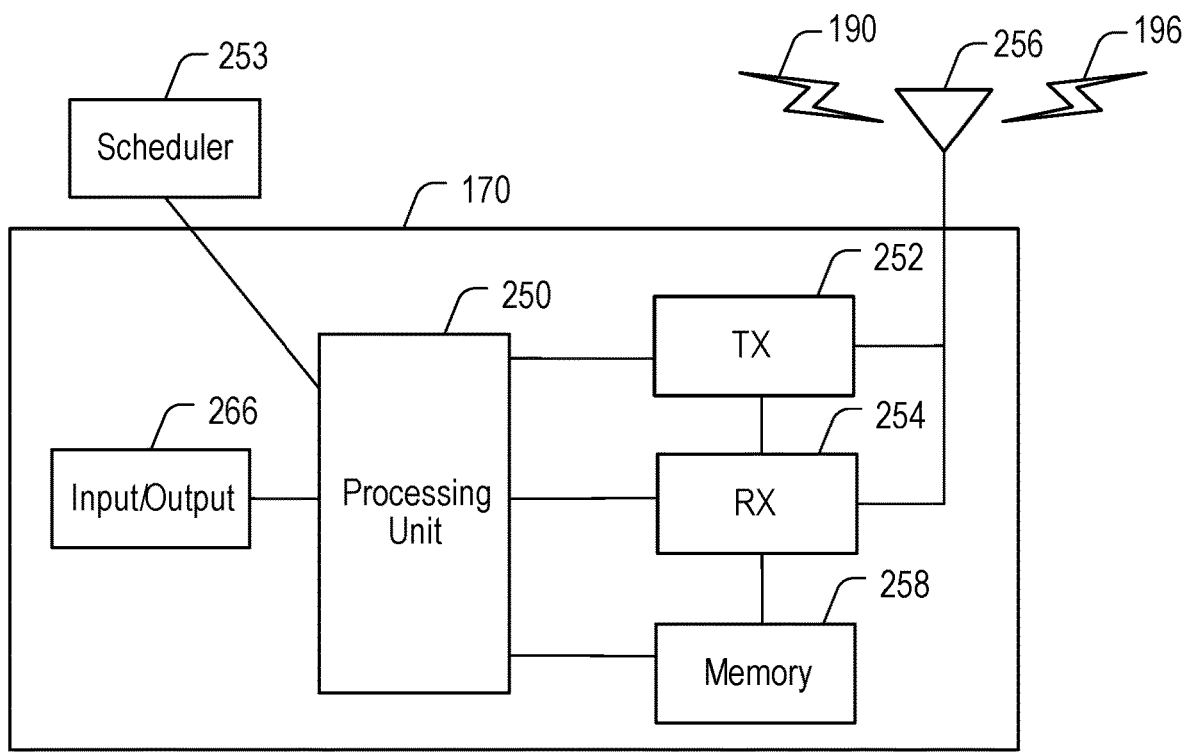
Figure 3C:
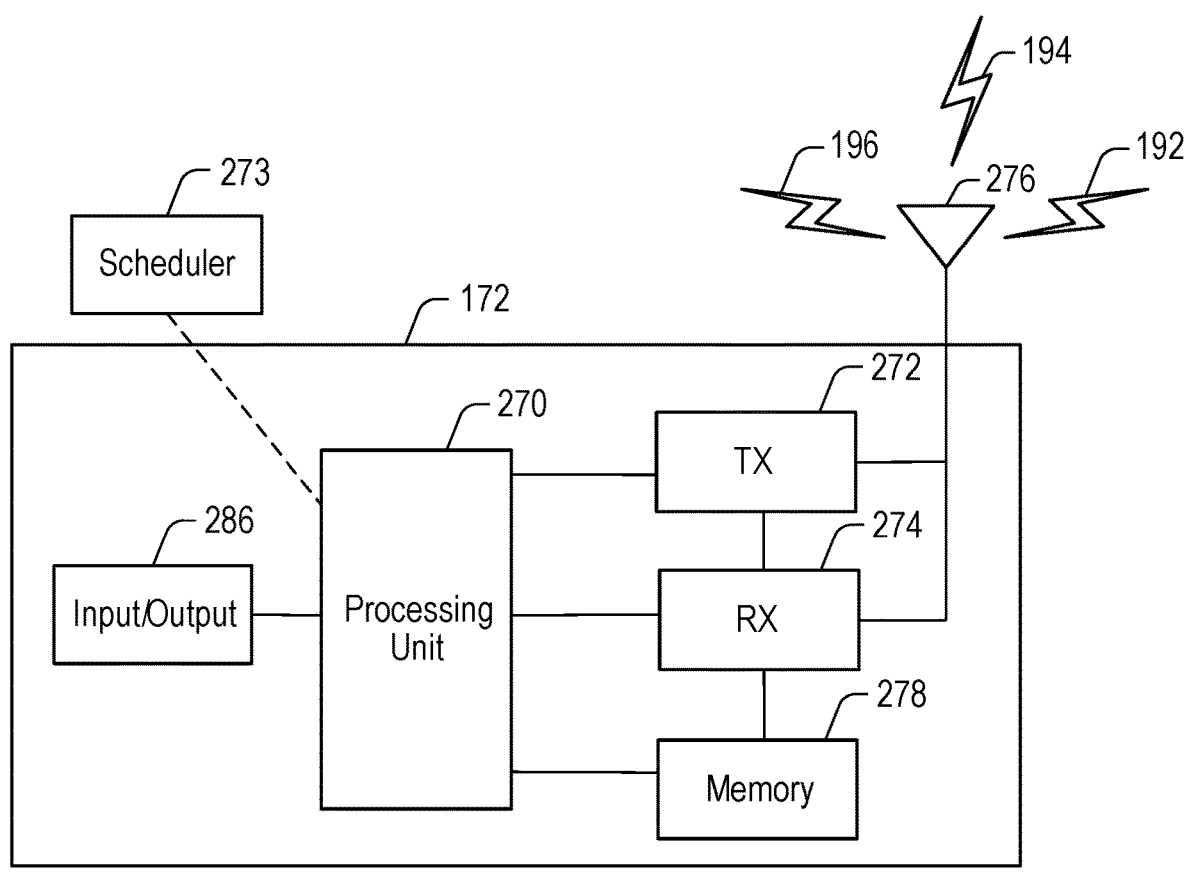

FIGS. 3A to 3C illustrate example devices that may implement the methods and teachings according to this disclosure. In particular, FIG. 3A illustrates an example ED 110, FIG. 3B illustrates an example terrestrial TRP 170 and FIG. 3C illustrates an example non-terrestrial TRP 172. These components could be used in the communication system 100 or in any other suitable system.

As shown in FIG. 3A, the ED 110 includes at least one processor or processing unit 200. The processing unit 200 implements various processing operations of the ED 110. For example, the processing unit 200 could perform signal coding, bit scrambling, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless transmission and/or processing signals received wirelessly. Each antenna 204 includes any suitable structure for transmitting and/or receiving wireless signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces. The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

In some implementations, the ED 110 is a non-terrestrial ED. For example, the ED 110 could include communication equipment carried by a flying device. The flying device could include a rotor, balloon or wings to provide lift for the system. A combustion or electric engine could power the rotor. A combustion or electric engine could also power a propeller to provide thrust to the flying device. A jet engine may also or instead be used to provide thrust. The flying device could also include other components such as a fuselage, rudders, flaps, stabilizers and landing gear, for example.

As shown in FIG. 3B, the terrestrial TRP 170 includes at least one processing unit 250, at least one transmitter 252, at least one receiver 254, one or more antennas 256, at least one memory 258, and one or more input/output devices or interfaces 266. The terrestrial TRP 170 is an example of a cellular TRP. In some implementations, the terrestrial TRP 170 is a base station. A transceiver, not shown, may be used instead of the transmitter 252 and receiver 254. A scheduler 253 may be coupled to the processing unit 250. The scheduler 253 may be included within or operated separately from the terrestrial TRP 170. The processing unit 250 implements various processing operations of the terrestrial TRP 170, such as signal coding, bit scrambling, data processing, power control, input/output processing, or any other functionality. The processing unit 250 can also be configured to implement some or all of the functionality and/or embodiments described in more detail elsewhere herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless transmission to one or more EDs or other devices. Each receiver 254 includes any suitable structure for processing signals received wirelessly from one or more EDs or other devices. Although shown as separate components, at least one transmitter 252 and at least one receiver 254 could be combined into a transceiver. Each antenna 256 includes any suitable structure for transmitting and/or receiving wireless signals via the wireless links 190, 196. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the terrestrial TRP 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Referring now to FIG. 3C, the non-terrestrial TRP 172 includes at least one processing unit 270, at least one transmitter 272, at least one receiver 274, one or more antennas 276, at least one memory 278, and one or more input/output devices or interfaces 286. A transceiver, not shown, may be used instead of the transmitter 272 and receiver 274. An optional scheduler 273 may be coupled to the processing unit 270. The scheduler 273 may be included within or operated separately from the non-terrestrial TRP 172. The processing unit 270 implements various processing operations of the non-terrestrial TRP 172, such as signal coding, bit scrambling, data processing, power control, input/output processing, or any other functionality. The processing unit 270 can also be configured to implement some or all of the functionality and/or embodiments described in more detail elsewhere herein. Each processing unit 270 includes any suitable processing or computing device configured to perform one or more operations. Each processing unit 270 could, for example, include a microprocessor, microcontroller, digital signal processor, field programmable gate array, or application specific integrated circuit.

Each transmitter 272 includes any suitable structure for generating signals for wireless transmission to one or more EDs or other devices. Each receiver 274 includes any suitable structure for processing signals received wirelessly from one or more EDs or other devices. Although shown as separate components, at least one transmitter 272 and at least one receiver 274 could be combined into a transceiver. Each antenna 276 includes any suitable structure for transmitting and/or receiving wireless signals via the wireless links 192, 194, 196. Although a common antenna 276 is shown here as being coupled to both the transmitter 272 and the receiver 274, one or more antennas 276 could be coupled to the transmitter(s) 272, and one or more separate antennas 276 could be coupled to the receiver(s) 274. Each memory 278 includes any suitable volatile and/or non-volatile storage and retrieval device(s) such as those described above in connection to the ED 110. The memory 278 stores instructions and data used, generated, or collected by the non-terrestrial TRP 172. For example, the memory 278 could store software instructions or modules configured to implement some or all of the functionality and/or embodiments described above and that are executed by the processing unit(s) 270.

Each input/output device 286 permits interaction with a user or other devices in the network. Each input/output device 286 includes any suitable structure for providing information to or receiving/providing information from a user, including network interface communications.

As noted above, the non-terrestrial TRP 172 may be coupled to a satellite or flying device to support the non-terrestrial TRP 172 above the earth's surface. Further details regarding the structure of a flying device are provided above.

It should be noted that in the communication systems disclosed herein, multiple connections to a UE or a TRP can all use the same component or module (for example, the same communication equipment) in the UE or TRP. There is may be no need for multiple terminals in a UE or TRP, where one terminal is used for communication with a first type of TRP and another terminal is used for communication with a second type of TRP. For example, the transceiver 202 shown in FIG. 3A can be used to communicate with various different types of TRPs. Similarly, each of the transmitters 252, 272 and the receivers 254, 274 can be used to communication with UEs and various different types of TRPs. The use of a single terminal is possible as the communication system configures the different types of TRPs based on a single wireless technology or standard.

Figure 4:
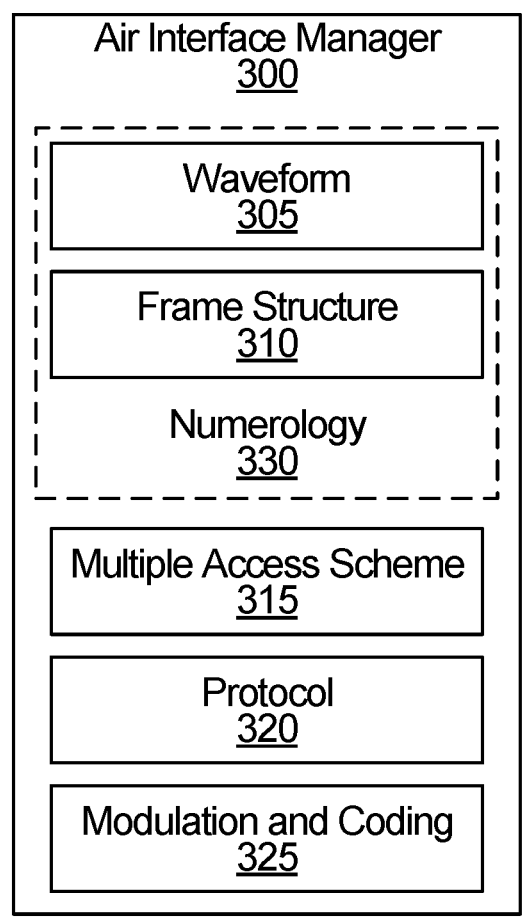
FIG. 4 is a block diagram of an air interface manager for configuring a software-configurable air interface according to an embodiment of the present disclosure.

FIG. 4 illustrates a schematic diagram of an air interface manager 300 for configuring an air interface. The air interface manager 300 may be, for example, a module that define the parameters of the air interface and collectively specify how a transmission is to be made and/or received by the air interface. In some embodiments, the air interface manager could be implemented to configure any or all of the wireless links 180, 190, 192, 194, 196. The air interface manager 300 could be implemented in the terrestrial TRP 170 or the non-terrestrial TRP 172. However, it should be noted that an air interface manager might not be implemented in some embodiments of the present disclosure, and should be considered optional.

The components of the air interface manger 300 include at least one of a waveform component 305, a frame structure component 310, a multiple access scheme component 315, a protocol component 320, and a modulation and coding component 325. In some embodiments, a scheduler could perform all the scheduling for a TRP. For example, a scheduler could perform the function of the waveform component 305, the frame structure component 310, the multiple access scheme component 315, the protocol component 320, and the modulation and coding component 325.

The waveform component 305 may specify a shape and form of a signal being transmitted. Waveform options may include orthogonal multiple access waveforms and non-orthogonal multiple access waveforms. Non-limiting examples of such waveform options include Single-Carrier (SC), Ultra Wideband (UWB), Frequency Modulated Continuous Wave (FMCW), Linear Frequency Modulated (LFM), Orthogonal Frequency Division Multiplexing (OFDM), Single-Carrier Frequency Division Multiple Access (SC-FDMA), Filtered OFDM (f-OFDM), Time windowing OFDM, Filter Bank Multicarrier (FBMC), Universal Filtered Multicarrier (UFMC), Generalized Frequency Division Multiplexing (GFDM), Wavelet Packet Modulation (WPM), Faster Than Nyquist (FTN) Waveform, low Peak to Average Power Ratio Waveform (low PAPR WF), Discrete Fourier Transform-spread-Orthogonal Frequency Domain Modulation (DFT-s-OFDM) and single carrier Offset Quadrature Amplitude Modulation (OQAM). In some embodiments, a combination of waveform options is possible. An LFM-OFDM waveform is a non-limiting example of such a combination. In some embodiments, pulse shaping in single-carrier based waveforms could be implemented, which provides a trade-off between spectrum efficiency and other performance metrics such as PAPR and sensitivity to time synchronous error, for example.

The frame structure component 310 may specify a configuration of a frame or group of frames. The frame structure component 310 may indicate one or more of a time, frequency, pilot signature, code, or other parameter of the frame or group of frames.

Non-limiting examples of frame structure options include: the number of symbols in the time slot, the number of time slots in the frame and the duration of each time slot (sometimes known as a transmission time interval (TTI), a transmission time duration, or a transmission time unit, TTU). The frame structure component may also specify whether the time slot is a configurable multi-level TTI, a fixed TTI, or a configurable single-level TTI. The frame structure component may further specify a co-existence mechanism for different frame structure configurations. The frame structure can be network slice/service specific. Alternatively, the frame structure can be tailored or personalized on a device-specific basis, for example using artificial intelligence and/or machine learning to provide device-specific air interface optimization. U.S. patent application Ser. No. 16/854,329, which is incorporated by reference herein in its entirety, presents embodiments for introducing new frame structures that go beyond a network slice/service specific frame structure to a personalized tailored frame structure that includes a personalized service type and a personalized frame structure setting. Thus, using artificial intelligence and/or machine learning to optimize a device-specific frame structure can achieve a new frame structure configuration to satisfy the requirement of each UE on an individual basis.

For some waveforms, such as certain OFDM-based waveforms, the frame structure component may also specify one or more associated waveform parameters, such as subcarrier spacing width, symbol duration, cyclic prefix (CP) length, channel bandwidth, guard bands/subcarriers, and sampling size and frequency.

Additionally, the frame structure component 310 may further specify whether the frame structure is used in a time-division duplex communication, a frequency-division duplex communication, or a full duplex communication.

Additionally, the frame structure component 310 may further specify the transmission state and/or direction for each symbol in a frame. For example, each symbol may independently be configured as a downlink symbol, an uplink symbol, or a flexible symbol.

Together, the specifications of the waveform component and the frame structure component are sometimes known as the "numerology." Thus, an air interface may include a numerology component 330 defining a number of air interface configuration parameters, such as the subcarrier spacing, CP length, symbol length, slot length, and symbols per slot.

These numerologies, also known as subcarrier spacing configurations or symbol duration configurations, may be scalable in the sense that subcarrier spacings of different numerologies are multiples of each other, and time slot lengths of different numerologies are also multiples of each other. Such a scalable design across multiple numerologies provides implementation benefits, for example scalable total OFDM symbol duration in a time division duplex (TDD) context.

Frames can be configured using one or a combination of scalable numerologies. For example, a numerology with 60 kHz subcarrier spacing has a relatively short OFDM symbol duration (because OFDM symbol duration varies inversely with subcarrier spacing), which makes the 60 kHz numerology particularly suitable for ultra-low latency communications, such as Vehicle-to-Any (V2X) communications. A further example of a numerology with a relatively short OFDM symbol duration suitable for low latency communications is a numerology with 30 kHz subcarrier spacing. A numerology with 15 kHz subcarrier spacing may be compatible with LTE. A numerology with 15 kHz subcarrier spacing may serve as a default numerology for initial access of a device to a network. This 15 kHz numerology may also be suitable for broadband services. A numerology with 7.5 kHz spacing, which has a relatively long OFDM symbol duration, may be particularly useful for coverage enhancement and broadcasting and multicasting. Additional uses for these numerologies will be or become apparent to persons of ordinary skill in the art. Of the four numerologies listed, those with 30 kHz and 60 kHz subcarrier spacings are more robust to Doppler spreading (fast moving conditions), because of the wider subcarrier spacing. It is further contemplated that different numerologies may use different values for other physical layer parameters, such as the same subcarrier spacing and different cyclic prefix lengths. In addition, subcarrier spacing may depend on the operational frequency band. For example, the subcarrier spacing in millimeter wave frequencies may be higher than in lower frequencies.

It is further contemplated that other subcarrier spacings may be used, such as higher or lower subcarrier spacings. For example, other subcarrier spacings varying by a factor of $2^n$ include 120 kHz and 3.75 kHz.

In other examples, a more limited scalability may be implemented, in which two or more numerologies all have subcarrier spacings that are integer multiples of the smallest subcarrier spacing, without necessarily being related by a factor of $2^n$. Examples include 15 kHz, 30 kHz, 45 kHz, 60 kHz subcarrier spacings.

In still other examples, non-scalable subcarrier spacings may be used, which are not all integer multiples of the smallest subcarrier spacing, such as 15 kHz, 20 kHz, 30 kHz, 60 kHz.

OFDM-based signals can be employed to transmit a signal in which multiple numerologies coexist simultaneously. More specifically, multiple sub-band OFDM signals can be generated in parallel, each within a different sub-band, and each sub-band having a different subcarrier spacing (and more generally with a different numerology). The multiple sub-band signals are combined into a single signal for transmission, for example for downlink transmissions. Alternatively, the multiple sub-band signals may be transmitted from separate transmitters, for example for uplink transmissions from multiple electronic devices (EDs), which may be user equipments (UEs). Non-OFDM-based waveforms may also be employed in some implementations.

The use of different numerologies can allow an air interface to support coexistence of a diverse set of use cases having a wide range of quality of service (QoS) requirements, such as different levels of latency or reliability tolerance, as well as different bandwidth or signaling overhead requirements. In one example, the base station can signal to the ED an index representing a selected numerology, or a single parameter (e.g., subcarrier spacing) of the selected numerology. Based on this signaling, the ED may determine the parameters of the selected numerology from other information, such as a look-up table of candidate numerologies stored in memory.

Continuing with the components of the air interface manager 300, the multiple access scheme component 315 may specify how access to a channel is granted for one or more EDs. In general, the multiple access technique options can be classified as scheduling/grant based multiple access or non-scheduling/non-grant based (i.e., scheduling free or grant free) multiple access, orthogonal multiple access or non-orthogonal multiple access, Time Division Multiple Access (TDMA), Frequency Division Multiple Access (FDMA), Code Division Multiple Access (CDMA), Space Division Multiple Access (SDMA), or any combinations thereof. Non-limiting examples of multiple access technique options include technologies defining how EDs share a common physical channel, such as: TDMA, FDMA, CDMA, SDMA, Single Carrier Frequency Division Multiple Access (SC-FDMA), Low Density Signature Multicarrier Code Division Multiple Access (LDS-MC-CDMA), Non-Orthogonal Multiple Access (NOMA), Pattern Division Multiple Access (PDMA), Lattice Partition Multiple Access (LPMA), Resource Spread Multiple Access (RSMA), and Sparse Code Multiple Access (SCMA). Any of these multiple access technique options may be implemented using one or more of: scheduled access; non-scheduled access, also known as grant-free access or configured grant access; non-orthogonal multiple access; orthogonal multiple access, e.g., via a dedicated channel resource (i.e., no sharing between multiple EDs); contention-based shared channel resource; non-contention-based shared channel resource; and cognitive radio-based access.

The protocol component 320 may specify how a transmission and/or a re-transmission are to be made. Non-limiting examples of transmission and/or re-transmission mechanism options include those that specify a scheduled data pipe size and a signaling mechanism for transmission and/or re-transmission. The re-transmission schemes include a physical layer re-transmission scheme using HARQ, a higher layer re-transmission scheme using ARQ, and a higher or physical layer rate-less code based re-transmission scheme.

The modulation and coding component 325 may specify how information being transmitted may be encoded/decoded and modulated/demodulated for transmission/reception purposes. Coding may refer to methods of error detection and forward error correction. Non-limiting examples of coding options include turbo code, turbo trellis codes, turbo product codes, fountain codes, low-density parity check codes, polar codes, and block code. Modulation may refer, simply, to Quadrature Amplitude Modulation (QAM), offset QAM (OQAM), specified by a complex constellation (including, for example, the modulation technique and order, e.g. 16QAM, 64QAM, etc.), or more specifically to various types of advanced modulation methods such as hierarchical modulation, multi-dimensional modulation, non-linear modulation and low Peak-to-Average Power Ratio (PAPR) modulation.

Because an air interface includes a plurality of components or building blocks, and each component may have a plurality of candidate technologies (also referred to herein as air interface capability options), the air interface manager 300 may configure and store a large number of different air interface profiles. Each air interface profile defines a respective set of air interface capability options.

For example, in each air interface profile defining a respective set of air interface capability options, an air interface capability option is selected for each of the component building blocks of the air interface. Each of the different air interface profiles may be targeted to meet a different set of transmission requirements, including transmission content, transmit condition, and receive condition.

According to the transmission requirements of a pair of communicating transmitting-receiving devices, one of the different air interface profiles that best meet the transmission requirements may be selected from the air interface manager 300 and used for communications between the pair of communicating transmitting-receiving devices.

In further embodiments, the air interface manager 300 may modify or update its components, profiles, or capability options. For example, the air interface manager 300 may replace the waveform and frame structure components 305, 310 with a single numerology component 330. Conversely, the air interface manager 300 may separate the modulation and coding component 325 into an individual coding component and an individual modulation component. Furthermore, the air interface manager 300 is configurable such that new soft air interface configuration components developed in the future should be able to be utilized.

The air interface manager 300 may also update certain components to modify the capability options of any given component. For example, the air interface manager 300 may update the modulation and coding component 325 to include higher-order modulation schemes.

By updating the stored components, profiles, and candidate options, the air interface manager 300 can flexibly adapt to better accommodate diverse wireless traffic types and services under diverse wireless channel conditions. Modifying or updating components, profiles, and candidate options may allow the air interface manager 300 to provide suitable air interface profiles for traffic types or services other than those already contemplated for ultra-reliable low latency communications (URLLC), enhanced mobile broadband (eMBB), and massive machine-type communications (mMTC).

In one example, the above related to the air interface manager 300 also refer to the base station capabilities and UE capabilities in the disclosure. Thus, different TPRs with different base station capabilities may involve different components or functions disclosed in the air interface manager 300. The disclosure is not limited to these.

Reference will now be made to FIGS. 5 to 10, which illustrate various examples of communication systems.

Figure 5:
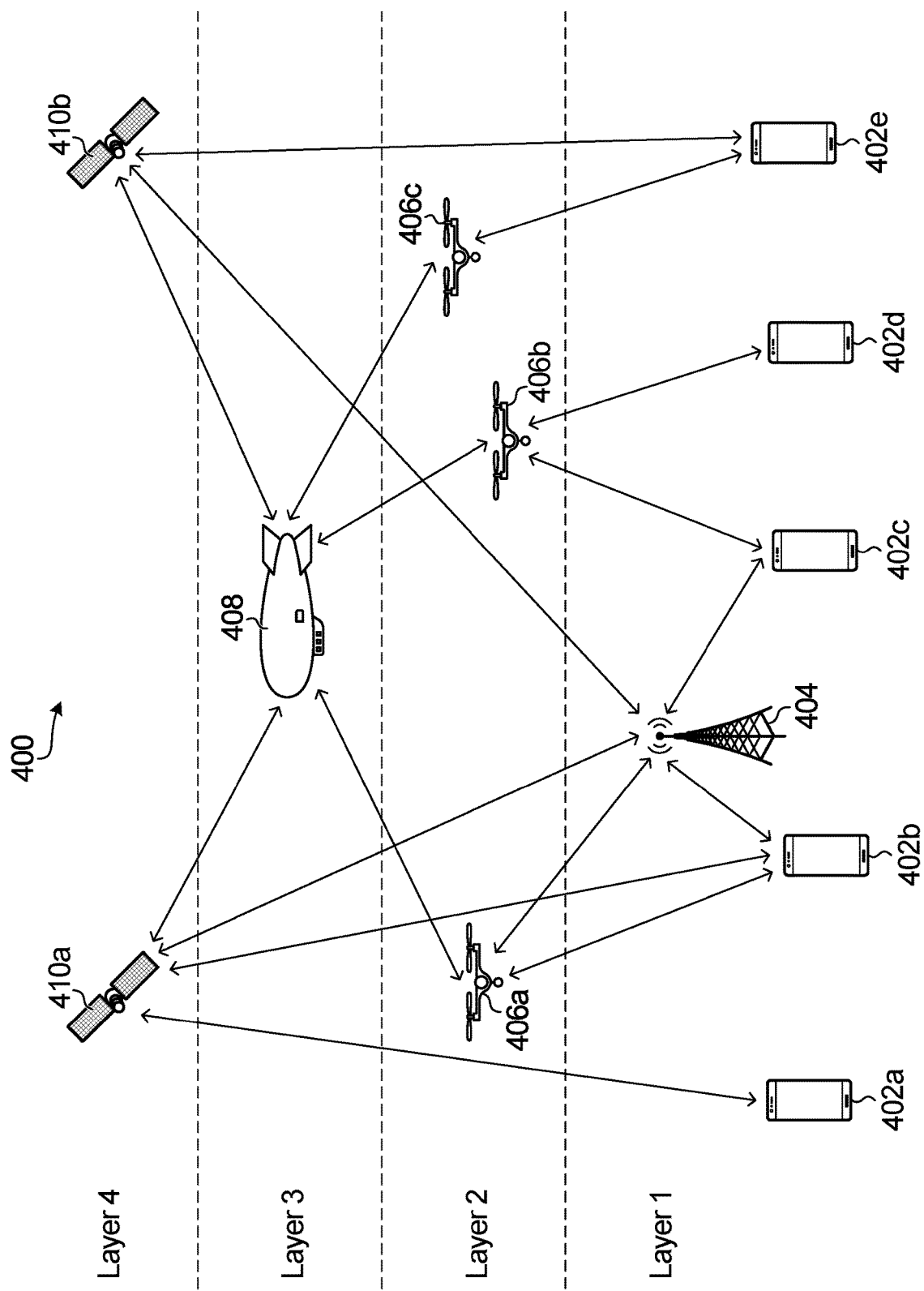
FIGS. 5 to 10 are diagrams illustrating communication systems according to embodiments of the present disclosure.

FIG. 5 is a diagram illustrating an integrated terrestrial and non-terrestrial communication system 400 according to an embodiment. The communication system 400 is an example of a 3D ubiquitous communication system.

The communication system 400 includes multiple UEs 402a-402e, a terrestrial TRP 404, multiple flying TRPs 406a-406c, 408 and multiple satellite TRPs 410a-410b. The flying TRPs 406a-406c, 408 and the satellite TRPs 410a-410b are examples of non-terrestrial TRPs. Although the flying TRPs 406a-406c are illustrated as quadcopters and the flying TRP 408 is illustrated as an airship, this is only example. The flying TRPs 406a-406c, 408 could instead be implemented using other flying devices. In some implementations, any or all of the flying TRPs 406a-406c, 408 are drones. The UEs 402a-402e could be terrestrial or non-terrestrial UEs. Examples of UEs, terrestrial TRPs and non-terrestrial TRPs are provided elsewhere herein. The number and position of the UEs 402a-402e, terrestrial TRP 404, flying TRPs 406a-406c, 408 and satellite TRPs 410a-410b are shown by way of example in FIG. 5. Other numbers and positions of such UEs and TRPs are also contemplated.

Any or all of the flying TRPs 406a-406c, 408 could have low, medium or high base station capabilities. By way of example, the flying TRPs 406a-406c could be low base station capability drones and the flying TRP 408 could be a high base station capability drone.

In the communication system 400, the terrestrial TRP 404 forms a terrestrial communication system or sub-system, and the flying TRPs 406a-406c, 408 and the satellite TRPs 410a-410b form a non-terrestrial communication system or sub-system. The area or region shown in FIG. 5 could include one or more base stations of the communication system 400. The UEs 402b-402c are inside of the coverage of the terrestrial TRP 404, whereas the UEs 402a, 402d-402e are outside of the coverage of the terrestrial TRP 404. Therefore, the UEs 402a, 402d-402e are served by the non-terrestrial communication system or sub-system. In some embodiments, the terrestrial TRP 404 could be omitted in the communication system 400, in which case the communication system 400 would be a non-terrestrial communication system.

The communication system 400 includes multiple different types of TRPs. For example, the terrestrial TRP 404 could be a first type of TRP, the flying TRPs 406a-406c could be a second type of TRP, the flying TRP 408 could be a third type of TRP, and the satellite TRPs 410a-410b could be a fourth type of TRP. In some implementations, the flying TRPs 406a-406c include more than one type of TRP. In some implementations, one or more of the TRPs in the communication system 400 are capable of dynamically switching between different TRP types. This action could be signaled by a central node or high base station capability TRP, for example.

The communication system 400 provides an example of a hierarchical network. A hierarchical network is a network that is divided into discrete layers or levels. In a non-terrestrial communication system that is optionally integrated with a terrestrial communication system, different layers could be defined by different types of TRPs and/or the corresponding range of altitudes, or range of heights above the earth's surface, that the different types of TRPs operate at. Such a hierarchical network may also be referred to as a multi-layer deployment of TRPs. In an example hierarchical network, a first layer includes terrestrial TRPs such as base stations, a second layer includes low-altitude TRPs such as quadcopter TRPs, a third layer includes medium-altitude and high-altitude TRPs such as airborne platform TRPs and balloon TRPs, and a fourth layer includes satellite TRPs.

FIG. 5 includes dashed lines that illustrate the multiple different layers of the communication system 400. Different types of TRPs are implemented in each layer of the communication system 400, which is an example of a multi-layer TRP deployment. Layer 1 includes the terrestrial TRP 404, layer 2 includes the flying TRPs 406a-406c, layer 3 includes the flying TRP 408, and layer 4 includes the satellite TRPs 410a-410b. In some cases, layer 1 may also include any or all of UEs 402a-402e, depending on the condition of the UEs 402a-402e. Layers 1, 2, 3 and 4 are each defined by a respective range of altitudes or heights above the earth's surface. In an example implementation of the communication system 400, layer 1 corresponds to ground-based TRPs (for example, heights between 0-100 m above the surface of the earth), layer 2 corresponds to low-altitude TRPs (for example, heights between 101-1,000 m above the surface of the earth), layer 3 corresponds to medium-altitude TRPs (heights between 1,001 m-100 km above the surface of the earth), and layer 4 corresponds to high-altitude and orbiting TRPs (for example, heights between 100 km and 2,000 km above the surface of the earth). In other embodiments, more or fewer layers could be implemented in a hierarchical communication system.

In the communication system 400, the UE 402a has a connection to the satellite TRP 410a; the UE 402b has a connection to the satellite TRP 410a, the flying TRP 406a and the terrestrial TRP 404; the UE 402c has a connection to the terrestrial TRP 404 and the flying TRP 406b; the UE 402d has a connection to the flying TRP 406b; the UE 402e has a connection to the flying TRP 406c and the satellite TRP 410b; the flying TRP 408 has a connection to the satellite TRPs 410a-410b and the flying TRPs 406a-406c; and the terrestrial TRP 404 further has a connection to the flying TRP 406a and the satellite TRPs 410a-410b.

In some implementations, the connections to the UEs 402a-402e provide control channels and/or data channels, and the connections between the terrestrial TRP 404, the flying TRPs 406a-406c, 408 and the satellite TRPs 410a-410b provide relaying and/or backhauling. Although the connections are shown with double-headed arrows, it should be noted that a connection might not always support two-way communications. For example, some connections may be designated for uplink communications, and some connections may be designated for downlink communications.

The number and arrangement of the connections in FIG. 5 are shown by way of example. In some implementations, these connections were formed after a search of all possible connections in the communication system 400, and a determination of the most suitable connections to achieve the desired wireless service. In general, each of these connections is considered optional, and each connection can be activated, deactivated and/or reconfigured depending on network demands. In particular, the arrangement of the connections may vary as the UEs 402a-402e, flying TRPs 406a-406c, 408 and/or satellite TRPs 410a-410b move over time.

The mechanisms through which communication is performed in each connection in the communication system 400 are not limited herein. In some implementations, each connection is configured based on one or more TRP types. For example, different air interface designs could be used for connections involving different types of TRPs. In some implementations, each connection is configured based on an associated layer of the communication system 400. Here, different air interfaces are used for different inter-layer and/or different intra-layer connections. For example, connections between a UE and a TRP in layer 1 could be configured according to a different air interface than connections between the UE and TRPs in layers 2, 3 and 4. In some implementations, different air interface designs are used for control channels, data channels, uplink channels, downlink channels and/or backhaul channels.

The communication system 400 includes several examples of multiple simultaneous connections being formed to different types of TRPs. In one example, the UE 402b has formed simultaneous connections with the satellite TRP 410a, the flying TRP 406a and the terrestrial TRP 404. The data packets that are transmitted between the UE 402b and the satellite TRP 410a, the flying TRP 406a and the terrestrial TRP 404 could be the same or different.

In some implementations, one or more of the flying TRPs 406a-406c, 408 and/or satellite TRPs 410a-410b perform communication broadcasting. For example, the connections to the satellite TRP 410*a* could represent a broadcast channel that is monitored by the UE 402*a*, the terrestrial TRP 404 and the flying TRP 408.

The multiple connections to the UE 402*b* can allow functionality to be shared between the different connections. Certain functions of a connection can turned-off if another connection is able to provide those functions. For example, a random access channel (RACH) may be turned-off in the connection between the UE 402*b* and the satellite TRP 110*a*. The RACH process is instead provided by the connection between the UE 402*b* and the flying TRP 406*a*, and/or the connection between the UE 402*b* and the terrestrial TRP 404. UE information for the UE 402*b* could be forwarded from the flying TRP 406*a* or the terrestrial TRP 404 to the satellite TRP 110*a*. This UE information can include access information, a UE position and other parameters or information which are needed for setting up the transmission link between satellite TRP and UE, for example. The communication of UE information between different TRPs may occur through backhaul connections. In some embodiments, a backhaul communication between TRPs can share the information for a group of UEs at the same time to save overhead.

The decision to turn-on certain connections in the communication system 400, and the decision not to turn-on other connections, could be based on measurement results or a UE's requirements. When multiple possible connections are available, a UE will search for a set of one or more appropriate connections that meet the requirements of the UE. Optionally, a connection can be turned-on or turned-off based on measurement results and reports that indicate the channel quality for the connection. Non-limiting examples of such measurements include synchronization signal measurement (e.g. received power), downlink reference signal measurement (e.g. channel state information (CSI), RSSP, RSSI) or the like that is measured by a UE, and/or RACH preamble measurement, uplink reference signal measurement or the like that is measured by a TRP. If the measurement corresponding to a connection falls outside of a predefined range, or below a predefined threshold, then the connection can be turned-off. Similarly, if a measurement corresponding to a connection falls inside of a predefined range, or above a predefined threshold, then the connection can be turned-on. This turn-on and turn-off decision could be made by the network, the UE or both. When multiple connections between a UE and one TRP, or multiple connections between a UE and multiple TRPs, meet the measurement requirement, i.e. the measurements are inside of a predefined range or are above a predefined threshold, the UE may report all connections to the network. In some embodiments, predefined thresholds and ranges can be different for different types of connections, different types of TRPs and/or different layers of a communication system. By way of example, the minimum received power level for a connection to a satellite TRP may be lower than the minimum received power level for a connection to a terrestrial TRP. In some embodiments, the thresholds and ranges may be signaled between the UE and the network. For example, a set of possible thresholds and range values for each type of connection may be predefined or signaled. The network (or UE) can decide which value from the set is used and signal the value to the UE (or network) through broadcast, multicast or unicast signaling in the physical layer, MAC layer, RRC layer or any combination thereof.

For example, in the communication system 400, the UE 402*d* may have not formed a connection to the flying TRP 460*c* as measurements for this connection are below a predefined threshold. The decision to turn-on certain connections in the communication system 400 could also or instead be based on the functionally provided by other connections, traffic load of each connection, service type, the UE's available transmission power or any combination thereof. For example, the UE 402*d* may have not formed a connection to the flying TRP 406*c* as the connection to the flying TRP 406*b* provides all the functionality that is required by the UE 402*d*.

The communication system 400 enables UE handovers between different types of TRPs, such as terrestrial TRPs, flying TRPs and satellite TRPs, for example. As a result of the handover, a UE connection to one type of TRP is switched to a connection to a different type of TRP. During a handover, a UE may or may not be assigned a new UE identifier, such as a radio network temporary identifier (RNTI), for example. In some embodiments, a UE uses the same identifier before and after a handover. In other embodiments, a UE is assigned at least one new identifier during a handover. By way of example, the UE 402*a* could perform a handover to switch from communicating with the satellite TRP 410*a* to communicating with the flying TRP 406*a*. The measurement threshold can also be notified by the network to the UE. In one example, the network signals absolute threshold values for each sub-system. In another example, the network signals one absolute threshold value and one or more offset threshold values, possibly together with an indication of the corresponding sub-system. The one absolute threshold value can be directly applied to one sub-system indicated. For the remaining sub-systems, the one absolute value is used as a reference and is combined with the corresponding offset value. Or the one absolute value is used as a reference and is combined with the corresponding offset value for all the sub-systems.

In some embodiments, connection handovers are based on connection performance. For example, if the connection between the UE 402*d* and the flying TRP 406*c* exhibits a higher received power than the connection between the UE 402*d* and the flying TRP 406*b*, then a handover from the flying TRP 406*b* to the flying TRP 406*c* may be performed at the UE 402*d*. In some cases, an offset may be defined to reduce the number of unnecessary handovers. For example, a handover from the flying TRP 406*b* to the flying TRP 406*c* at the UE 402 is only performed if the flying TRP 406*c*'s received power exceeds the flying TRP 406*b*'s received power by a predefined power offset. In some embodiments, during connection handover period, two connections, e.g. connection to the flying TRP 406*b* and connection to the flying TRP 406*c*, can be maintained before the release signaling, e.g. for releasing connection to the flying TRP 406*b* is received by the UE.

In some embodiments, connection enablement and disablement is based on connection resource availability. If resources for a particular connection are scarce, then the connection can be turned-off or simply not turned-on in the first place. Certain functions of a connection may instead be turned-on and/or turned-off based on resource availability, rather than enabling and/or disabling the whole connection. The enablement and disablement decision could be made by the network or by the UE. For example, the number of connections to the satellite TRPs 410*a*-410*b*, and/or the functionality that is turned-on for each of these connections, may be limited to reserve the network resources for the satellite TRPs 410*a*-410*b* for when they are needed.

In some implementations, each of the UEs 402*a*-402*e*, flying TRPs 406*a*-406*c*, 408 and/or satellite TRPs 410*a*-410*b* could be configured with a number of connections that should be monitored. A controller in the communication system 400 can dynamically configure how many connections are monitored and/or turned-on by a UE or a terminal device. This controller could be a high base station capability TRP, for example. Signaling between a controller and a UE can indicate how many connections should be monitored and/or turned-on at the UE. The number of connections monitored and/or turned-on may depend on network demand and the requirements of the UE. In general, more connections are not always better from a device or network perspective. For example, additional connections may require more overhead, power and signaling repetition at a UE and/or a TRP. If these additional connections are unnecessary to meet a UE's service requirements, then these additional connections only add to the overhead in the network and power consumption of UE could be disabled. A connection between UE and a TRP could be turned-on and/or configured using radio resource control (RRC) signaling (e.g., an RRC Connection Request).

The communication system 400 may use explicit and/or implicit signaling to configure the number of connections to be monitored. The signaling may also configure the enablement and disablement of certain connections. For example, the terrestrial TRP 404 or a high base station capability non-terrestrial TRP could transmit signaling to configure the monitoring, enablement and disablement of connections. This signaling may be transmitted over backhaul connections and/or relay connections to reach UEs or TRPs in the communication system 400.

A signaling mechanism may be used to turn-on or disable certain connections, and to turn-on or disable certain functions of a connection. The signaling mechanism defines transmission parameters and schemes, including a waveform, numerology and frame structure, for example. In some embodiments, explicit signaling is used to indicate the enablement or disablement of a connection or a function. The dedicated transmission includes at least one of: signaling carried by a broadcast channel, dedicated RRC signaling, medium access control (MAC) signaling or physical layer downlink control information. For example, a dedicated transmission could be sent to a UE and/or to a TRP to indicate that a connection or a function should be turned-on or turned-off. In some embodiments, implicit signaling is used to indicate the enablement or disablement of a connection or a function. For example, an association between predefined settings and connection types can be defined, then a connection type can be implicitly signaled by the association with the predefined settings. A predefined setting can include a waveform, numerology and frame structure. For example, when different waveforms are defined for different types of connections, the UE will know it is connected to a satellite when a UE detects which waveform is used out of a predefined set of waveforms and belongs to a satellite type of TRP. Hence the connection type is implicitly indicated by the waveform, and the overhead of explicit signaling is saved. In other examples, a predefined setting includes different synchronization channel designs, which may be different sequences or different time-frequency resource allocation/mappings or different synchronization signal block (SSB) patterns. Different synchronization channel designs are associated with different connection types. In yet another example, a predefined setting includes at least one of: different center carrier frequencies, different operation frequency bands, or different operation spectrums. Different connection types may be associated with different center carrier frequencies, different operation frequency bands, or different operation spectrums.

It should be noted that although the UE 402b has three connections, at least some of these connections might not always be in use. Communication may be performed on the connection(s) that exhibit the best performance (for example, have the best measurement results). For example, if the connection between the UE 402b and the terrestrial TRP 404 exhibits a low RSRP, then the connections with the flying TRP 406a and the satellite TRP 410a could instead be used to service the UE 402b. This flexibility could provide a more reliable service to the UE 402b.

One or more of the UEs 402a-402e may have performed TRP detection and identification operations before forming the connections shown in FIG. 5. These operations may allow a UE to determine a TRP type, determine the hierarchical layer in which the TRP operates and/or determine the communication system or sub-system in which the TRP operates, for example. A UE can determine a TRP type based on any one or more of:

Synchronization signal (SYNC) channels the UE has searched. For example, different types of TRPs can have different synchronization signal designs, which may include different sequences, different time-frequency resource allocation/mappings, and/or different SSB patterns.

Carrier frequency or predefined channel spectrum and bandwidth.

Signaling carried by a broadcast channel.

Dedicated RRC signaling, MAC signaling and/or physical layer downlink control information. The physical layer downlink control information could be UE-common or UE-specific.

One or more of the UEs 402a-402e may have performed connection detection and identification operations before forming the connections shown in FIG. 5. These operations, which may be similar to the TRP detection and identification operations discussed above, could allow a UE to detect a potential connection with a TRP and identify the type of connection. Non-limiting examples of different types of connections include connections with different types of TRPs and connections with different layers of a communication system (in the case of a hierarchical communication system having multiple layers). In some embodiments, a connection detection and identification operation includes the use of one or more of: a connection-specific access channel definition (e.g., a random access channel (RACH)), a connection-specific air interface designs, a connection-specific physical layer (PHY) and/or a connection-specific SYNC. The term "connection-specific" refers to being specific to a particular type of connection.

PHY designs can include a time-frequency resource mapping structure or pattern for a data channel, a control channel and a pilot/measurement channel. PHY designs can also include the sequence used for the scrambling of the data channel, the control channel and the pilot/measurement channel; the pilot/measurement channel sequence; and the search space of control channels. A SYNC can have a particular sequence, SSB pattern, and/or time-frequency resource allocation that can distinguish SYNC for one type of connection from other types of connections. Similarly, a RACH may have a particular sequence and/or time-frequency resource allocation that can distinguish the RACH for one type of connection from other types of connections. Air interface may have a particular air interface configuration that can distinguish the air interface for one type of connection from other types of connections, including but not limiting to a waveform component, a frame structure component, a multiple access scheme component, a protocol component, a modulation and coding component, and any combination of at least two of these components. SYNC, RACH, air interface designs and any combination thereof are also part of PHY designs.

An access channel definition, air interface, PHY or SYNC that is connection-specific may have a particular sequence, SSB pattern, and/or time-frequency resource allocation that can distinguish the access channel definition, air interface, PHY or SYNC for one type of connection from other types of connections. By way of example, a UE could use a connection-specific access channel definition, air interface, PHY or SYNC to identify a type of connection and distinguish the connection from other types of connections.

For each connection between a UE and a TRP in the communication system 400, the UE may have determined the type of TRP using SYNC channels, signaling carried by a broadcast channel and/or UE dedicated signaling from other TRPs. In some implementations, a connection-specific access channel definition, a connection-specific air interface, a connection-specific PHY, a connection-specific SYNC and/or a connection-specific RACH is used by a UE to detect and identify a particular connection with a particular TRP.

Consider, for example, the connections to the UE 402b. The connection to the satellite TRP 410a may have a particular sequence, SSB pattern and/or time-frequency resource allocation that is specific to a connection with the satellite TRP 410a, or to a connection with any satellite TRP in the communication system 400. The UE 402b may use this particular sequence, SSB pattern and/or time-frequency resource allocation to detect the connection and identify the connection as being to a satellite TRP. Similarly, the connections with the flying TRP 406a and terrestrial TRP 404 may have respective sequences, SSB patterns and/or respective time-frequency resource allocations that are specific to these connections, or to connections with any flying TRPs and terrestrial TRPs in the communication system 400.

In some implementations, two or more types of connections can share the same sequence, such as a SYNC sequence or a RACH sequence, for example. By way of example, the terrestrial TRP 404 and the flying TRP 406a share a same sequence, such as a SYNC sequence or a RACH sequence, while the satellite TRP 410a uses a different sequence. Therefore, based on these sequences, the UE 402b is able to distinguish between the satellite TRP 410a and the terrestrial TRP 404, but is not able to distinguish between the terrestrial TRP 404 and the flying TRP 406a.

In some implementations, the communication system 400 can connect to multiple different slices of a core network. Satellite TRPs, airborne platform TRPs, balloon TRPs, terrestrial TRPs and quadcopter TRPs with high base station capabilities can each connect to a same or different slicing of a core network to form an integrated terrestrial and non-terrestrial communication system. The integrated terrestrial and non-terrestrial communication system 400 can further be classified into sub-systems. For example, satellite TRPs connect to a first slicing of the core network, airborne platform TRPs and balloon TRPs connect to a second slicing of the core network, quadcopter TRPs with high base station capability connect to a third slicing of the core network, and terrestrial TRPs connect to a fourth slicing of the core network. As such, four sub-systems of the integrated terrestrial and non-terrestrial communication system may exist, namely a satellite sub-system, an airborne sub-system, a low-height flying sub-system and a terrestrial sub-system. These four sub-systems could correspond to layers 1, 2, 3 and 4 in the communication system 400, for example. A sub-system can optionally have at least one quadcopter TRPs with low to medium base station capabilities, which will be under the control of a satellite, airborne platform/ balloon, or another quadcopter TRP with high base station capability, or under the control of a terrestrial TRP, to provide communication service to terrestrial or non-terrestrial UEs.

Different sub-systems may have same or different designs for physical channels and physical signals. For example, the satellite sub-system may use only BPSK modulation and pulse-like waveform with long guard time for communications since the distance between a satellite and UE is extremely large. On the other hand, an airborne sub-system may use up to 16QAM modulation and OFDM waveform with medium guard time for communications since the distance between an airborne platform/balloon and a UE is on the order of 1-100 km. The low-height flying sub-system and terrestrial sub-system may use up to 256QAM modulation and an OFDM waveform with low guard time for communications since the distance is low.

Different sub-systems may have different designs for synchronization signals, RACH channels, air interface configurations, reference signals or data channels. For synchronization signals, different sub-systems may have different sequence designs (including different sequences of a same sequence type), SSB patterns and/or time-frequency resource allocations. For RACH channels, different sub-systems may have different sequence designs and/or different time-frequency resource allocations. For air interface configurations, different sub-systems may have different configurations of at least one of waveform, multiple access scheme, modulation and coding scheme, frame structure, subcarrier spacing and symbol duration, for example. For reference signals, different sub-systems may have different sequence designs, types of reference signals and/or time-frequency resource allocations. For data channels, different sub-system may have different time-frequency resource allocations, mapping rules, and/or transmission schemes. For example, the low-height flying sub-system and terrestrial sub-system may share the same synchronization signal design and same air interface configuration, but have different time-frequency resource allocations for a RACH channel.

In an integrated terrestrial and non-terrestrial communication system, any of the above mentioned 4 sub-systems could be absent. For example, the terrestrial sub-system may be absent. In another example, only the low-height flying sub-system exists. In a third example, only the terrestrial sub-system, the satellite sub-system and the low-height flying sub-system exist. In a fourth example, the satellite sub-system is absent. In the further examples that are discussed below, it may be assumed that the above mentioned 4 sub-systems are all present. However, it should be understood that the design principles for these examples can be applied regardless of whether all 4 sub-systems are present or not, or whether additional sub-system types are defined or not.

The integrated communication system 400 enables cross-system or cross sub-system handovers. Cross-system or cross sub-system handovers refer to a UE switching from a connection with a TRP in one communication system or sub-system to a connection with a TRP in another communication system or sub-system. As a result of the handover, the previous connection is turned-off. In one example, a UE that is communicating with a terrestrial TRP switches to communicating with a non-terrestrial TRP as the result of a cross-system/sub-system handover. In another example, a UE that is communicating with a non-terrestrial TRP switches to communicating with a terrestrial TRP as the result of a cross-system/sub-system handover. During a cross-system or sub-system handover, a UE may or may not be assigned a new UE identifier, such as a radio network temporary identifier (RNTI), for example. In some embodiments, a UE uses the same identifier before and after a cross-system or sub-system handover. In other embodiments, a UE is assigned at least one new identifier during a cross-system or sub-system handover. By way of example, the UE 402a could perform a handover to switch from communicating with the satellite TRP 410a to the satellite TRP 410a. As a result, the UE 402a would switch from communicating exclusively with a non-terrestrial communication system or sub-system to communicating exclusively with a terrestrial communication system or sub-system.

If a connection to a sub-system is turned-off (for example, a connection to a TRP in that sub-system is turned-off), a turned-on sub-system can obtain UE information and forward the UE information to turned-off sub-systems. The UE information may include: position information, movement information, UE ID, data traffic type and quality of service (QoS) requirements. This information may be helpful to provide fast turn-on for a sub-system when necessary. The UE information for multiple UEs could be packed into one message. The UE information can be forward to a group of TRPs in the turned-off sub-system.

The use of non-terrestrial TRPs, such as flying TRPs, can reduce the timing advance (TA) update frequency compared to terrestrial TRPs. In a terrestrial communication system, the movement of a UE may require that the TA for the UE be changed to compensate for the change in distance between the UE and a terrestrial TRP. In a non-terrestrial communication system, the movement of UEs and/or non-terrestrial TRPs will also change the distance between the UEs and the non-terrestrial TRPs. However, this change in distance may be smaller than the change in distance for a terrestrial TRP, which means that the TA could be changed less frequently.

For example, consider the case in which a flying TRP is positioned 50 m directly above a terrestrial UE, and a terrestrial TRP is 50 m north of the UE. The UE then moves 50 m south. This results in a distance change between the UE and the terrestrial TRP of approximately 50 m. For the flying TRP, the UE is now approximately 71 m away, which amounts to a distance change of 21 m between the UE and the flying TRP. Therefore, by virtue of the 3D nature of some non-terrestrial communication systems, the movement of UEs and/or non-terrestrial TRPs may result in smaller distance changes compared to terrestrial communication systems. Hence, a lower TA update frequency could be used in non-terrestrial communication systems, which may result in power savings.

TA update frequency could be dependent on TRP type in some implementations. For example, non-terrestrial TRPs that operate at higher altitudes could have lower TA update frequencies than TRPs that operate at lower altitudes, as the distance changes for high-altitude non-terrestrial TRPs could be less than that of low-altitude TRPs and terrestrial TRPs.

In one example, a low TA update frequency can be determined for an airborne sub-system or a satellite sub-system, a medium TA update frequency can be determined for a low-height flying sub-system, and a high TA update frequency can be determined for a terrestrial sub-system. TA update is triggered by a TRP. The TRP may configure an expiry timer for a TA update at a UE. The expiry timer can be reset when a UE reports its most recent TA to a TRP. When the expiry timer expires since its last TA report, the UE will consider if it lost synchronization to the TRP and will perform a RACH process to re-synchronize with the TRP and update the TA. Different types of sub-systems can have separate configurations of the expiry timer for a TA update at a UE. For example, the expiry timer for a TA update at an airborne sub-system or a satellite sub-system may be configured with a large value, the expiry timer for a TA update at a low-height flying sub-system may be configured with a medium value, and the expiry timer for a TA update at a terrestrial sub-system may be configured with a low value.

A TA value and its range may be largely determined by the distance and the corresponding distance fluctuation between a TRP and a UE. For a satellite sub-system, the TA changes may be very small since the distance is already extremely large and the fluctuations will be relatively small. This means either the smallest number of bits for signaling TA could be defined for a satellite sub-system, or a finest granularity could be defined (for example when an equal number of bits for signaling TA is be defined for every sub-system). Similarly, a second smallest number of bits or a second finest granularity for signaling TA could be defined for an airborne sub-system. A third smallest number of bits or a third finest granularity for signaling TA could be defined for a low-height flying sub-system. A largest number of bits or a largest granularity for signaling TA could be defined for a terrestrial sub-system.

Referring to the communication system 400 by way of example, a connection between a UE and a non-terrestrial TRP may have a lower TA update frequency than a connection between a UE and the terrestrial TRP 404. For example, when the UE 402c moves towards or away from the terrestrial TRP 404, this results in a change in the distance between the UE 402c and the terrestrial TRP 404 that may require a TA update. This movement of the UE 402c may also result in a change in the distance between the UE 402c and the flying TRP 406b. However, because the flying TRP 406b is above the UE 402c, this might result in a smaller overall change in distance between the UE 402c and the flying TRP 406c compared to the change in distance between the UE 402c and the terrestrial TRP 404. Therefore, the TA update frequency may be lower for connections between UEs and non-terrestrial TRPs, which can result in power savings.

The communication system 400 may be at least partially self-organized and/or self-optimized. Self-organization includes the active deployment and positioning of flying TRPs. Self-organization also includes the configuration of connections between TRPs and UEs. Self-organization further includes the formation of relays using multiple TRPs, and defining the number of relay nodes in the relays. Self-organization may be referred to as self-formation. Self-optimization includes the active improvement of connections within a terrestrial and/or non-terrestrial communication system. For example, one or more connections from a UE to a terrestrial and/or a non-terrestrial TRP can be dynamically turned-on, turned-off and/or reconfigured to improve service to the UE. In addition, an air interface can be actively configured to improve communication with the UE.

Two or more of the flying TRPs 406a-406c, 408 in the communication system 400 could form a group or fleet of non-terrestrial TRPs. A group of non-terrestrial TRPs will typically work together in a coordinated manner to perform one or more operations in a communication network. In some implementations, self-organization and self-optimization in the group of non-terrestrial TRPs can be performed through cooperation between the different non-terrestrial TRPs. This self-organization and/or self-optimization may be performed in a distributed way, where there is no central node that manages each non-terrestrial TRP in the group. Instead, the non-terrestrial TRPs within the group communicate with each other to coordinate their operations.

In some implementations, self-organization and/or self-optimization is coordinated by a central node in the communication system 400. For example, two or more of the flying TRPs 406a-406c, 408 form a group of TRPs that are under the control and coordination of a central node. This central node could be any of the flying TRPs 406a-406c, 408 that have a high base station capability. The central node could also or instead be one of the satellite TRPs 410a-410b or the terrestrial TRP 404. In some cases, the communication system 400 includes multiple central nodes. The UEs 402a-402e can connect directly to a central node, or connect to a central node through a relay connection including one or more relay nodes. The number of relay nodes in a relay connection can be dynamically controlled by the central node.

In some implementations, the flying TRPs 406a-406c are fully under the control of a central node. For example, the flying TRP 408 could act as a central node for the flying TRPs 406a-406c, and therefore there is no need for connections between the flying TRPs 406a-406c.

In some embodiments, a downlink control information (DCI) search space and/or a blind decoding design is/are configured for a group of non-terrestrial TRPs. For example, when multiple non-terrestrial TRPs are under the control of a central node and are cooperating to serve a UE via multiple connections to the UE, the UE may need to detect DCI for scheduling a data transmission to/from each of the multiple non-terrestrial TRPs. For each of the multiple non-terrestrial TRPs, the central node can configure at least one of (through dedicated RRC signaling or broadcasting, for example): the DCI search space, the number of blind decoding attempts, a time-frequency resource allocation for searching for the DCI, antenna port related information, an indicator of the TRP used for transmitting the data scheduled by the DCI, an indicator of the TRP used for transmitting the DCI, etc. The indicator of the TRP can include an identifier of the TRP, the position of the TRP, the type of the TRP, and/or center carrier frequency of the TRP, for example. The non-terrestrial TRPs can receive and forward these configurations to the UE. DCI or medium access control (MAC) signaling, or some combination of the two, can be further used to update part or all of the above configurations. The DCI and MAC signaling may be transmitted from the central node to one or more non-terrestrial TRPs, and then from the one or more non-terrestrial TRPs to the UE. In a group of multiple non-terrestrial TRPs, DCI for each of the non-terrestrial TRPs can be transmitted from the same TRP. Alternatively, DCI can be transmitted from a different TRP for each of the non-terrestrial TRPs. When the DCIs for scheduling data transmission for multiple non-terrestrial TRPs are transmitted from a same TRP, the configured DCI search spaces can be shared for these DCIs if they have a same payload size.

One DCI may comprise one or more control channel elements (CCEs). The number of CCEs aggregated for one DCI is called the aggregation level. The aggregation level can be different to handle channel types. In one design, the size of a time-frequency resource that is occupied by one CCE may be same. The candidate aggregation level from different aggregation levels needs to be blindly decoded, and a number of blind decoding attempts need to be assigned to each candidate aggregation level. For different types of sub-systems, a CCE's definition and/or set of candidate aggregation levels may be different. The candidate aggregation levels may have the largest value for a satellite sub-system, and the candidate aggregation levels may have second largest value for an airborne sub-system. For example, a set of candidate aggregation levels may be defined as {1, 2, 4, 8, 16, 32} for a terrestrial sub-system and a low-height flying sub-system, a set of candidate aggregation levels may be defined as {16, 32, 64} for an airborne sub-system, and a set of candidate aggregation levels may be {128, 256} for a satellite sub-system. In some implementations, different sets of candidate aggregation levels can also be used for a terrestrial sub-system and a low-height flying sub-system. Different sets of candidate aggregation levels may partially overlap in values or may not overlap in values for different types of subs-systems. In another example, the set of candidate aggregation levels may be same for different types of sub-systems, while the size of the time-frequency resource occupied by one CCE may be different for different types of sub-systems. For example, a set of candidate aggregation levels may be defined as {1, 2, 4, 8} for all 4 sub-systems, one CCE may occupy 36 resource elements for a terrestrial sub-system and a low-height flying sub-system, one CCE may occupy 72 resource elements for an airborne sub-system, and one CCE may occupy 288 resource elements for a satellite sub-system. In another example, different resource mapping schemes may be adopted for different types of sub-systems. For example, a distributed mapping of CCEs to physical frequency resources may be adopted for a satellite sub-system and an airborne sub-system to obtain frequency diversity gain, while localized mapping of CCEs to physical frequency resources may be adopted for a terrestrial sub-system and a low-height flying sub-system to obtain frequency scheduling gain. In yet another example, different numbers of blind decoding attempts may be defined for different sub-systems. For example, more blind decoding attempts could be defined for a terrestrial sub-system and a low-height flying sub-system, fewer blind decoding attempts could be defined for an airborne sub-system, and the least blind decoding attempts could be defined for a satellite sub-system.

When a communication system wants to notify a UE to turn-on connections to a specific type of sub-system, explicit signaling about the type of sub-system may be signaled to the UE. If different types of sub-systems are associated with different designs on DCI search space and blind decoding, then these associated designs are implicitly signaled to the UE when the sub-system type is explicitly signaled. In another example, when a UE successfully searches synchronization signals during an initial cell search stage, it can recognize the type of the sub-system through the searched synchronization signals, and then the associated designs of the DCI search space and blind decoding for that sub-system type may also be implicitly signaled. Using this method, the signaling overhead can be significantly reduced. Then the UE may start blind detection of the DCI according to these associated designs. Alternatively, the design related to DCI search space and blind decoding can be explicitly signaled to the UE. In one example, the signaling carrying design information related to a DCI search space and blind decodings can be provided together with a sub-system type indicator when turning on a connection to a sub-system.

In some implementations of the communication system 400, the terrestrial TRP 404 and the satellite TRPs 410a-

410b form a primary or basic communication system. The flying TRPs 406a-406c, 408 are then deployed based on network demand in certain locations or regions. Once deployed, the flying TRPs 406a-406c, 408 could self-organize into the arrangement shown in FIG. 5. The flying TRPs 406a-406c, 408 could also or instead self-optimize to provide a desired or suitable level of wireless service to the UEs 402a-402e. In some implementations, the flying TRP 408 acts as a central node to coordinate the deployment, movement and configuration of the other flying TRPs 406a-406c.

Consider, for example, a situation in which the communication system 400 is provided to service an outdoor concert that is being held in a rural location. The rural location is normally unpopulated, and therefore the terrestrial communication system in the location is not capable of supporting a large number of users (for example, there is only one terrestrial TRP 404). While the satellite TRPs 410a-410b can support some additional users in the rural location, this might still not be enough to provide a suitable level of service to all of the attendees of the concert. As such, the flying TRPs 406a-406c, 408 are deployed and distributed in the rural location to enhance the wireless coverage and service quality in the rural location, thereby providing a service boost. In some implementations, the flying TRP 408 is an airship that carries the other flying TRPs 406a-406c to the rural location, as the airship might have a longer travel range than the other flying TRPs 406a-406c. Once the flying TRP 408 reaches the rural location, the TRPs 406a-406c are deployed, where they self-organize and self-optimize into the communication system 400 shown in FIG. 5. At least some of the TRPs 406a-406c could instead be transported to the rural location along the ground using a truck, for example, and be deployed from the truck. The system can signal signaling to indicate the location of flying TRPs, backhaul setup, mesh connection/route setting (e.g. how many hops), and mutual connections between flying TRPs. Flying TRP may be aware of such information.

Figure 6:
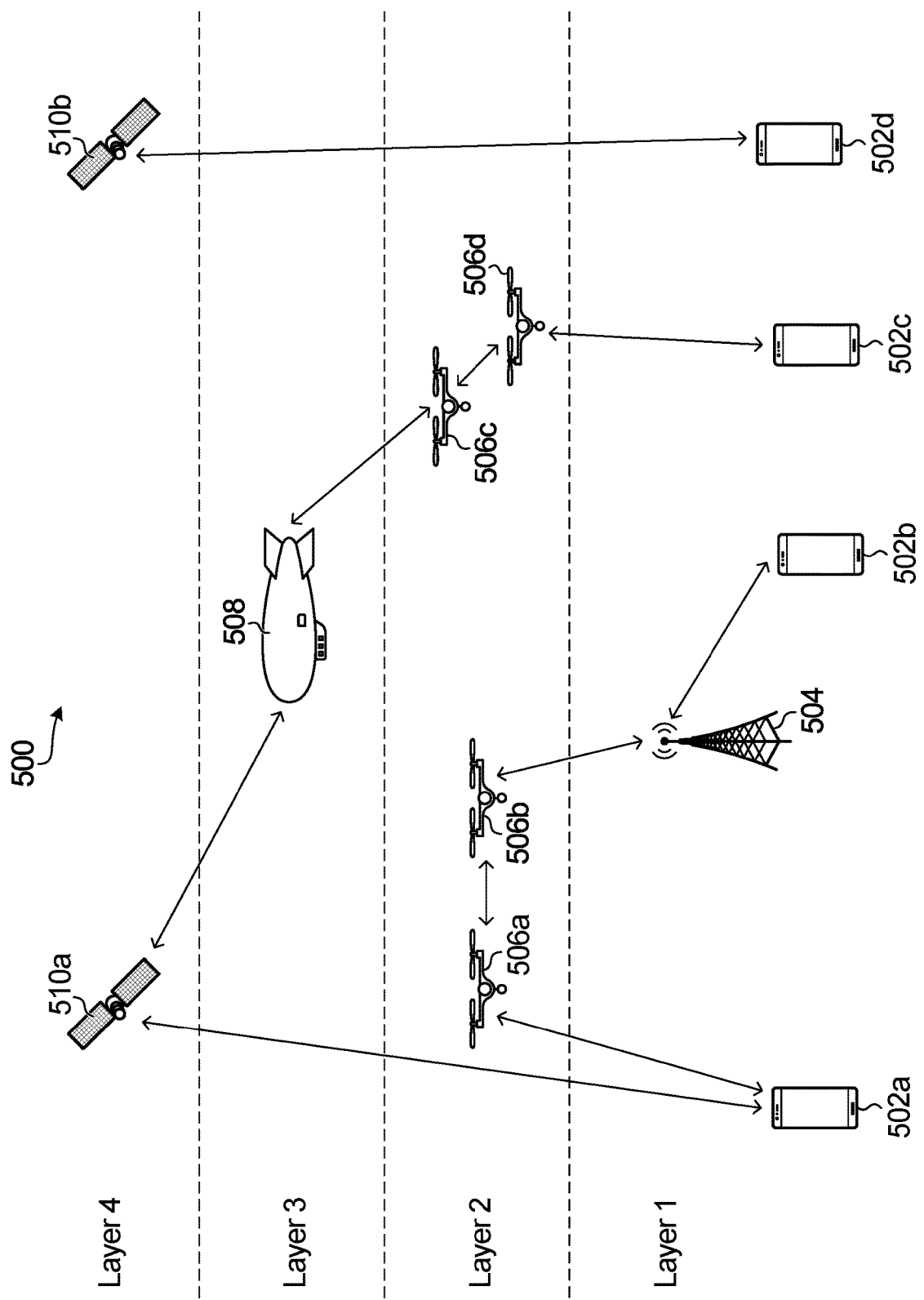

FIG. 6 is a diagram illustrating an integrated terrestrial and non-terrestrial communication system 500 according to another embodiment. The communication system 500 is another example of a 3D ubiquitous communication system. The communication system 500 includes multiple UEs 502a-502d, a terrestrial TRP 504, multiple flying TRPs 506a-506d, 508 and multiple satellite TRPs 510a-510b. FIG. 6 includes dashed lines that illustrate the multiple different layers of the communication system 500. These layers could be configured similarly to the layers of the communication system 400.

Multiple double-headed arrows are illustrated in FIG. 6, which each represent a wireless connection. Specifically, the UE 502a has a connection to the satellite TRP 510a and to the flying TRP 506a; the UE 502b has a connection to the terrestrial TRP 504; the UE 502c has a connection to the flying TRP 506d; the UE 502d has a connection to satellite TRP 510b; the flying TRP 508 has a connection to the satellite TRP 510a and to the flying TRP 506c; the terrestrial TRP 504 further has a connection to the flying TRP 506b; the flying TRP 506a further has a connection to the flying TRP 506b; and the flying TRP 506c further has a connection to the flying TRP 506d.

The communication system 500 illustrates examples of relay connections with multiple relay nodes. In one example, the UE 502a has a connection to the terrestrial TRP 504 through a relay connection that includes the flying TRPs 506a-506b. The flying TRPs 506a-506b act as relay nodes in this relay connection. For a data packet to traverse from the UE 502a to the terrestrial TRP 504, or vice versa, the data packet is forwarded by the flying TRPs 506a-506b. In another example, the UE 502c has a connection to the flying TRP 508 through a relay connection that includes the flying TRPs 506c-506d. The flying TRP 508 could be a central node and/or a high base station capacity TRP that provides wireless service to the UE 502c. The flying TRPs 506c-506d act as relay nodes in the relay connection between the UE 502c and the flying TRP 508. The communication system 500 may have been formed using an on demand relay connection set-up, which is also referred to as self-meshing. In some implementations, self-meshing searches for relay connections having the fewest number of relay nodes.

In the communication system 500, the flying TRP 508 could connect to the core network in any of a variety of different ways. For example, the flying TRP 508 can have a direct connection to core network. Alternatively, the terrestrial TRP 504 and/or the satellite TRPs 510a-510b could have a direction connection to the core network, allowing the flying TRP 508 to connect to the core network via a wireless connection.

In the communication system 500, the terrestrial TRP 504 does not form a connection with the flying TRP 508. For example, a connection between the terrestrial TRP 504 and the flying TRP 508 might not be possible due to poor channel conditions. As such, the terrestrial TRP 504 and the flying TRP 508 might operate independent of one another.

Figure 7:
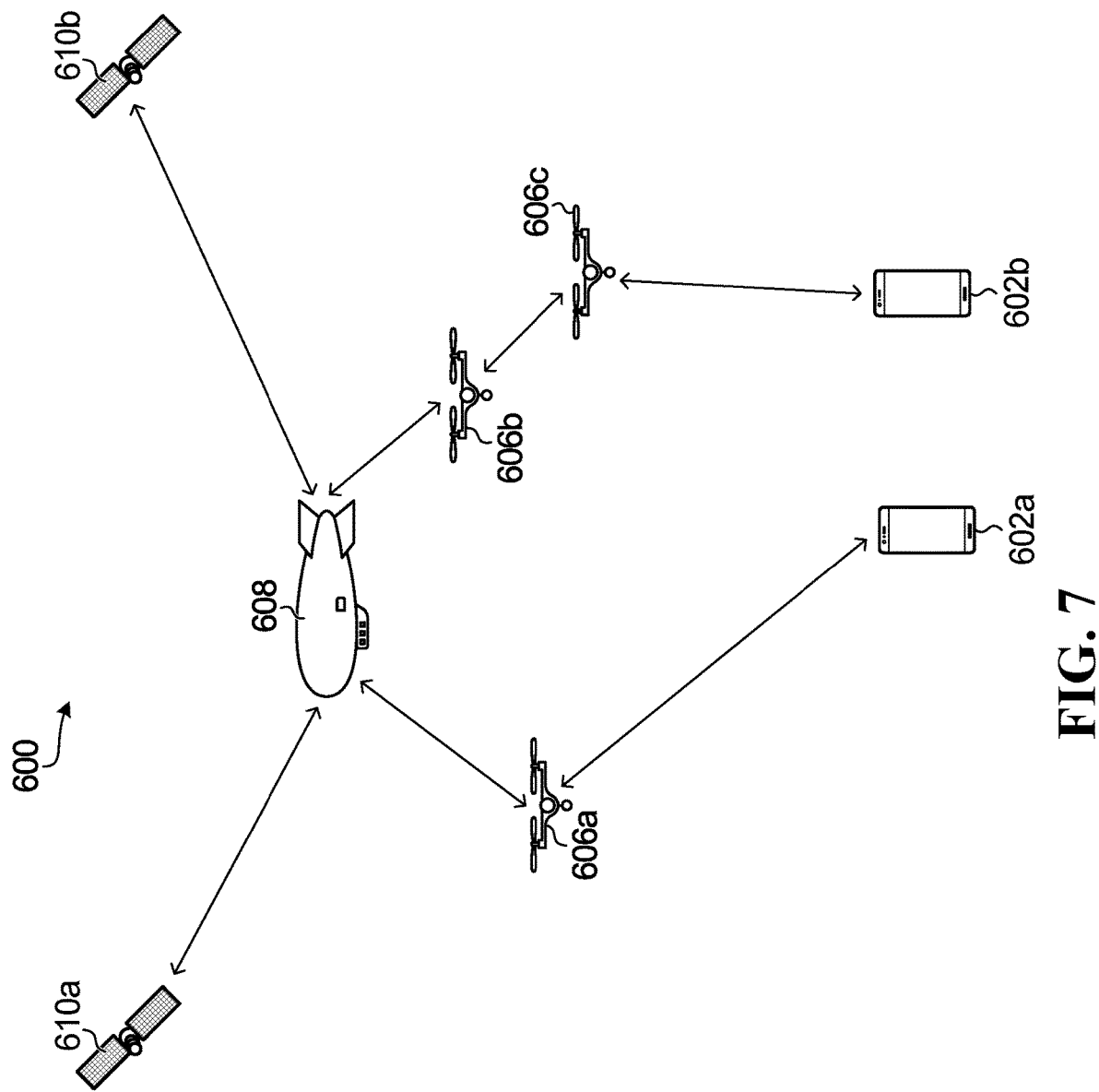

FIG. 7 is a diagram illustrating a non-terrestrial communication system 600 according to an embodiment. The communication system 600 provides an example of self-backhauling using satellites. The communication system 600 includes multiple UEs 602a-602b, multiple flying TRPs 606a-606c, 608 and multiple satellite TRPs 610a-610b.

Multiple double-headed arrows are illustrated in FIG. 7, which each represent a wireless connection. Specifically, the UE 602a has a connection to the flying TRP 606a; the UE 602b has a connection to the flying TRP 606c; the flying TRP 608 has a connection to the satellite TRPs 610a-610b and to the flying TRPs 606a-606b; and the flying TRP 606b further has a connection to the flying TRP 606c.

The communication system 600 provides an example of self-backhauling in a communication system. Self-backhauling, which may also be referred to as wireless backhauling, involves the use of wireless network resources to perform backhauling, rather than the use of physical wires or cables. In some cases, network resources are shared between backhauling and UE access. This is referred to as integrated access and backhaul (IAB). Self-backhauling may be implemented when cable or fiber backhauling is not feasible, as in the case of non-terrestrial TRPs, for example. In some implementations, one or more non-terrestrial TRPs can form a relay connection that functions at least in part as a backhaul. These non-terrestrial TRPs, which may be drones, can be considered flying IABs. A TRP that is involved in IAB could be a low base station capability TRP in some cases.

In some implementations, self-backhauling is coordinated by a central node, however this might not always be the case. Self-backhauling may instead be performed in a distributed way, where there is no central node that manages each non-terrestrial TRP in the group. Instead, the non-terrestrial TRPs within the group communicate with each other to coordinate their operations.

Wireless backhaul connections may exist between any two non-terrestrial TRPs, including satellites, airborne platforms, balloons and drones, for example. Wireless backhaul connections may also exist between a terrestrial base station and a non-terrestrial TRP. The TRPs involved in a wireless backhaul connection may belong to the same operator or different operator. When the TRPs involved in a wireless backhaul connection belong to different operator, authorization from one operator may be required to achieve joint operation for a 3D ubiquitous hierarchical wireless communication system.

In the communication system 600, the satellite TRPs 610a-610b may implement self-backhauling for the flying TRP 608. For example, the connections between the satellite TRPs 610a-610b and the flying TRP 608 could be wireless backhaul connections that allow the flying TRP 608 to access a RAN, other UEs and/or or the core network, for example. The satellite TRPs 610a-610b could form a connection with a terrestrial TRP (not shown) to enable access to the RAN or the core network. In some implementations, the flying TRP 608 can also have its own wireless connection to core network to be a part of a RAN.

Figure 8:
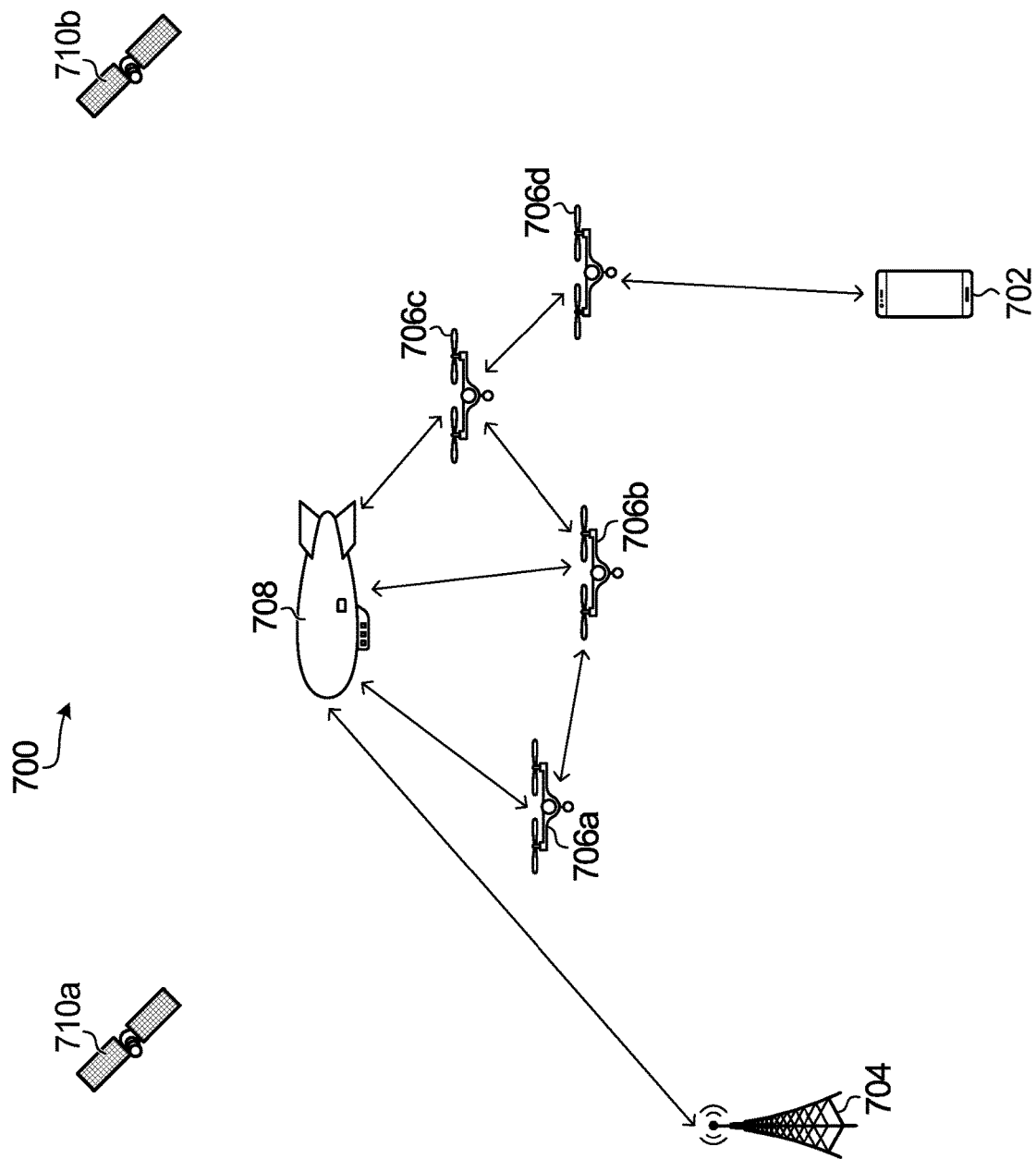

FIG. 8 is a diagram illustrating an integrated terrestrial and non-terrestrial communication system 700 according to a further embodiment. The communication system 700 provides an example of self-backhauling using terrestrial TRPs. The communication system 700 includes a UE 702, a terrestrial TRP 704, multiple flying TRPs 706a-706d, 708 and multiple satellite TRPs 710a-710b.

Multiple double-headed arrows are illustrated in FIG. 8, which each represent a wireless connection. Specifically, the UE 702 has a connection to the flying TRP 706d; the flying TRP 708 has a connection to the terrestrial TRP 704 and to the flying TRPs 706a-706c; the flying TRP 706a further has a connection to the flying TRP 706b; the flying TRP 706b further has a connection to the flying TRP 706c; and the flying TRP 706c further has a connection to the flying TRP 706d. Although not shown in FIG. 8, connections could further be formed with the satellite TRPs 710a-710b in some implementations.

In some implementations, two or more of the flying TRPs 706a-706d, 708 form a group of TRPs that are not under the control and coordination of a central node. Rather, the group of TRPs may communicate with each other through wireless backhaul connections to coordinate their movements and the configuration of connections. This communication within the group of TRPs may result in higher capacities, but may also result in higher network costs. For example, more network resources would need to be allocated for the wireless backhaul connections.

In some implementations, the terrestrial TRP 704 implements self-backhauling for the flying TRP 708. For example, the connection between the terrestrial TRP 704 and the flying TRP 708 could be a wireless backhaul connection that allows the flying TRP 708 to access a RAN, other UEs and/or or the core network, for example.

In some implementations, the communication system 700 implements multiple relays using the flying TRPs 706a-706d. For example, a communication sent by the UE 702 could be received by the flying TRP 706c via the flying TRP 706d. This communication this then forwarded to the flying TRP 708, as well as to the other flying TRPs 706a-706b via the connections between the flying TRPs 706a-706c. As such, the other TRPs 706a-706b can also forward the communication to the flying TRP 708 and potentially increase the probability that the communication will be successfully received at the flying TRP 708.

Figure 9:
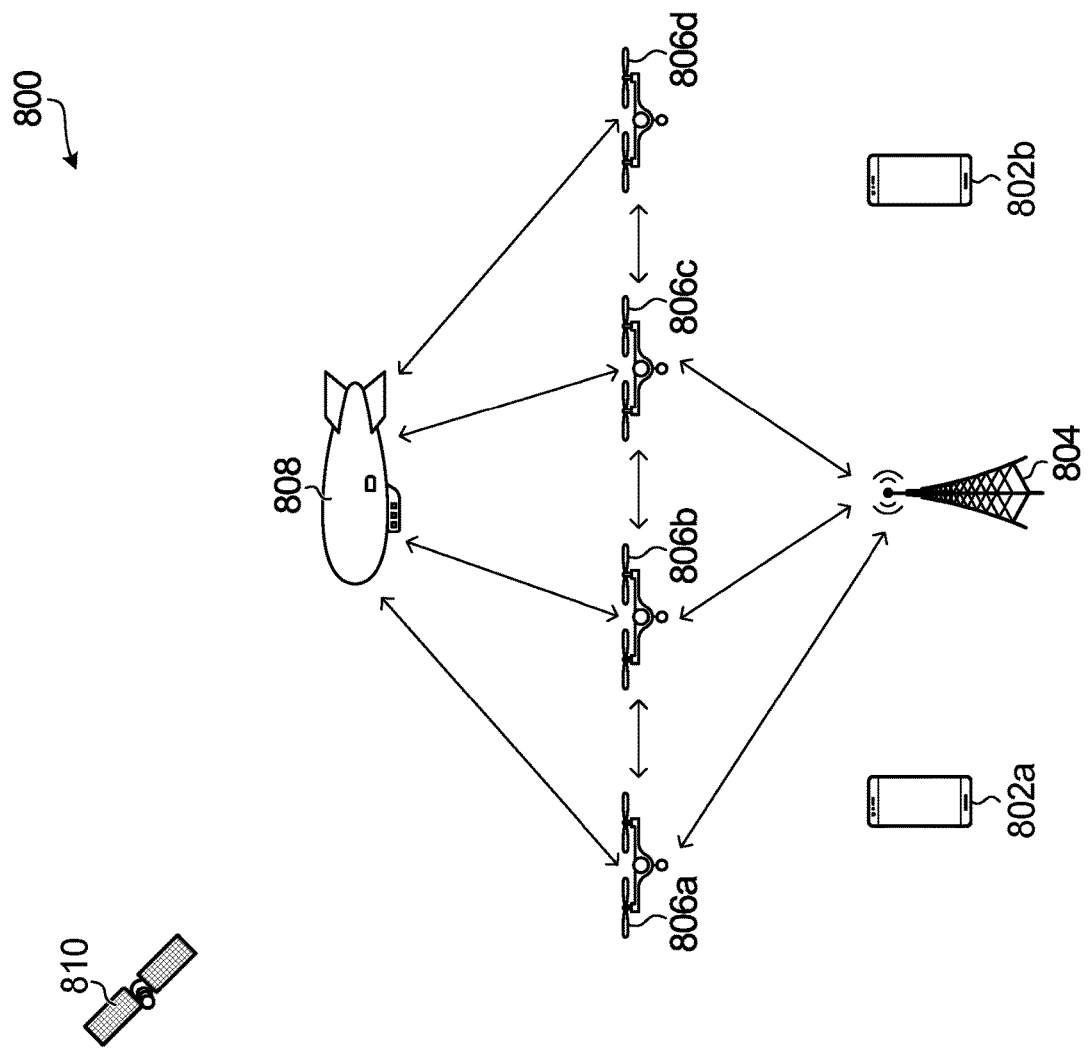

FIG. 9 is a diagram illustrating an integrated terrestrial and non-terrestrial communication system 800 according to yet another embodiment. The communication system 800 includes multiple UEs 802a-802b, multiple flying TRPs 806a-806d, 808 and a satellite TRP 810.

Multiple double-headed arrows are illustrated in FIG. 9, which each represent a wireless connection. Specifically, the terrestrial TRP 804 has a connection to the flying TRPs 806a-806c; the flying TRP 808 also has a connection to the flying TRPs 806a-806d; the flying TRP 806a further has a connection to the flying TRP 806b; the flying TRP 806b further has a connection to the flying TRP 806c; and the flying TRP 806c further has a connection to the flying TRP 806d. Although not shown in FIG. 9, connections could further be formed with the UEs 802a-802b and/or the satellite TRP 810 in some implementations. For example, the terrestrial TRP 804 could form a connection to one or both of the UEs 802a-802b to provide wireless service to these UEs.

The communication system 800 provides an example of multiple non-terrestrial TRPs that can provide a distributed antenna system. In some cases, it may be difficult to implement a lot of antennas in a single flying TRP due to the cost. Distributed antennas are multiple antennas that are separated in space to increase the number of possible transmission paths from a transmitter to a receiver. The distributed antennas can be implemented by flying or satellite TRPs with medium base station capabilities, for example. Distributed antennas generated from multiple flying TRPs may be a more flexible and more efficient way to provide MIMO gain due to coordinated multiple TRP transmission. Because the position of flying TRPs can be adjusted, the joint antenna or multiple TRP configuration may be changed according to the requirement. In some implementations, distributed antennas save power by increasing the chance that line-of-sight communication between a UE and a non-terrestrial TRP will be achieved. In some implementations, a distributed antenna including multiple non-terrestrial TRPs can provide enhanced wireless service compared to one TRP on its own. Distributed antennas can also provide an enhanced UE experience and system capacity due to better MIMO gain from the joint or collaborated transmission from antennas located in different locations.

In the communication system 800, the flying TRPs 806a-806d are a group of TRPs that form a flying distributed antenna system by utilizing the antennas from each of the flying TRPs 806a-806d. In some implementations, the flying TRP 808 is acting as a central node to the flying distributed antennas (i.e., the flying TRPs 806a-806d), to provide communication service to UEs 802a-802b. In other implementations, the terrestrial TRP 804 is acting as a central node to the flying distributed antennas 806a-806c, to provide communication service to UEs 802a-802b. Different flying distributed antennas can carry same or different data packets to a same UE, which is under the control of a central node. Different flying distributed antennas can further have their own wireless backhaul for coordination. In case of distributed antenna system, it may be preferred that each flying distributed antenna is independent from, i.e. not coordinated by, other flying distributed antennas.

In some cases, a flying TRP is connected to a terrestrial or non-terrestrial base station through front haul connections. In these cases, the baseband processing is performed at the base station and only the antennas of the flying TRP are used as distributed antennas.

In some implementations, the flying TRPs 806a-806d are implemented as flying distributed antennas on demand. For example, in the case that a high capacity backhaul connection is required between the terrestrial TRP 804 and the flying TRP 808, the flying TRPs 806a-806d could be deployed it the arrangement shown in FIG. 9 to provide this high capacity backhaul connection. The flying TRPs 806a-

806*d* could also or instead be deployed in the case that a single relay connection between the flying TRP 808 and the terrestrial TRP 804 is providing an unstable or inconsistent connection.

In some implementations, the deployment and cooperation of the flying TRPs 806*a*-806*d* could be coordinated by a central node, which could be the flying TRP 808 or the terrestrial TRP 804, for example. For each of the multiple flying TRPs 806*a*-806*d*, the central node could configure (through dedicated RRC signaling or broadcasting, for example) the DCI search space, the number of blind decoding attempts, a time-frequency resource allocation for searching for the DCI, antenna port related information, an indicator of the TRP used for transmitting the data scheduled by the DCI, an indicator of the TRP used for transmitting the DCI, etc. The flying TRPs 806*a*-806*d* can receive and forward these configurations to the UE. In some implementations, the configured DCI search spaces can be shared between the flying TRPs 806*a*-806*d*.

In some implementations, the multiple transmissions to or from the flying TRPs 806*a*-806*d* are non-coherent. To facilitate the reception of non-coherent transmissions that occur simultaneously, either or both of the terrestrial TRP 804 and the flying TRP 808 could have multi-panel receivers. Multi-panel receivers use multiple antennas to distinguish between different transmissions. In other implementations, the multiple transmissions to or from the flying TRPs 806*a*-806*d* are coherent.

In some implementations, each of the connections between the flying TRPs 806*a*-806*d* and the terrestrial TRP 804, as well as each of the connections between the flying TRPs 806*a*-806*d* and the flying TRP 808, are independently configured. The configuration of each connection may be based on any of a number of different factors, including but not limiting to the relative position of each UE and TRP in the connection and the channel conditions between the UE and the TRP. For example, the connection between the terrestrial TRP 804 and the flying TRP 806*a* could be based on the position of the flying TRP 806*a* relative to the terrestrial TRP 804, and the channel conditions between the terrestrial TRP 804 and the flying TRP 806*a*. Accordingly, the configuration of the connection between the terrestrial TRP 804 and the flying TRP 806*a* could be independent of the other connections shown FIG. 9.

In some implementations, two or more connections between the flying TRPs 806*a*-806*d* and the terrestrial TRP 804, or two or more connections between the flying TRPs 806*a*-806*d* and the flying TRP 808, are configured in the same way. This could potentially reduce the complexity and overhead associated with enabling each of the connections.

In some implementations, CSI is acquired for each of the connections between the terrestrial TRP 804, the flying TRPs 806*a*-806*d* and the flying TRP 808. Each connection is then configured according to its respective CSI.

In some cases, beam sweeping is performed for each connection to determine the positions of the UEs and TRPs in the connection. This can enable beamforming in the connection. However, given the number of connections in the flying distributed antenna system shown in FIG. 9, performing beam sweeping for each connection can result in a high level of overhead. In addition, because the flying TRPs 806*a*-806*d*, 808 might be moving, pilot-based CSI acquisition can be difficult to perform.

In some embodiments, a non-terrestrial communication system can perform channel information acquisition, such as CSI acquisition, with little or even no beam sweeping. This CSI acquisition could be performed in a 3D space. For example, some communication systems may know or determine the position of UEs and TRPs to a relatively high degree of accuracy.

In 5G and 6G systems, some advanced MIMO technologies are adopted to enable high data rate communications. To facilitate advanced MIMO technologies, complicated beamforming and CSI feedback procedures are introduced. 5G and 6G communication systems may know or determine the position of UEs and TRPs to a relatively high degree of accuracy. If the positions of UEs and TRPs are known, then at least a rough beam direction can be determined without beam sweeping or with a reduced beam sweeping range.

In some embodiments, the position of UEs and/or TRPs can be used for positioning-assisted information acquisition, such as positioning-assisted CSI acquisition, which can help reduce channel measurement efforts. The positioning-assisted beamforming and CSI information acquisition may be based on the location of any or all UEs and TRPs in the integrated system. Information regarding the location of any or all UEs and the location of any or all TRPs may form an information set. The information set relates to the location of UEs and/or TRPs in a 3D ubiquitous communication system, and the information set is also referred to as a 3D real time map. The 3D real time map could be directly obtained by a UE or a TRP through a network server, the internet or a mobile phone application. In some implementations, a UE and/or a TRP can pre-download a 3D map from a server in an integrated system. A network controller or a central node can send the 3D map update information in periodic or aperiodic (for example triggered by the change event) intervals when necessary. In some implementations, the 3D real time map is obtained from a TRP acting as a central node, or another controller, through a control channel or a data channel. For example, the 3D map may be received by a TRP or a UE over a control channel or data channel, and may be intermittently or dynamically updated with information received over the control channel or data channel. In some implementations, positioning-assisted information acquisition assumes that the radio environment in a particular area is relatively stable. Positioning-assisted CSI acquisition can be used in any or all of the communication systems disclosed herein. In some examples, the network may notify the UE at least one of: to enable or disable the function of positioning-assisted beamforming and/or positioning-assisted CSI acquisition, whether a UE needs to download 3D map or receive 3D map update information through control channel or data channel. Optionally, a UE or TRP may report to the network whether it has capability to utilize 3D map positioning information to help beamforming and/or CSI acquisition or not.

In an example, beamformed synchronization signals may be transmitted in different synchronization signal blocks (SSBs), where each SSB is associated with a beam. A UE can use the obtained positioning information of TRPs and itself to reduce the beams to be searched in a cell search. The UE can also use the obtained position information to reduce the beams to be measured when selecting the most suitable beams for CSI measurements (from one or more TRPs). A TRP can use the position information for UEs and itself to determine to which beams to use to transmit SSBs, so as to reduce the number of beams required to send synchronization signals. A TRP can use the position information for UEs and itself to configure beams for transmitting reference signals for channel sounding, CSI measurement and the demodulation of physical control channels and physical data channels. When the connection of a turned-on sub-system forwards UE information including position information to a turned-off sub-system, this can help the turned-off sub-system determine SSB beams and reference signal beam configuration for a fast turn-on.

In another example, position information can help a TRP configure a transmission scheme, a CSI feedback scheme and/or a CSI feedback periodicity for a UE. With a 3D real time map, the TRP can know not only position information for a UE and itself, but also know information regarding the surrounding environment. For example, the information regarding the environment can include indications of whether there are any obstacles between the TRP and the UE, and whether there are neighboring TRPs that may cooperate with the TRP to provide communications to the UE. The information regarding the environment may help a TRP get a rough channel condition estimate, and determine whether a MIMO or a non-MIMO transmission scheme is suitable for communicate with the UE. Different CSI feedback schemes corresponding to MIMO and non-MIMO transmission schemes can be configured accordingly. With information regarding the movement of the TRP and/or the UE, a proper CSI feedback periodicity may also be configured.

In yet another example, a 3D real time map can help the UE to switch between sub-systems or even different TRPs of the same sub-system. For example, a UE that is communicating with a terrestrial TRP may learn that it is moving close to large obstacles and that channel conditions are expected to become worse as a result. In such an event, the UE can request a connection to a flying TRP to avoid suffering a communication disturbance.

In another example, a TRP serving a UE may learn that the UE is moving close to large obstacles and that channel conditions are expected to become worse as a result. In such an event, the TRP may negotiate with another TRP of the same or different sub-system to request a connection between the other TRP and the UE to avoid suffering a communication disturbance.

In a further example, a 3D real time map can help arrange suitable locations of non-terrestrial TRPs to better serve a UE. The arrangement of the non-terrestrial TRPs could take into account UE distributions, non-terrestrial TRP distributions, and the movement of the UEs and non-terrestrial TRPs.

In yet another example, when the communication load on a central node is low to medium such that it can accommodate connections to more UEs, the central node can turn-off some other TRPs or sub-systems. For example, when loads on the flying TRP 808 are low, some or all of the flying TRPs 806a-806d could be turned-off. Turning-off a TRP may include turning-off all functionality of the TRP, or turning-off only part of the functionality of the TRP. An example of turning-off part of the functionality of a TRP is turning-off data channels and associated reference signals. Negotiations between different airborne platform TRPs, or between airborne platform TRPs and terrestrial TRPs, could occur to determine whether to offload some UEs from one airborne platform TRP to another airborne platform TRP or to a terrestrial TRP, and to adjust the location of airborne platform TRPs or even turn-off some airborne platform TRPs. A 3D real time map can help in such negotiations, for example to determine which airborne platform TRP or terrestrial TRP to be turned-off, to re-arrange the locations of airborne platform TRPs, and to configure new relay connections to the UE.

The 3D real time map can help coordinate the movement of flying TRPs to suitable locations, and coordinate the configurations of non-terrestrial TRPs to better serve the UE. The 3D real time map can consider UE distributions, flying TRP distributions and their movement. Besides backhaul links, the configuration of non-terrestrial TRPs can also cover the configuration of SSB beams, reference signal beam configurations, transmission schemes and CSI feedback configurations. These configurations can be set using signaling mechanisms described elsewhere herein.

Figure 10:
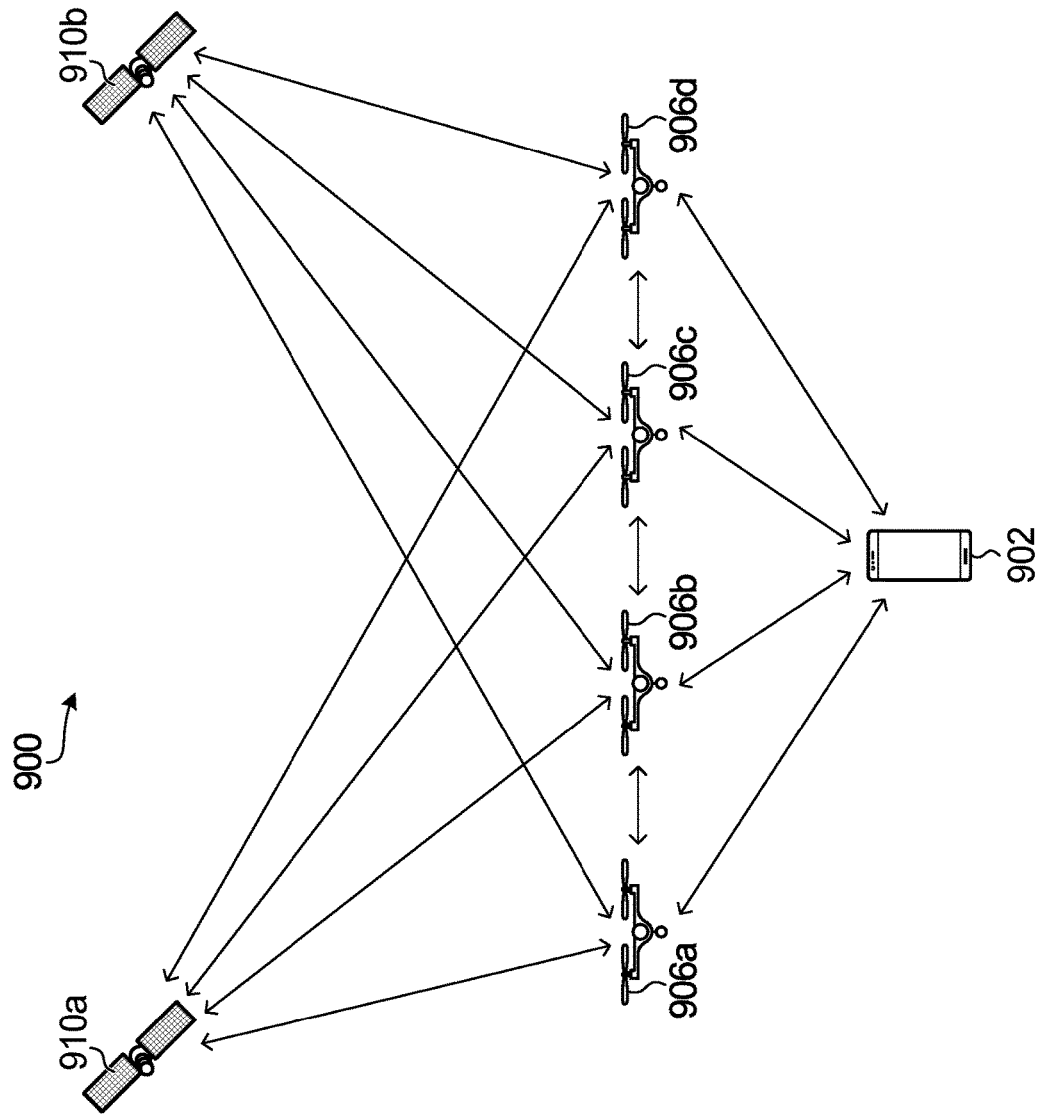

FIG. 10 is a diagram illustrating a non-terrestrial communication system 900 according to a further embodiment. The communication system 900 provides an example of flying distributed antennas implemented for UE wireless access. The communication system 900 includes a UE 902, multiple flying TRPs 906a-906d and multiple satellite TRPs 910a-910b.

Multiple double-headed arrows are illustrated in FIG. 10, which each represent a wireless connection. Specifically, the UE 902 has a connection to the flying TRPs 906a-906d; the satellite TRP 910a has a connection to the flying TRPs 906a-906d; the satellite TRP 910b has a connection to the flying TRPs 906a-906d; the flying TRP 906a further has a connection to the flying TRP 906b; the flying TRP 906b further has a connection to the flying TRP 906c; and the flying TRP 906c further has a connection to the flying TRP 906d.

In the communication system 900, either or both of the satellite TRPs 910a-910b could be high base station capability TRPs that provide service to the UE 902. The flying TRPs 906a-906d are a group of TRPs that form flying distributed antennas by utilizing the antennas from each of the flying TRPs 906a-906d. The flying distributed antennas enable cooperative transmissions between the UE 902 and the satellite TRPs 910a-910b. A data packet that is transmitted via the flying distributed antenna is forwarded by each of the flying TRPs 906a-906d. For example, a data packet could be transmitted by the UE 902 and be received by each of the flying TRPs 906a-906d. The flying TRPs could then forward the data packet to the satellite TRPs 910a-910b. Similar comments apply to a data packet that is transmitted from either or both of the satellite TRPs 910a-910b to the UE 902.

The flying TRPs 906a-906d could be implemented and/or configured in a similar manner to the flying TRPs 906a-906d of the communication system 900.

Each of the flying TRPs 906a-906d could be considered to form a single node relay between the UE 902 and the flying TRP 908. The connections illustrated between each of the flying TRPs 906a-906d are optional in a distributed antenna arrangement, and the flying TRPs 906a-906d could still provide a flying distributed antenna without direct connections between them.

In some implementations, the flying TRPs 906a-906d are implemented as a flying distributed antenna on demand. For example, in the case that a high capacity connection is required between the UE 902 and the satellite TRPs 910a-910b, the flying TRPs 906a-906d could be deployed it the arrangement shown in FIG. 10 to provide this high capacity connection. The flying TRPs 906a-906d could also or instead be deployed in the case that connections between the satellite TRPs 910a-910b and the UE 902 are providing an unstable or inconsistent connection. In some implementations, the deployment and cooperation of the flying TRPs 906a-906d could be coordinated by a central node, which could be either or both of the satellite TRPs 910a-910b.

In some implementations, the multiple transmissions to or from the flying TRPs 906a-906d are non-coherent. In some implementations, each of the connections between the flying TRPs 906a-906d and the UE 902, and/or each of the connections between the flying TRPs 906a-906d and the satellite TRPs 910a-910b, are independently configured. In some implementations, two or more connections between the flying TRPs 906a-906d and the UE 902, or two or more connections between the flying TRPs 906a-906d and the satellite TRPs 910a-910b, are configured in the same way. In some implementations, CSI is acquired for each of the connections between the UE 902, the flying TRPs 906a-906d and the satellite TRPs 910a-910b. Positioning-assisted information acquisition may be used to determine this CSI with reduced beam sweeping and channel measurements.

FIGS. 5 to 10 illustrate various implementations of different types of TRPs. As shown in these examples, satellite TRPs, airborne platform TRPs and/or balloon TRPs can act as non-terrestrial base stations to directly provide wireless communication service to UEs. Satellite TRPs, airborne platform TRPs and/or balloon TRPs can instead be a type of TRP that indirectly provides wireless communication service to UEs via quadcopter TRPs, for example. Quadcopter TRPs may be further classified depending on their capabilities, and correspondingly acting as a flying UE (no base station capability), relay (low base station capability), distributed antenna system (low or medium base station capability) and flying base station (high base station capability). When a quadcopter TRP is acting as flying base station, it can provide low to high data rate communications directly to a UE. When a quadcopter TRP is acting as relay or a distributed antenna system, it may be coordinated/controlled by a central node such as a satellite TRP, airborne platform, balloon TRP, terrestrial TRP and quadcopter TRP with a high base station capability. Various methods for implementing and operating the communication systems provided herein will now be described.

While the communication systems 400, 500, 600, 700, 800, 900 are illustrated separately, it should be noted that any features or functionality of the communication systems 400, 500, 600, 700, 800, 900 could be provided by a single communication system. In some embodiments, two or more of the communication systems 400, 500, 600, 700, 800, 900 could actually be part of a single communication system. Moreover, any or all of the communication systems 400, 500, 600, 700, 800, 900 could be example implementations of the terrestrial communication system 102 and the non-terrestrial communication system 104 of FIG. 2.

Some embodiments relate to methods for connecting a UE to an integrated terrestrial and non-terrestrial communication system. When a UE is first powered on and/or enters into an integrated terrestrial and non-terrestrial communication system, it will perform an initial cell search or an initial connection/sub-system search (i.e., to detect a synchronization signal and obtain system information) for all possible sub-systems in the integrated terrestrial and non-terrestrial communication system. These sub-systems include one or more corresponding TRPs. An initial access procedure may then be performed to turn-on a connection between UE and a sub-system.

Turning-on one or more connections to a sub-system is also called turning-on a sub-system, where each connection is to one or more TRPs in the sub-system. For example, turning-on a connection to a sub-system includes turning-on connections to one or more TRPs in the sub-system. When a connection is to more than one TRP, turning-on the connection to a sub-system includes turning-on some or all of the TRPs for that connection. Similarly, turning-off one or more connections to a sub-system is also called turning-off a sub-system, where each connection is to one or more TRPs in the sub-system. When a connection is to more than one TRP, turning-off the connection to a sub-system includes turning-off some or all of the TRPs for that connection. The turning-on or turning-off operation may be performed by the network or the UE. The network may always turn-on/turn-off some TRPs to turn-on/turn-off the corresponding connections. From a UE's perspective, turning on all TRPs of a sub-system means that the UE may not need to perform synchronization and initial access to each TRP of that sub-system or only need to perform certain functions. However, if some of the TRPs in a sub-system are turned on/off, the UE may not need to know this unless there is signaling to tell the UE to remove these TRPs from its list when a map is used to assist communication between the TRPs and UE.

Figure 11:
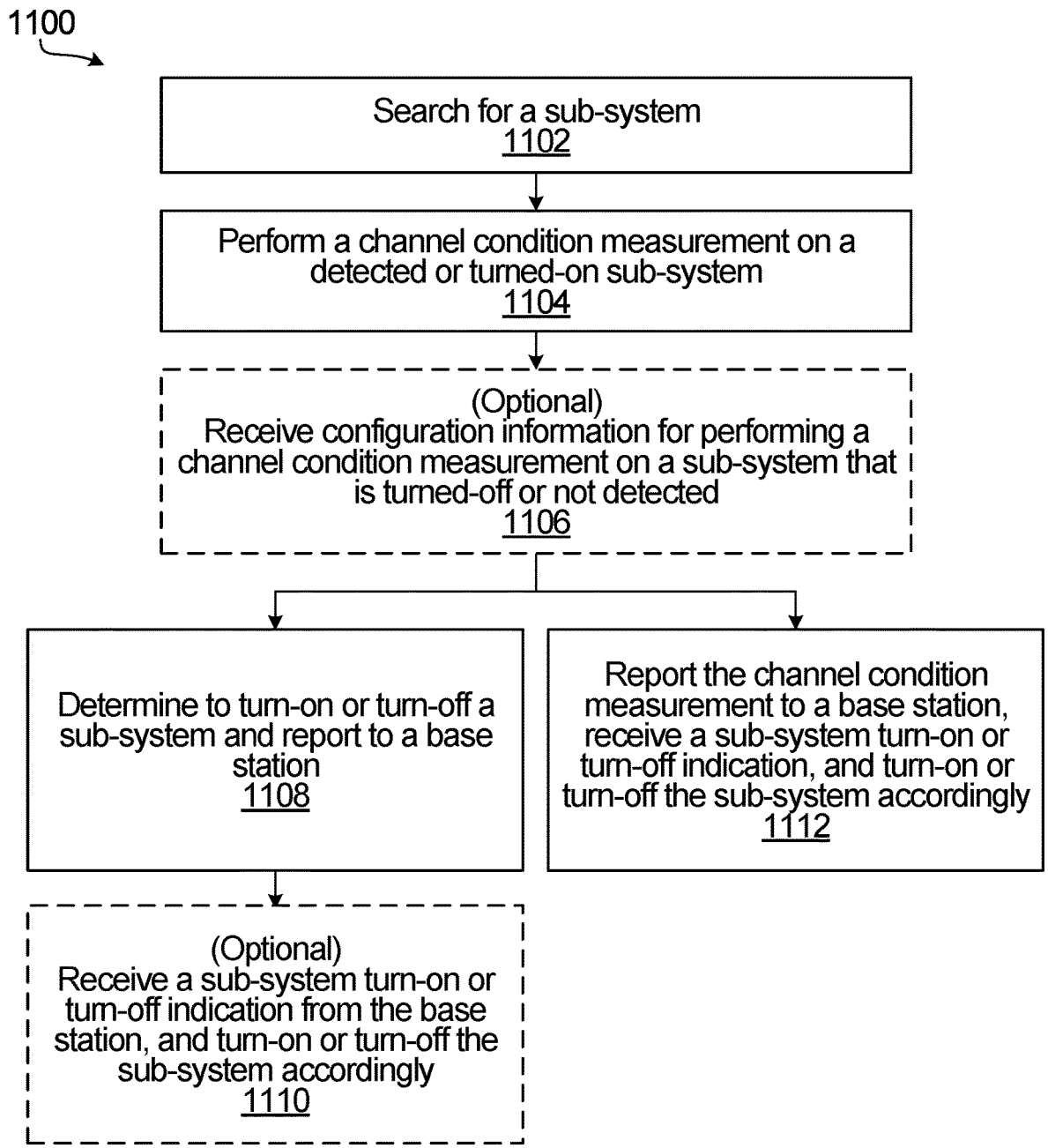
FIG. 11 is a flow diagram illustrating a method performed by a UE, according to an embodiment of the present disclosure.

FIG. 11 is a flow diagram illustrating a method 1100 performed by a UE in an integrated terrestrial and non-terrestrial communication system according to an embodiment. The method 1100 could be performed when the UE is first powered on and/or enters into an integrated terrestrial and non-terrestrial communication system. A similar method could also be performed by a UE in a strictly non-terrestrial communication system.

Step 1102 includes the UE searching for the different sub-systems of the integrated terrestrial and non-terrestrial communication system.

In an example, the UE may search for the different sub-systems based on a priority rule. This could be considered an initial cell search performed under certain priority rules. These priority rules define the order in which the UE will search for the different sub-systems. One example of such priority rule is: a terrestrial sub-system has the highest priority, an airborne sub-system and a low-height flying sub-system have the second highest priority, and a satellite sub-system has the lowest priority. Under this priority rule, the UE will first search for synchronization signals for a terrestrial sub-system, then search for synchronization signals for an airborne sub-system and/or a low-height flying sub-system, and last search for synchronization signals for a satellite sub-system. After an initial cell search, when a UE has successfully detected and connected to a sub-system with a certain priority, the UE could stop searching for other sub-systems that have lower priorities. Alternatively, a sub-system with a relatively high priority can transmit information to indicate whether there are other sub-systems with lower priorities and indicate the frequency for detecting synchronization signals and/or obtaining system information for the other sub-systems. After a UE has successfully detected and connected to the high priority sub-system, the UE then detects lower priority sub-systems using the indicated frequencies. This can help speed up the UE's procedure for detecting the remaining sub-systems and reduce UE power consumption, since only the indicated frequencies need to be searched. Alternatively, the UE can always search for all sub-systems according to the priority rule, and connect to all sub-systems that have been successfully detected. In another example, the priority rule can be search the synchronization signals for sub-system from low frequency to high frequency, or from high frequency to low frequency. Different priority rules can be combined. For example, if a frequency band supports multiple sub-systems, a UE can search synchronization signal for a sub-system with a highest priority from low frequency to high frequency, and then search synchronization signal for a sub-system with a second highest priority, and so on. In yet another example, the UE can search synchronization signals even without a priority rule.

In other example, the UE may search for the different sub-systems without a priority rule. For example, the UE may select a sub-system randomly or select a sub-system the UE firstly searched as the sub-system to access.

After the initial cell search in step 1102, the method proceeds to step 1104. In step 1104, the UE performs channel condition measurements for all detected sub-systems. These channel condition measurements could allow the UE to determine whether or not to turn-on some of the detected sub-systems. For example, if channel conditions for a sub-system are poor, a connection to that sub-system might not be turned-on. The channel condition measurement can be the received synchronization signal power, a channel state information (CSI) measurement, a reference signal receive power (RSRP) measurement, a received signal strength indicator (RSSI) or the like.

Optional step 1106 includes the UE receiving configuration information for performing channel condition measurements on a sub-system that is either turned-off or has not been detected. For example, a detected sub-system can configure the UE to perform channel condition measurements on another sub-system that is turned-off or has not been detected, to determine whether or not the other sub-system should be turned-on.

After step 1104 or step 1106, the method 1100 can proceed to step 1108, which includes the UE determining to turn-on or turn-off a sub-system. A UE can choose to turn-on connections to any sub-systems that have the highest received synchronization signal powers, highest RSRP, the highest RSSI or best CSI, for example. The UE could then choose to turn-off the connections to the remaining sub-systems. The UE can use a measurement threshold to turn-on or turn-off a connection to a sub-system. The measurement threshold can be predefined for the sub-system, or be notified by the sub-system or another turned-on sub-system. When a measurement threshold is met, a connection to the corresponding sub-system is turned-on. When the measurement threshold is not met, a connection to the corresponding sub-system is turned-off. When determining whether to turn-on or turn-off a connection to a sub-system, a priority rule can be combined with the threshold. For example, a UE may determine to turn-on a connection to a sub-system with a higher priority and that satisfies the threshold requirement, while turn-off its connection to a sub-system with a lower priority even if the threshold requirement is met. This may be beneficial in terms of power savings at the UE, especially when the lower priority sub-system is a satellite sub-system, as the connection distance is extremely large and the satellite sub-system can only provide low data rate communications with low efficiency.

In another example, an offset for the received synchronization signal power, or the measured CSI, RSRP, RSSI or the like, between different sub-systems can be used to determine whether to turn-on or turn-off a connection to a sub-system. The offset can be notified to the UE, or the offset can be predefined. When the received synchronization signal power (or the measured CSI, RSRP, RSSI or the like) of a sub-system with a higher priority is larger than that of a sub-system with a lower priority and the difference exceeds the offset, the UE can determine to turn-on the sub-system with a higher priority and turn-off the sub-system with a lower priority. When the received synchronization signal power (or the measured CSI, RSRP, RSSI or the like) of a sub-system with a higher priority is larger than that of a sub-system with a lower priority but the difference is within the offset, the UE can determine to turn-on the sub-system with a lower priority and turn-off the sub-system with a higher priority. This can avoid the sub-system with a lower priority (especially a satellite sub-system) having a very low probability of turning-on. For example, this can avoid a large number of connections being formed to a high priority sub-system, while very few connections are formed to a low priority sub-system.

In yet another example, the threshold can be combined with an offset to determine whether to turn-on or turn-off a connection to a sub-system. When the threshold requirements are met on both a higher priority sub-system and a lower priority sub-system, and the difference in the received synchronization signal power (or the measured CSI, RSRP, RSSI or the like) is within the offset, the lower priority sub-system may be turned-on and the higher priority sub-system may be turned-off. When the threshold requirements are met for both a higher priority sub-system and a lower priority sub-system, and the received synchronization signal power (or the measured CSI, RSRP, RSSI or the like) of the higher priority sub-system exceeds that of the lower priority sub-system by more than the offset, the higher priority sub-system may be turned-on and the lower priority sub-system may be turned-off.

When the threshold requirements are met on both a higher priority sub-system and a lower priority sub-system, but the difference between the received synchronization signal power (or the measured CSI, RSRP, RSSI or the like) and the threshold for the higher priority sub-system is not larger than the offset, the lower priority sub-system may be turned-on and the higher priority sub-system may be turned-off. When the threshold requirements are met on both a higher priority sub-system and a lower priority sub-system, and the difference between the received synchronization signal power (or the measured CSI, RSRP, RSSI or the like) and the threshold for the higher priority sub-system is larger than the offset, the lower priority sub-system may be turned-off and the higher priority sub-system may be turned-on.

When the threshold requirements are met on both a higher priority sub-system and a lower priority sub-system, but the difference between the received synchronization signal power (or the measured CSI, RSRP, RSSI or the like) and the threshold for the lower priority sub-system is not larger than the offset, the lower priority sub-system may be turned-off and the higher priority sub-system may be turned-on. When the threshold requirements are met on both a higher priority sub-system and a lower priority sub-system, and the difference between the received synchronization signal power (or the measured CSI, RSRP, RSSI or the like) and the threshold for the lower priority sub-system is larger than the offset, the lower priority sub-system may be turned-on and the higher priority sub-system may be turned-off.

In step 1108, the decision to turn-on or turn-off a connection to a sub-system is reported to a base station in the integrated system. The base station could be any terrestrial or non-terrestrial TRP with high base station capabilities. In some cases, the base station is a central node that operates with or without a group of distributed TRPs. In that case that the base station does operate with distributed TRPs, the UE could report to the base station via a relay connection provided by the distributed TRPs. The distributed TRPs could belong to the same sub-system as the base station, or a different sub-system.

In some implementations, the UE searches for the different sub-systems of the integrated terrestrial and non-terrestrial communication system. After the initial cell search, the UE may perform an uplink initial access procedure (i.e. sending a random access preamble) on a detected sub-system to inform the network that the UE has established a connection to that sub-system. When multiple sub-systems are detected by the UE during the initial cell search stage, the UE may perform an uplink initial access procedure on each detected sub-system. Alternatively, the UE may perform an uplink initial access procedure on part of the detected sub-system and then notify the remaining detected sub-system to the network. In another example, after the initial cell search, the UE performs channel condition measurements for all detected sub-systems. These channel condition measurements may allow the UE to determine whether or not to turn-on some of the detected sub-systems. Then the UE may perform uplink initial access procedure on a sub-system whose channel condition measurement results meets the above mentioned channel condition requirements such as threshold and offset. When multiple sub-systems meet the channel condition requirements, the UE may perform an uplink initial access procedure on each of the multiple sub-systems, or the UE could perform an uplink initial access procedure on part of the multiple sub-systems and then notify remaining of the multiple sub-systems to the network.

In some implementations, a sub-system turn-on or turn-off decision is made by both UE and the integrated terrestrial and non-terrestrial communication system. For example, following step 1108, the UE could perform optional step 1110. Step 1110 includes the UE receiving a sub-system connection turn-on or turn-off indication from a base station. The UE then turns on or turns off a connection to the sub-system accordingly. For example, after the UE measures the received synchronization signal power, the CSI, RSRP, RSSI or the like on each detected sub-system, the UE reports a list of candidate sub-systems (possibly together with the received synchronization signal power, the CSI, RSRP, RSSI or the like) to the base station of the integrated system. This could occur in step 1108, for example. The integrated system then makes a decision on which of the candidate sub-systems will be turned-on or turn-off and notifies the UE. This notification, which is received in step 1110, can be done through RRC signaling, MAC signaling or physical layer DCI by means of broadcast signaling, multi-cast signaling, groupcast signaling, dedicated signaling, or any combination thereof. Thus, in step 1108 the UE may make a preliminary decision as to which sub-systems to turn-on or turn-off, and in step 1110 the integrated system may override that decision.

In some implementations of step 1110, when the integrated system makes a decision on which of the candidate sub-systems recommended by the UE will be turned-on or turned-off, the integrated system can decide to turn-on a sub-system that is not one of the candidate sub-systems recommended by the UE, and notify the UE. The integrated system can even decide that none of the candidate sub-systems recommended by the UE are to be turned-on, and decide to turn on a sub-system that is not within the candidate sub-systems. In this situation, the UE shall follow the notifications by the integrated system.

Alternatively, a sub-system turn-on or turn-off decision is made entirely by the integrated terrestrial and non-terrestrial communication system. For example, following step 1104 or step 1106 the method could proceed to step 1112 instead of step 1108. Step 1112 includes the UE reporting channel condition measurements to a base station of the integrated system, receiving a sub-system connection turn-on or turn-off indication from the base station, and turning-on or turning-off the sub-system accordingly. In step 1112, the UE can report, to the base station of the integrated system, the measured channel conditions (e.g. the received synchronization signal power, CSI, RSSP, RSSI or the like) of detected sub-systems, turned-on sub-systems, or sub-systems that are either turned-off or have not been detected and are indicated in the configuration information for performing channel condition measurements received in step 1106. The integrated system can then determine whether to turn-on or turn-off each of the measured sub-systems. The base station of the integrated system can notify the result to the UE, and the UE turns-on or turns-off sub-systems accordingly. Step 1112 differs from steps 1108, 1110 in that the UE does not make any of its own decisions regarding which sub-systems to turn-on or turn-off. Instead, in step 1112, these decisions are performed entirely by the integrated system.

In step 1110 or step 1112, when the integrated system determines whether to turn-on or turn-off a sub-system, this determination is performed by a base station or a network controller of the integrated system. The UE could report channel condition measurements for different sub-systems, or a list of candidate sub-systems, directly to the base station for making the determination. Alternatively, the UE could report channel condition measurements for a sub-system to a base station that corresponds to the measured sub-system, and then the base station of the measured sub-system could forward these channel condition measurements to another base station or a network controller for making the determination. When a base station is a central node and operates with a group of distributed TRPs, channel condition measurements can be first reported to one or more of the distributed TRPs and then be forwarded to the base station. Similarly, when notifying a UE of which sub-system to turn-on or turn-off, the notification could be directly delivered by the base station, or could be delivered via a base station of a measured sub-system. When a base station is a central node and operates with a group of distributed TRPs, the notification could be delivered to the UE via one or more of the distributed TRPs.

Figure 12:
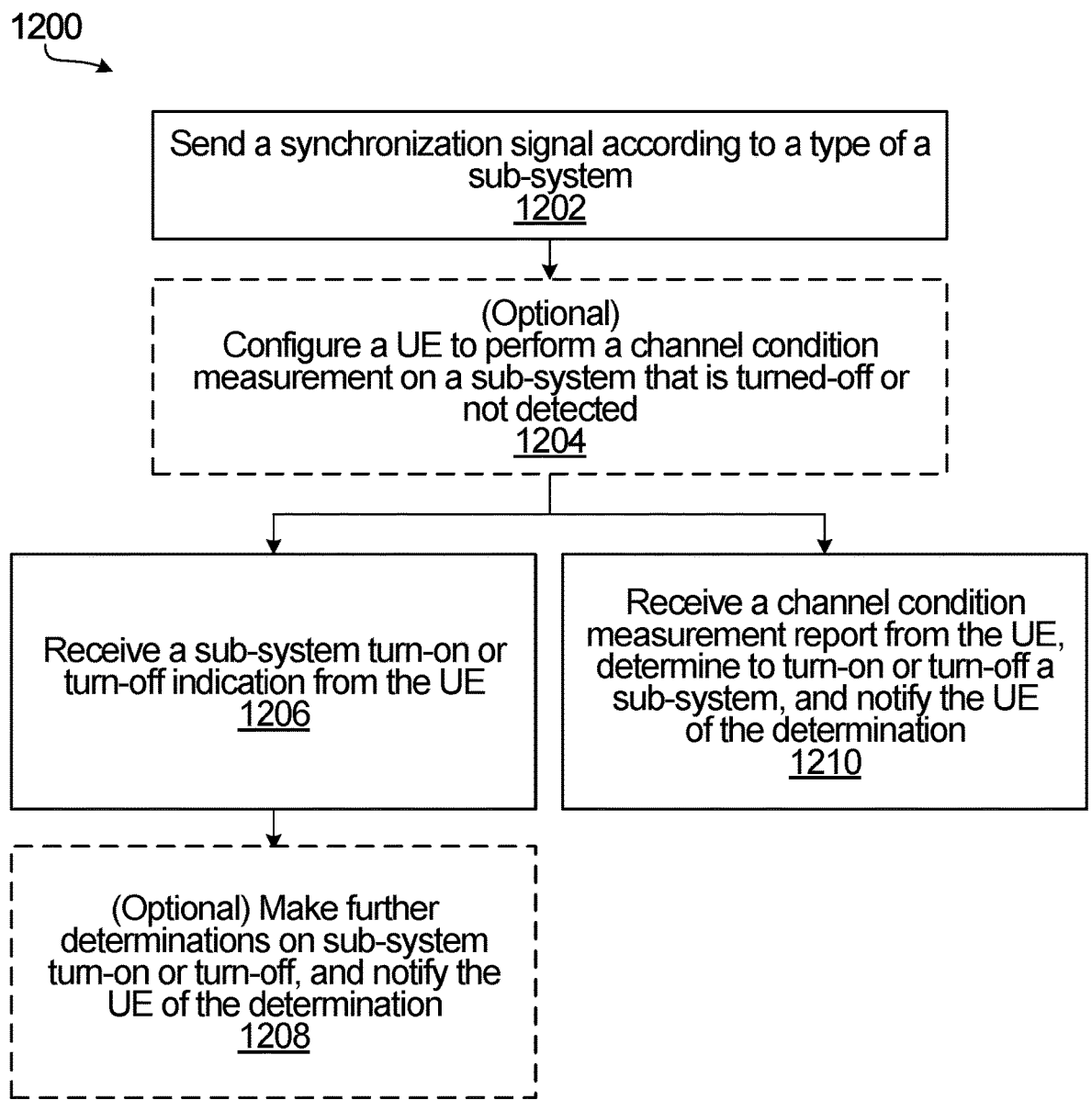
FIG. 12 is a flow diagram illustrating a method performed by a base station, according to an embodiment of the present disclosure.

FIG. 12 is a flow diagram illustrating a method 1200 performed by a base station in an integrated terrestrial and non-terrestrial communication system, according to an embodiment. The base station could be any terrestrial or non-terrestrial TRP with high base station capabilities. In some cases, the base station is a central node that operates with or without a group of distributed TRPs. The method 1200 generally corresponds to the method 1100, but from the perspective of a base station rather than from the perspective of a UE.

Step 1202 includes the base station sending a synchronization signal according to the type of sub-system that the base station belongs to. For example, if the base station is in a terrestrial sub-system, then the synchronization signal could correspond to this sub-system. If the base station is in a low-height flying sub-system, then the synchronization signal could correspond to this sub-system. The synchronization signal could allow a UE to detect the sub-system (for example, perform step 1102 of the method 1100) and/or perform channel condition measurements for the sub-system (for example, perform step 1104 of the method 1100).

Optional step 1204 could include the base station configuring the UE to perform channel condition measurements on a sub-system that is turned-off or not detected. For example, step 1204 could configure the UE to perform step 1106 of the method 1100.

Following step 1202 or step 1204, the method could proceed to step 1206, where the base station receives a sub-system turn-on or turn-off indication from the UE. For example this indication could be sent by the UE in step 1108 of the method 1100.

Optional step 1208 includes the base station making a further determination as to sub-system turn-on or turn-off at the UE. The base station can then notify the UE of the determination. For example, if the base station determines that a sub-system turn-on or turn-off operation performed by the UE was sub-optimal from a network perspective, then the base station could notify the UE of this decision. The UE can receive the notification in step 1110 of the method 1100, for example.

Following step 1202 or step 1204, the method 1200 could proceed to step 1210 instead of step 1206. In step 1210, the base station receives a channel condition measurement report from a UE, determines to turn-on or to turn-off a sub-system, and notifies the UE of the determination. The channel condition measurement report can include the received synchronization signal power, CSI, RSSP, RSSI or the like for one or more sub-systems. The base station may use a priority rules, threshold requirements and/or offsets to determine which sub-systems to turn-on or turn-off, as described above. Connection quality and the connection resource availability can also be taken into consideration. Step 1210 generally corresponds to step 1112 of the method 1100. When the measurement is a RACH preamble measurement, uplink reference signal measurement or the like that is measured by TRPs, following step 1202, the base station may collect the measurement results from the corresponding TRPs, make a determination as to sub-system turn-on or turn-off at the UE, and notify the UE of the determination. In this case, the base station may not need to receive a channel condition measurement report or a sub-system turn-on or turn-off indication from the UE. In another example, the base station may make the determination based on both the above mentioned measurements measured by TRPs, and the channel condition measurement and/or a sub-system turn-on or turn-off indication reported by the UE.

In the methods 1100, 1200, turning-on a connection with a sub-system covers: enabling all functions on the connection, or enabling only part of the functions on the connection. Turning-off a connection with a sub-system covers: disabling all functions on the connection, or disabling only part of the functions on the connection. Enabling or disabling only part of the functions on a connection is useful for a sub-system with lower priority, especially when a terrestrial sub-system is present, for example. This can help save power at the UE since only some of the functions in a connection are turned-on. For example, when connections to both a terrestrial sub-system and a satellite sub-system are turned-on and it is decided to turn-off the satellite sub-system, turning-off the satellite sub-system might only include turning-off only some of the functionality of the satellite sub-system. For example, only RACH processes might be turned-off at the satellite sub-system, and the other functions such as data transmission are still available on the satellite sub-system. In another example, when a connection to a satellite sub-system is turned-on, functions such as data transmissions and reference signals are available in the satellite sub-system, and the remaining functions such as synchronization signals and RACH remain unavailable in the satellite sub-system.

Turning-on or turning-off a sub-system or a connection may be performed at different levels. In one example, turning-off a sub-system or a connection may include turning-off data transmission only. In another example, turning-off a sub-system or a connection may include turning-off data transmissions and channel state information measurement and reporting. In yet another example, turning-off a sub-system or a connection may include turning-off data transmission, channel state information measurement and reporting, and also turning-off radio resource management and RACH. In yet another example, turning-off a sub-system or a connection may include turning-off down downlink synchronization signals, and therefore all functions of the sub-system are disabled. Similarly, turning-on a sub-system or a connection may include turning-on any or all of: downlink synchronization signals, downlink synchronization signals, channel state information measurements, neighboring cell measurements, radio resource management, RACH, and data transmission. In this situation, when notifying a UE to turn-on or turn-off a sub-system or a connection, information regarding which level or which functions are to be turned-on or turned-on can also be provided.

In the methods 1100, 1200, some sub-systems, if present, might not be ever turned-off. For example, when a terrestrial sub-system exists, the terrestrial sub-system might not be turned-off. A sub-system that is not turned-off may be referred to as a primary sub-system. The UE can use a primary sub-system to maintain multi-connection operation. For example, the UE may maintain an RRC connection to only the primary sub-system, and receive signaling for turning-on or turning-off other sub-systems from the primary sub-system. UE can also receive configurations for other sub-systems from the primary sub-system. An integrated terrestrial and non-terrestrial communication system can rely on this primary sub-system to determine whether to turn-on or turn-off other sub-systems.

In some embodiments, signaling mechanisms may be used by a TRP in a sub-system to provide a UE with the necessary configuration parameters to form a connection. For example, some signaling may be needed to notify a UE to turn-on or turn-off a connection to a sub-system, and some signaling may be needed for a UE to report to the integrated system a list of candidate sub-systems for turning-on. Generally speaking, the signaling could be transmitted in different ways, including: broadcasting as part of system information, dedicated RRC signaling, MAC signaling, dedicated or common physical layer downlink control signaling, or a combination of at least two different forms of signaling. For example, a UE can report a list of candidate sub-systems for turn-on to the integrated system through dedicated RRC signaling. The integrate system can then select which sub-systems are to be turned-on and which are to be turned-off, and notify the UE of these selected sub-systems through dedicated RRC signaling, MAC signaling, physical downlink control signaling or some combination thereof. In addition, a UE can signal information to TRPs by means of physical layer uplink control signaling on a physical uplink control channel and/or together with uplink data on physical uplink data channel.

The signaling could be done either an explicit manner or in an implicit manner. For example, when an integrated system wants to notify a UE to turn-on connections to a specific type of sub-system, explicit signaling that indicates the type of sub-system may be signaled to the UE. If different types of sub-systems are associated with different designs for synchronization signals, RACH channels, air interface configurations, reference signals and/or data channels, then these associated designs can be implicitly signaled when the type of sub-system is explicitly signaled. In another example, when a UE successfully detects a synchronization signal during an initial cell search stage, the UE may recognize the type of the sub-system using the synchronization signals, and then the associated designs of the synchronization signals, RACH channels, air interface configurations, reference signals or data channels for the sub-system type are also implicitly signaled. With this method, the signaling overhead can be significantly reduced.

Figure 13:
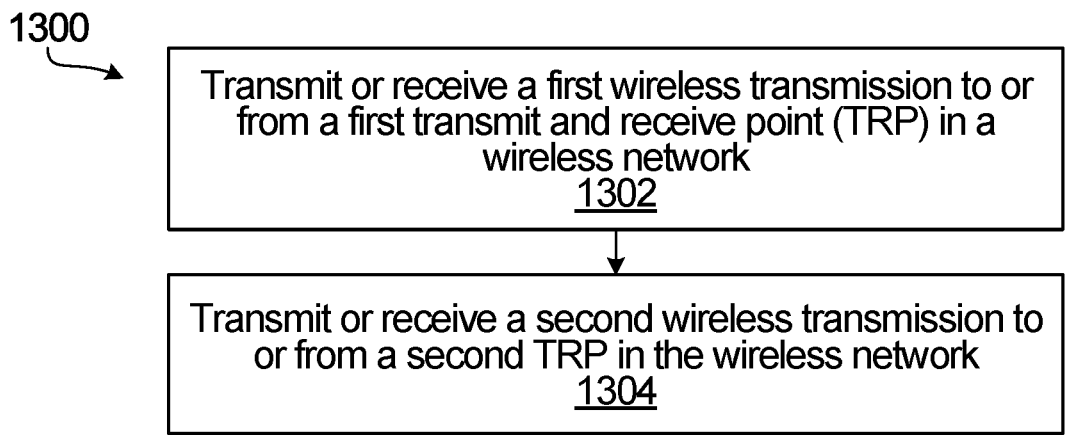
FIG. 13 is a flow diagram illustrating a method performed by a UE, according to another embodiment of the present disclosure.

FIG. 13 is a flow diagram illustrating a method 1300 performed by a UE, according to an embodiment. The UE could be a terrestrial or non-terrestrial UE.

Step 1302 includes the UE transmitting or receiving a first wireless transmission to or from a first TRP in a wireless network. The first TRP is a first type of TRP, which could be any type of TRP disclosed herein. The first TRP could be a terrestrial or non-terrestrial TRP.

Step 1304 includes the UE transmitting or receiving a second wireless transmission to or from a second TRP in the wireless network. The second TRP is a second type of TRP and is a non-terrestrial TRP. The second type of TRP is different from the first type of TRP. In some implementations, the first and second types of TRPs belong to different sub-systems in a communication system.

Notably, the first and the second transmission are sent in the same wireless network provided by the same communication system, which could be any communication system disclosed herein. The same module or terminal on the UE could receive both transmissions.

In some implementations, the first type of TRP and the second type of TRP are implemented in different layers of the wireless network. Each of the different layers of the wireless network could include a respective range of altitudes. Examples of different layers of a wireless network are provided in FIGS. 5 and 6.

In some implementations, step 1302 includes receiving the first wireless transmission from the first TRP and step 1304 includes receiving the second wireless transmission from the second TRP. In these implementations, the first wireless transmission and the second wireless transmission comprise a same data packet or a different data packet. This is an example of multiple TRPs, possibly in the form of a distributed antenna, transmitting the same data packet to a UE or different data packets targeting to the same UE to improve service at the UE.

In some implementations, step 1304 includes receiving the second wireless transmission. The UE can then determine the second type of TRP based on the second wireless transmission. For example, the second transmission could include explicit or implicit signaling that indicates the second type of TRP or the sub-system for the second type of TRP. Examples of such signaling can be found elsewhere herein.

In some embodiments, the ED 110 of FIG. 3A could perform the method 1300, where the transceiver 202 performs, at least in part, the steps 1302, 1304.

Figure 14:
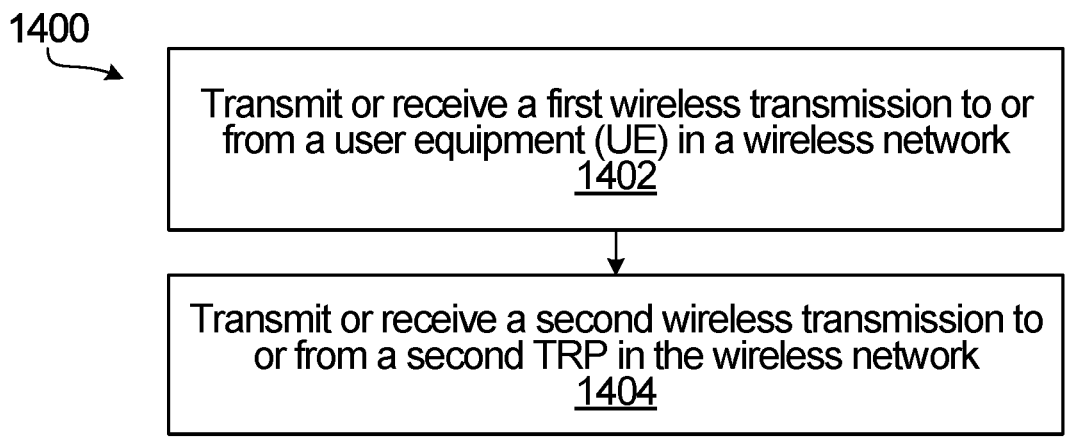
FIG. 14 is a flow diagram illustrating a method performed by a TRP, according to an embodiment of the present disclosure.

FIG. 14 is a flow diagram illustrating a method 1400 performed by a first TRP, according to an embodiment. The first TRP is a first type of TRP and is a non-terrestrial TRP.

Step 1402 includes the first TRP transmitting or receiving a first wireless transmission to or from a UE in a wireless network. The UE could be a terrestrial or non-terrestrial UE.

Step 1404 includes the first TRP transmitting or receiving a second wireless transmission to or from a second TRP in the wireless network. The second TRP is a second type of TRP different from the first type of TRP. The second TRP could be a terrestrial or non-terrestrial TRP. The first and second types of TRPs could belong to different layers and/or sub-systems in a communication system. In some implementations, the second wireless transmission is a wireless backhaul transmission.

Notably, the first and the second transmission are sent in the same wireless network provided by the same communication system, which could be any communication system disclosed herein. The same module or terminal on the first TRP could receive both transmissions.

In some implementations, step 1402 includes receiving the first wireless transmission from the UE, and step 1404 includes transmitting the second wireless transmission to the second TRP. In these implementations, the first wireless transmission and the second wireless transmission comprise a same data packet or a different data packet. This is example of packet forwarding, where the first TRP acts as a relay node between the UE and the second TRP.

In some embodiments, the non-terrestrial TRP 172 of FIG. 3C could perform the method 1400, where the transmitter 272 and/or the receiver 274 perform, at least in part, the steps 1402, 1404.

Figure 15:
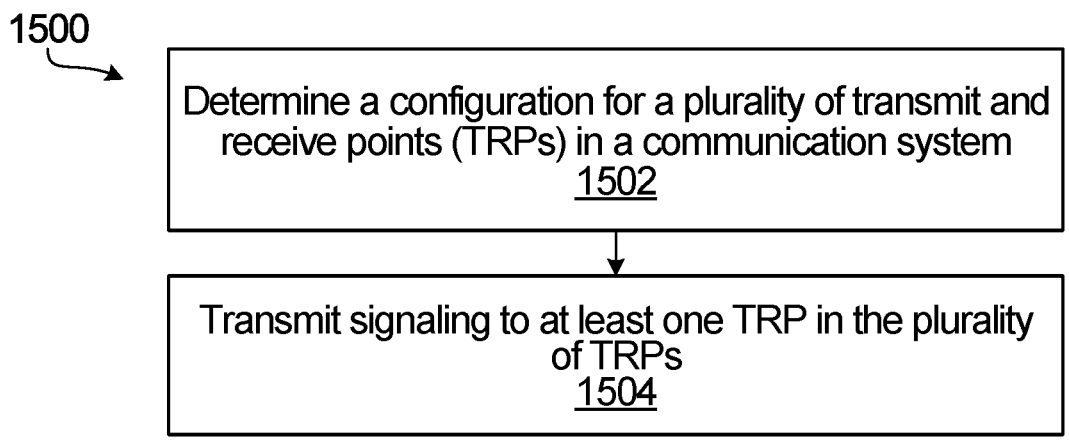
FIG. 15 is a flow diagram illustrating a method performed by a central node, according to an embodiment of the present disclosure.

FIG. 15 is a flow diagram illustrating a method 1500 performed by a central node, according to an embodiment. The central node could be a terrestrial or non-terrestrial TRP with high base station capabilities, in some implementations.

Step 1502 includes determining a configuration for a plurality of TRPs in a communication system. The plurality of TRPs includes at least one terrestrial TRP and at least on non-terrestrial TRP. This configuration could relate to controlling and/or coordination any aspect or functionality of the plurality of TRPs.

Step 1504 includes transmitting signaling to at least one TRP in the plurality of TRPs, the signaling including instructions to implement the configuration of the plurality of TRPs. This signaling could include explicit signaling and/or implicit signaling.

In some implementations, the configuration for the plurality of TRPs includes a plurality of connections for a UE, where each of the plurality of connections is to a different type of TRP. For example, step 1502 could correspond to step 1210 of the method 1200.

In some implementations, the configuration for the plurality of TRPs includes a relay connection. Here, the non-terrestrial TRP is a relay node in the relay connection.

In some implementations, the configuration for the plurality of TRPs includes a flying distributed antenna arrangement. The flying distributed antenna arrangement could include a plurality of flying TRPs that each have a connection to a TRP. For example, this could be similar to the flying distributed antenna shown in FIG. 9. Alternatively, the flying distributed antenna arrangement could include a plurality of flying TRPs that each have a connection to a UE. For example, this could be similar to the flying distributed antenna shown in FIG. 10.

In some implementations, the configuration for the plurality of TRPs includes a wireless backhaul connection for the plurality of TRPs. FIGS. 7 and 8 provide examples of such a wireless backhaul connection.

In some implementations, the configuration for the plurality of TRPs includes a connection handover for the at least one TRP. This connection handover could also include a communication system or sub-system handover. The handover could be determined based on any of a number of different factors, examples of which are discussed elsewhere herein.

In some implementations, the non-terrestrial TRP is a flying TRP, and the instructions include an instruction for the flying TRP to move to a new location. For example, the flying TRP could be positioned to the new location to boost wireless service in this location in the case of an outdoor event or a natural disaster.

In some implementations, the instructions comprise an instruction for the at least one TRP to turn-on or turn-off a connection. For example, this instruction could be transmitted in step 1210 of the method 1200.

In some embodiments, the terrestrial TRP 170 of FIG. 3B, or the non-terrestrial TRP 172 of FIG. 3C, could perform the method 1400. For example, the processing units 250, 270 could perform step 1502, and the transmitters 252, 272 could perform step 1504.

An aspect of the present disclosure relates to means for performing any of the methods disclosed herein. These means could be in the form of a device, unit or module, for example. In one embodiment, an apparatus includes means to perform each of steps 1102, 1104, 1106, 1108, 1110, 1112 of the method 1100. In another embodiment, an apparatus includes means to perform each of steps 1202, 1204, 1206, 1208, 1210 of the method 1200. In a further embodiment, an apparatus includes means to perform each of steps 1302, 1304 of the method 1300. In yet another embodiment, an apparatus includes means to perform each of steps 1402, 1404 of the method 1400. In yet a further embodiment, an apparatus includes means to perform each of steps 1502, 1504 of the method 1500.

Some aspects of the present disclosure relate to artificial intelligence (AI) and machine learning (ML). AI, and optionally ML, can assist in the configuration of a communication system. For example, AI/ML can be used for network layout optimization in a communication system. This communication system could be a non-terrestrial communication system or an integrated terrestrial and non-terrestrial communication system. For example, any or all of the communication systems 400, 500, 600, 700, 800 or 900 could be configured and/or implemented at least in part through AI/ML.

AI/ML has been used for solving many difficult and complex problems. To assist in understanding of some embodiments, some background discussion of ML and AI is now provided. AI is an emerging and fast-growing field thanks to the advances made in the field of computer architecture and in particular general purpose graphics processing units (GP-GPUs). A neural network, which is a form of ML, may be considered as a type of fitting function. Deep learning is one realization of a neural network, which contains more than one interconnected layer of artificial neurons. To train a deep neural network to fit a function (e.g., training using a large amount of input samples and output samples), the weight and threshold of each neuron are updated iteratively, so as to minimize an overall loss function or maximize an overall reward function. The iteration may be achieved by a gradient-descent or ascent back-propagation algorithm over training samples, which may require that the deep neural network architecture and the loss or reward function be mathematically differentiable.

Trainability typically requires: a function set (the neural network architecture) that defines an exploration space boundary within which a gradient-descent algorithm may traverse; and one or more loss (or reward) function(s) being differentiable with respect to each neuron's coefficient (for gradient-ascent or descent training) on that neural network architecture.

A deep neural network is often used for performing feature capture, and for performing prediction. Feature capture serves to extract useful information from a number of complex data, and this may be considered a form of dimension reduction. Prediction involves interpolation or extrapolation, to generate new data (generally referred to as predicted or estimated data) from sample data. Both these tasks may assume that the input data possess an intrinsic autoregression characteristic. For example, a pixel of an image usually has some relationship with its neighboring pixels. A convolutional neural network (CNN) may be developed to use this relationship to reduce the dimension of the data.

In some embodiments, AI/ML is used to configure one or more aspects of a communication system. Non-limiting examples of such aspects include: hierarchical layers, backhaul connections, relay connections, UE connections, TRP types and/or flying TRP deployment (for example, the number of TRPs in each layer).

In some embodiments, AI/ML is implemented to help reduce the number of possible connections to be searched by a UE during initial access. For example, an ML model could be trained to recognize connections that have the best performance for a UE. A UE can then focus on those connections during initial access. In some embodiments, AI/ML sets a measurement range or threshold to exclude the connections that might exhibit poor performance for a UE. For example, AI/ML might determine a power offset to define when connection handovers should be performed.

In some embodiments, AI/ML can be implemented to improve channel measurement and reporting, including beam direction determination. This may lead to the generation of improved CSI with less overhead, for example.

In some embodiments, AI/ML can be implemented to help improve a central node's coordination of multiple flying TRPs. For example, AI/ML could coordinate the movement, positioning and deployment of flying TRPs to improve network performance.

In some embodiments, AI/ML can be implemented to help a central node configure a DCI search space and blind decoding for flying TRPs. AI/ML can also or instead be implemented to configure a TA update frequency for a particular communication system design.

In some embodiments, AI/ML can be implemented to improve the selection of a TRP type when a TRP is capable of switching between different TRP types. AI/ML can also or instead be implemented to improve the selection of an air interface, channel design and/or signal design for a TRP. These selections may be based on learned or measured network topologies and configurations. For example, if a flying TRP is capable of switching between different TRP types, AI/ML could help determine which TRP type is suitable based on network demands. AI/ML could also or instead help configure an air interface, channel design and/or signal design for the flying TRP. The AI/ML could be performed at a central node and then signaled to the flying TRP. Alternatively, the AI/ML could be performed by the flying TRP itself.

AI/ML could be implemented in any of a number of different ways in a communication system. In some embodiments, AI/ML is performed by a terrestrial TRP, such as the terrestrial TRP 170 of FIG. 3B, for example. An AI/ML algorithm or model could be stored in the memory 258, and executed by the processing unit 250. In some embodiments, AI/ML is performed by a non-terrestrial TRP, such as the non-terrestrial TRP 172 of FIG. 3C, for example. An AI/ML algorithm or model could be stored in the memory 278, and executed by the processing unit 270. The non-terrestrial TRP could be a central node and/or a high base station capability TRP. In some embodiments, AI/ML is performed by an ED, such as the ED 110 of FIG. 3A, for example. An AI/ML algorithm or model could be stored in the memory 208, and executed by the processing unit 200. In some embodiments, AI/ML may be performed by a dedicated AI/ML engine that includes memory and one or more processing units.

It should be appreciated that one or more steps of the embodiment methods provided herein may be performed by corresponding units or modules. For example, data may be transmitted by a transmitting unit or a transmitting module. Data may be received by a receiving unit or a receiving module. Data may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:
performing, by a user equipment (UE), channel condition measurement to, thereby, obtain:
a first measurement result for a first downlink signal received from a terrestrial transmit and receive point (T-TRP); and
a second measurement result for a second downlink signal received from a non-terrestrial transmit and receive point (NT-TRP) in a wireless network,
wherein the first downlink signal comprises first synchronization signal or first downlink reference signal, and the second downlink signal comprises second synchronization signal or second downlink reference signal,
the method further comprising either:
turning-on, by the UE, a connection between the UE and the T-TRP based on determining that the first measurement result is equal to or above a first threshold for the first downlink signal; and
transmitting or receiving, by the UE using the connection between the UE and the T-TRP, a wireless transmission to or from the T-TRP in the wireless network;
or:
turning-on, by the UE, a connection between the UE and the NT-TRP based on determining that the second measurement result is equal to or above a second threshold for the second downlink signal; and
transmitting or receiving, by the UE using the connection between the UE and the NT-TRP, a second wireless transmission to or from the NT-TRP in the wireless network;

wherein the second threshold is less than the first threshold.

2. The method of claim 1, further comprising:
turning-off, by the UE, the connection between the UE and the T-TRP based on the first measurement result being below the first threshold; or
turning-off, by the UE, the connection between the UE and the NT-TRP based on the second measurement result being below the second threshold.

3. The method of claim 2, wherein,
the turning-off, by the UE, the connection between the UE and the T-TRP comprises:
disabling all functions on the connection between the UE and the T-TRP or
disabling part of the functions on the connection between the UE and the T-TRP; and
the turning-off, by the UE, the connection between the UE and the NT-TRP comprises:
disabling all functions on the connection between the UE and the NT-TRP or
disabling part of the functions on the connection between the UE and the NT-TRP.

4. The method of claim 3, wherein
the disabling all functions on the connection between the UE and the T-TRP comprises turning-off the first synchronization signal,
the disabling all functions on the connection between the UE and the NT-TRP comprises turning-off the second synchronization signal;
the disabling part of the functions on the connection between the UE and the T-TRP and the disabling part of the functions on the connection between the UE and the NT-TRP comprises turning-off at least one of following functions associated with the T-TRP and NT-TRP respectively:
data transmission to or from the TRP,
channel state information measurement and reporting,
radio resource management, or
random access (RA).

5. The method of claim 1, wherein
the turning-on, by the UE, of the connection between the UE and the T-TRP based on the first measurement result being equal to or above the first threshold for the first downlink signal comprises:
either:
turning-on, by the UE, the connection between the UE and the T-TRP in response to the first measurement result being equal to or above the first threshold;
or:
reporting the first measurement result to the wireless network;
receiving a first notification from the wireless network; and
turning-on, by the UE, the connection between the UE and the T-TRP according to the first notification; and
the turning-on, by the UE, of the connection between the UE and the NT-TRP based on the second measurement result being equal to or above the second threshold for the second downlink signal comprises:
either:
turning-on, by the UE, the connection between the UE and the NT-TRP in response to the second measurement result being equal to or above the second threshold;
or:

reporting the second measurement result to the wireless network;
receiving a second notification from the wireless network; and
turning-on, by the UE, the connection between the UE and the NT-TRP according to the second notification.

6. The method of claim 1, wherein,
the turning-on, by the UE, of the connection between the UE and the T-TRP comprises:
enabling all functions on the connection between the UE and the T-TRP or
enabling part of the functions on the connection between the UE and the T-TRP; and
the turning-on, by the UE, of the connection between the UE and the NT-TRP comprises:
enabling all functions on the connection between the UE and the NT-TRP or
enabling part of the functions on the connection between the UE and the NT-TRP.

7. The method of claim 1, wherein the first threshold and the second threshold are predefined or received from the wireless network.

8. The method of claim 1, wherein a priority of the connection between the UE and the T-TRP is higher than a priority of the connection between the UE and the NT-TRP, and the turning-on of the connection between the UE and the T-TRP or the turning-on of the connection between the UE and the NT-TRP comprises:
when a difference between the second measurement result and the first measurement result is within an offset, turning-on the connection between the UE and the NT-TRP without turning-on the connection between the UE and the T-TRP;
when the difference exceeds the offset, turning-on the connection between the UE and the T-TRP without turning-on the connection between the UE and the NT-TRP.

9. The method of claim 1, wherein the first measurement result and the second measurement result comprises one of channel status information (CSI), reference signal receive power (RSRP) or received signal strength indicator (RSSI).

10. An apparatus comprising:
at least one processor; and
a non-transitory computer readable storage medium storing instructions, when the instructions are executed by the at least one processor, the apparatus is caused to perform a method, wherein the method comprises:
performing channel condition measurement to, thereby, obtain:
a first measurement result for a first downlink signal received from a terrestrial transmit and receive point (T-TRP); and
a second measurement result for a second downlink signal received from a non-terrestrial transmit and receive point (NT-TRP) in a wireless network,
wherein the first downlink signal comprises first synchronization signal or first downlink reference signal, and the second downlink signal comprises second synchronization signal or second downlink reference signal,
the method further comprising either:
turning-on a connection between the apparatus and the T-TRP based on determining that the first measurement result is equal to or above a first threshold for the first downlink signal; and
transmitting or receiving using the connection between the apparatus and the T-TRP, a wireless transmission to or from the T-TRP in the wireless network;
or:
turning on a connection between the apparatus and the NT-TRP based on determining that the second measurement result is equal to or above a second threshold for the second downlink signal; and
transmitting or receiving using the connection between the apparatus and the NT-TRP, a wireless transmission to or from the NT-TRP in the wireless network;
wherein the second threshold is less than the first threshold.

11. The apparatus of claim 10, wherein the method further comprises:
turning-off the connection between the apparatus and the T-TRP in response to the first measurement result being below the first threshold; or
turning-off the connection between the apparatus and the NT-TRP in response to the second measurement result being below the second threshold.

12. The apparatus of claim 11, wherein,
the turning-off the connection between the apparatus the T-TRP comprises:
disabling all functions on the connection between the apparatus the T-TRP or
disabling part of the functions on the connection between the apparatus the T-TRP; and
the turning-off the connection between the apparatus the NT-TRP comprises:
disabling all functions on the connection between the apparatus the NT-TRP or
disabling part of the functions on the connection between the apparatus the NT-TRP.

13. The apparatus of claim 12, wherein
the disabling all functions on the connection between the UE and the T-TRP comprises turning-off the first synchronization signal,
the disabling all functions on the connection between the UE and the NT-TRP comprises turning-off the second synchronization signal;
the disabling part of the functions on the connection between the UE and the T-TRP and the disabling part of the functions on the connection between the UE and the NT-TRP comprises turning-off at least one of following functions associated with the T-TRP and NT-TRP respectively:
data transmission to or from the TRP,
channel state information measurement and reporting,
radio resource management, or
random access (RA).

14. The apparatus of claim 10, wherein
the turning-on of the connection between the apparatus the T-TRP based on the first measurement result being equal to or above the first threshold for the first downlink signal comprises:
either:
turning-on the connection between the apparatus the T-TRP in response to the first measurement result being equal to or above a first threshold;
or:
reporting the first measurement result to the wireless network;
receiving a notification from the wireless network; and turning-on the connection between the apparatus the T-TRP according to the notification; and the turning-on of the connection between the apparatus the NT-TRP based on the second measurement result being equal to or above the second threshold for the second downlink signal comprises:

either:
turning-on the connection between the apparatus the NT-TRP in response to the second measurement result being equal to or above the second threshold;

or:
reporting the second measurement result to the wireless network;
receiving a notification from the wireless network; and
turning-on the connection between the apparatus the NT-TRP according to the notification.

15. The apparatus of claim 10, wherein,
the turning-on the connection between the apparatus the T-TRP comprises:
enabling all functions on the connection between the apparatus the T-TRP or enabling part of the functions on the connection between the apparatus the T-TRP; and
the turning-on the connection between the apparatus the NT-TRP comprises:
enabling all functions on the connection between the apparatus the NT-TRP or
enabling part of the functions on the connection between the apparatus the NT-TRP.

16. The apparatus of claim 10, wherein the first threshold and the second threshold are predefined or received from the wireless network.

17. The apparatus of claim 10, wherein a priority of the connection between the UE and the T-TRP is higher than a priority of the connection between the UE and the NT-TRP, and the turning-on of the connection between the UE and the T-TRP or the turning-on of the connection between the UE and the NT-TRP comprises:
when a difference between the second measurement result and the first measurement result is within an offset, turning-on the connection between the UE and the NT-TRP without turning-on the connection between the UE and the T-TRP;
when the difference exceeds the offset, turning-on the connection between the UE and the T-TRP without turning-on the connection between the UE and the NT-TRP.

18. The apparatus of claim 10, wherein the first measurement result and the second measurement result comprises one of channel status information (CSI), reference signal receive power (RSRP) or received signal strength indicator (RSSI).

19. A non-transitory computer-readable medium storing computer instructions that, when executed by one or more processors in a user equipment (UE), cause the user equipment to perform operations including:
performing channel condition measurement to, thereby, obtain:
a first measurement result for a first downlink signal received from a terrestrial transmit and receive point (T-TRP); and
a second measurement result for a second downlink signal received from a non-terrestrial transmit and receive point (NT-TRP) in a wireless network,
wherein the first downlink signal comprises first synchronization signal or first downlink reference signal, and the second downlink signal comprises second synchronization signal or second downlink reference signal,
the method further comprising either:
turning-on a connection between the apparatus and the T-TRP based on determining that the first measurement result is equal to or above a first threshold for the first downlink signal; and
transmitting or receiving, using the connection between the UE and the T-TRP, a wireless transmission to or from the T-TRP in the wireless network;

or:
turning-on a connection between the apparatus and the NT-TRP based on determining that the second measurement result is equal to or above a second threshold for the second downlink signal; and
transmitting or receiving, using the connection between the UE and the NT-TRP, a second wireless transmission to or from the NT-TRP in the wireless network;
wherein, the second threshold is less than the first threshold.

20. The non-transitory computer-readable medium of claim 19, wherein the operations further comprising:
turning-off the connection between the UE and the T-TRP based on the first measurement result being below the first threshold; or
turning-off the connection between the UE and the NT-TRP based on the second measurement result being below the second threshold.

* * * * *